US008625885B2

(12) United States Patent
Brinson, Jr. et al.

(10) Patent No.: US 8,625,885 B2
(45) Date of Patent: Jan. 7, 2014

(54) METHODS AND SYSTEMS FOR DATA ANALYSIS AND FEATURE RECOGNITION

(75) Inventors: Robert M. Brinson, Jr., Rome, GA (US); Nicholas Levi Middleton, Highlands Ranch, CO (US); Bryan Glenn Donaldson, Cumming, GA (US)

(73) Assignee: Intelliscience Corporation, Atlanta, GA (US)

( * ) Notice: Subject to any disclaimer, the term of this patent is extended or adjusted under 35 U.S.C. 154(b) by 194 days.

(21) Appl. No.: 13/036,982

(22) Filed: Feb. 28, 2011
(Under 37 CFR 1.47)

(65) Prior Publication Data

US 2012/0141021 A1    Jun. 7, 2012

Related U.S. Application Data

(63) Continuation-in-part of application No. 12/597,096, filed on Sep. 25, 2009, now abandoned, which is a continuation-in-part of application No. 11/689,361, filed on Mar. 21, 2007, now abandoned.

(60) Provisional application No. 60/743,711, filed on Mar. 23, 2006.

(51) Int. Cl.
*G06K 9/62* (2006.01)

(52) U.S. Cl.
USPC ............ 382/156; 382/155; 382/157; 382/158; 382/159

(58) Field of Classification Search
USPC .................................................. 382/155–160
See application file for complete search history.

(56) References Cited

U.S. PATENT DOCUMENTS

| | | |
|---|---|---|
| 5,267,328 A | 11/1993 | Gouge |
| 5,319,719 A | 6/1994 | Nakazawa et al. |
| 5,826,261 A | 10/1998 | Spencer |
| 5,892,838 A | 4/1999 | Brady |
| 6,067,371 A | 5/2000 | Gouge et al. |
| 6,122,396 A | 9/2000 | King et al. |
| 6,373,984 B1 | 4/2002 | Gouge et al. |
| 6,396,939 B1 | 5/2002 | Hu et al. |
| 6,463,163 B1 | 10/2002 | Kresch |
| 6,574,378 B1 | 6/2003 | Lim |
| 6,601,059 B1 | 7/2003 | Fries |
| 6,985,612 B2 | 1/2006 | Hahn |
| 7,092,548 B2 | 8/2006 | Laumeyer et al. |

(Continued)

OTHER PUBLICATIONS

Reddick et al., "Automated segmentation and classification of multispectral magnetic resonance images of brain using artificial neural networks", IEEE Transactions on Medical Imaging, vol. 16, No. 6, pp. 911-917, 1997.*

(Continued)

*Primary Examiner* — Anand Bhatnagar
*Assistant Examiner* — Soo Park
(74) *Attorney, Agent, or Firm* — Lowe Graham Jones PLLC

(57) ABSTRACT

Systems and methods for automated pattern recognition and object detection. The method can be rapidly developed and improved using a minimal number of algorithms for the data content to fully discriminate details in the data, while reducing the need for human analysis. The system includes a data analysis system that recognizes patterns and detects objects in data without requiring adaptation of the system to a particular application, environment, or data content. The system evaluates the data in its native form independent of the form of presentation or the form of the post-processed data.

18 Claims, 90 Drawing Sheets

(56) References Cited

U.S. PATENT DOCUMENTS

| | | | |
|---|---|---|---|
| 7,162,076 B2 | 1/2007 | Liu | |
| 7,203,360 B2 | 4/2007 | Lee et al. | |
| 7,295,700 B2 | 11/2007 | Schiller et al. | |
| 7,362,892 B2 | 4/2008 | Lewis et al. | |
| 7,751,602 B2 | 7/2010 | Collins et al. | |
| 2002/0168657 A1 | 11/2002 | Chen et al. | |
| 2002/0176113 A1 | 11/2002 | Edgar | |
| 2004/0219517 A1 | 11/2004 | Ecker et al. | |
| 2004/0240712 A1* | 12/2004 | Rowe et al. | 382/124 |
| 2005/0025355 A1 | 2/2005 | Simard et al. | |
| 2005/0049498 A1 | 3/2005 | Roche et al. | |
| 2006/0024669 A1 | 2/2006 | Bogoch et al. | |
| 2006/0045512 A1 | 3/2006 | Imamura et al. | |
| 2006/0285010 A1 | 12/2006 | Wang et al. | |
| 2007/0047785 A1 | 3/2007 | Jang et al. | |
| 2007/0081743 A1 | 4/2007 | Kim | |
| 2007/0140540 A1 | 6/2007 | McLaren et al. | |

OTHER PUBLICATIONS

Keller et al., "Pulse-coupled neural networks for medical image analysis", Proc. SPIE 3722, Applications and Science of Computational Intelligence II, 444, 1999.*

"Artificial Neural Network," Wikipedia, http:/en.wikipedia.org/wiki/artificial_neural_network; pp. 1-10, Aug. 2005.

Stergiou et al., "Neural Networks," http://www.doc.ic.ac.uk/~nd/surprise_96/journal/wol14/cs11/report.html, pp. 1-29, Aug. 2005.

Rowe et al., "Detection of Antibody to Avian Influenza A (H5N1) Virus in Human Serum by Using a Combination of Serologic Assays," Journal of Clinical Microbiology, Apr. 1999 p. 937-943.

Sung et al., "Example-Based Learning for View-Based Human Face Detection", IEEE Transactions on Pattern Analysis and Machine Intelligence, vol. 20, No. 1, Jan. 1998.

* cited by examiner

|  | 1 | 2 | 3 | 4 | 5 | 6 | 7 | 8 | 9 | 10 |
|---|---|---|---|---|---|---|---|---|---|---|
| 1 | 5 | 159 | 189 | 59 | 112 | 59 | 5 | 209 | 126 | 131 |
| 2 | 200 | 188 | 120 | 72 | 195 | 134 | 194 | 196 | 254 | 47 |
| 3 | 147 | 222 | 145 | 194 | 216 | 181 | 216 | 97 | 60 | 81 |
| 4 | 103 | 123 | 251 | 152 | 129 | 86 | 161 | 14 | 136 | 175 |
| 5 | 180 | 161 | 39 | 207 | 243 | 134 | 108 | 213 | 147 | 194 |
| 6 | 196 | 14 | 71 | 129 | 103 | 170 | 156 | 145 | 1 | 247 |
| 7 | 141 | 71 | 83 | 203 | 75 | 195 | 237 | 240 | 220 | 67 |
| 8 | 123 | 231 | 252 | 229 | 190 | 22 | 246 | 107 | 169 | 126 |
| 9 | 224 | 72 | 11 | 231 | 96 | 62 | 185 | 249 | 84 | 195 |
| 10 | 248 | 190 | 31 | 13 | 15 | 77 | 131 | 52 | 87 | 127 |

FIGURE 23

| 6 | 7 | 8 |
|---|---|---|
| 5 | TDE | 1 |
| 4 | 3 | 2 |

FIGURE 24

|   | 1 | 2 | 3 | 4 | 5 | 6 | 7 | 8 | 9 | 10 |
|---|---|---|---|---|---|---|---|---|---|---|
| 1 | | | | | | | | | | |
| 2 | | 153 | 150 | 145 | 136 | 146 | 143 | 151 | 133 | |
| 3 | | 167 | 163 | 164 | 151 | 168 | 142 | 148 | 118 | |
| 4 | | 152 | 166 | 175 | 171 | 164 | 134 | 128 | 124 | |
| 5 | | 126 | 127 | 147 | 150 | 143 | 132 | 120 | 141 | |
| 6 | | 106 | 109 | 128 | 162 | 158 | 178 | 163 | 164 | |
| 7 | | 131 | 143 | 148 | 146 | 155 | 169 | 169 | 147 | |
| 8 | | 134 | 154 | 152 | 145 | 145 | 171 | 193 | 162 | |
| 9 | | 154 | 140 | 119 | 104 | 114 | 126 | 146 | 133 | |
| 10 | | | | | | | | | | |

FIGURE 25

|   | 1 | 2 | 3 | 4 | 5 | 6 | 7 | 8 | 9 | 10 |
|---|---|---|---|---|---|---|---|---|---|---|
| 1 | | | | | | | | | | |
| 2 | | 159 | 159 | 145 | 134 | 181 | 181 | 194 | 126 | |
| 3 | | 147 | 152 | 152 | 152 | 181 | 161 | 161 | 97 | |
| 4 | | 147 | 161 | 194 | 181 | 161 | 134 | 136 | 136 | |
| 5 | | 123 | 129 | 129 | 134 | 134 | 145 | 145 | 147 | |
| 6 | | 83 | 83 | 103 | 170 | 156 | 170 | 156 | 194 | |
| 7 | | 123 | 129 | 129 | 170 | 170 | 170 | 169 | 145 | |
| 8 | | 123 | 203 | 190 | 190 | 185 | 195 | 220 | 169 | |
| 9 | | 190 | 190 | 96 | 77 | 96 | 107 | 131 | 126 | |
| 10 | | | | | | | | | | |

FIGURE 26

|    | 1 | 2 | 3 | 4 | 5 | 6 | 7 | 8 | 9 | 10 |
|----|---|---|---|---|---|---|---|---|---|----|
| 1  |   |   |   |   |   |   |   |   |   |    |
| 2  |   | 217 | 163 | 157 | 157 | 211 | 211 | 249 | 207 |   |
| 3  |   | 148 | 179 | 179 | 144 | 130 | 202 | 240 | 240 |   |
| 4  |   | 212 | 212 | 212 | 157 | 157 | 202 | 202 | 199 |   |
| 5  |   | 237 | 237 | 212 | 157 | 157 | 199 | 212 | 246 |   |
| 6  |   | 182 | 193 | 204 | 168 | 168 | 132 | 239 | 246 |   |
| 7  |   | 238 | 238 | 181 | 207 | 224 | 224 | 245 | 246 |   |
| 8  |   | 241 | 241 | 241 | 209 | 224 | 227 | 165 | 182 |   |
| 9  |   | 241 | 241 | 241 | 218 | 231 | 227 | 197 | 197 |   |
| 10 |   |   |   |   |   |   |   |   |   |    |

FIGURE 27

|    | 1 | 2 | 3 | 4 | 5 | 6 | 7 | 8 | 9 | 10 |
|----|---|---|---|---|---|---|---|---|---|----|
| 1  |   |   |   |   |   |   |   |   |   |    |
| 2  |   | 64 | 56 | 57 | 63 | 75 | 75 | 83 | 72 |    |
| 3  |   | 51 | 56 | 55 | 50 | 44 | 66 | 78 | 78 |    |
| 4  |   | 63 | 63 | 67 | 50 | 54 | 66 | 67 | 66 |    |
| 5  |   | 78 | 77 | 74 | 50 | 47 | 57 | 70 | 84 |    |
| 6  |   | 65 | 70 | 72 | 55 | 59 | 47 | 77 | 83 |    |
| 7  |   | 81 | 88 | 71 | 69 | 75 | 73 | 80 | 82 |    |
| 8  |   | 85 | 93 | 87 | 80 | 82 | 86 | 62 | 69 |    |
| 9  |   | 96 | 105 | 106 | 90 | 80 | 84 | 71 | 62 |    |
| 10 |   |   |   |   |   |   |   |   |   |    |

FIGURE 28

|   | 1 | 2 | 3 | 4 | 5 | 6 |
|---|---|---|---|---|---|---|
| 1 | 120 | 72 | 195 | 134 | 194 | 196 |
| 2 | 145 | 194 | 219 | 181 | 216 | 97 |
| 3 | 251 | 152 | 129 | 86 | 161 | 14 |
| 4 | 39 | 207 | 243 | 134 | 108 | 213 |
| 5 | 71 | 129 | 103 | 170 | 156 | 145 |
| 6 | 83 | 203 | 75 | 195 | 237 | 240 |

FIGURE 34

|   | 1 | 2 | 3 | 4 | 5 | 6 |
|---|---|---|---|---|---|---|
| 1 |   |   |   |   |   |   |
| 2 |   | 164 | 151 | 168 | 142 |   |
| 3 |   | 175 | 172 | 164 | 134 |   |
| 4 |   | 147 | 150 | 143 | 132 |   |
| 5 |   | 128 | 162 | 158 | 178 |   |
| 6 |   |   |   |   |   |   |

FIGURE 35

|   | 1 | 2 | 3 | 4 | 5 | 6 |
|---|---|---|---|---|---|---|
| 1 |   |   |   |   |   |   |
| 2 |   | 152 | 152 | 181 | 161 |   |
| 3 |   | 194 | 181 | 161 | 134 |   |
| 4 |   | 129 | 134 | 134 | 145 |   |
| 5 |   | 103 | 170 | 156 | 170 |   |
| 6 |   |   |   |   |   |   |

FIGURE 36

|   | 1 | 2 | 3 | 4 | 5 | 6 |
|---|---|---|---|---|---|---|
| 1 |   |   |   |   |   |   |
| 2 |   | 179 | 147 | 133 | 202 |   |
| 3 |   | 212 | 157 | 157 | 202 |   |
| 4 |   | 212 | 157 | 157 | 199 |   |
| 5 |   | 204 | 168 | 168 | 132 |   |
| 6 |   |   |   |   |   |   |

FIGURE 37

|   | 1 | 2 | 3 | 4 | 5 | 6 |
|---|---|---|---|---|---|---|
| 1 | | | | | | |
| 2 | | 55 | 51 | 45 | 66 | |
| 3 | | 67 | 50 | 54 | 66 | |
| 4 | | 74 | 50 | 47 | 57 | |
| 5 | | 72 | 55 | 59 | 47 | |
| 6 | | | | | | |

FIGURE 38

|   | 1 | 2 | 3 | 4 | 5 | 6 | 7 | 8 | 9 | 10 |
|---|---|---|---|---|---|---|---|---|---|---|
| 1 | 5 | 159 | 189 | 59 | 112 | 59 | 5 | 209 | 126 | 131 |
| 2 | 200 | 188 | 120 | 72 | 195 | 134 | 194 | 196 | 254 | 47 |
| 3 | 147 | 222 | 145 | 194 | 216 | 181 | 216 | 97 | 60 | 81 |
| 4 | 103 | 123 | 251 | 152 | 129 | 86 | 161 | 14 | 136 | 175 |
| 5 | 180 | 161 | 39 | 207 | 243 | 134 | 108 | 213 | 147 | 194 |
| 6 | 196 | 14 | 71 | 129 | 103 | 170 | 156 | 145 | 1 | 247 |
| 7 | 141 | 71 | 83 | 203 | 75 | 195 | 237 | 240 | 220 | 67 |
| 8 | 123 | 231 | 252 | 229 | 190 | 22 | 246 | 107 | 169 | 126 |
| 9 | 224 | 72 | 11 | 231 | 96 | 62 | 185 | 249 | 84 | 195 |
| 10 | 248 | 190 | 31 | 13 | 15 | 77 | 131 | 52 | 87 | 127 |

FIGURE 40

|    | 1   | 2   | 3   | 4   | 5   | 6   | 7   | 8   | 9   | 10  |
|----|-----|-----|-----|-----|-----|-----|-----|-----|-----|-----|
| 1  | 114 | 56  | 78  | 43  | 116 | 94  | 103 | 106 | 115 | 121 |
| 2  | 118 | 167 | 147 | 152 | 184 | 182 | 178 | 171 | 191 | 188 |
| 3  | 144 | 121 | 132 | 149 | 169 | 118 | 94  | 97  | 203 | 197 |
| 4  | 147 | 136 | 124 | 117 | 128 | 97  | 101 | 57  | 124 | 142 |
| 5  | 156 | 150 | 153 | 160 | 182 | 174 | 167 | 92  | 116 | 129 |
| 6  | 176 | 162 | 181 | 179 | 166 | 142 | 152 | 74  | 82  | 115 |
| 7  | 183 | 186 | 192 | 197 | 201 | 215 | 219 | 211 | 203 | 199 |
| 8  | 188 | 200 | 208 | 218 | 227 | 242 | 235 | 223 | 211 | 204 |
| 9  | 187 | 219 | 225 | 237 | 247 | 236 | 227 | 203 | 198 | 205 |
| 10 | 176 | 206 | 212 | 216 | 203 | 205 | 207 | 188 | 186 | 199 |

FIGURE 41

|    | 1 | 2 | 3 | 4 | 5 | 6 | 7 | 8 | 9 | 10 |
|----|---|---|---|---|---|---|---|---|---|----|
| 1  | X | X | X | X | X | X | X | X | X | X  |
| 2  | X | 84| 113| X | X | X | X | X | X | X  |
| 3  | X | X | X | X | X | X | X | X | X | X  |
| 4  | X | X | X | X | X | X | X | X | X | X  |
| 5  | X | X | X | X | X | X | X | X | X | X  |
| 6  | X | X | X | X | X | X | X | X | X | X  |
| 7  | X | X | X | X | X | X | X | X | X | X  |
| 8  | X | X | X | X | X | X | X | X | X | X  |
| 9  | X | X | X | X | X | X | X | X | X | X  |
| 10 | X | X | X | X | X | X | X | X | X | X  |

FIGURE 42

|   | 1 | 2 | 3 | 4 | 5 | 6 | 7 | 8 | 9 | 10 |
|---|---|---|---|---|---|---|---|---|---|----|
| 1 | X | X | X | X | X | X | X | X | X | X |
| 2 | X | 127 | 153 | X | X | X | X | X | X | X |
| 3 | X | X | X | X | X | X | X | X | X | X |
| 4 | X | X | X | X | X | X | X | X | X | X |
| 5 | X | X | X | X | X | X | X | X | X | X |
| 6 | X | X | X | X | X | X | X | X | X | X |
| 7 | X | X | X | X | X | X | X | X | X | X |
| 8 | X | X | X | X | X | X | X | X | X | X |
| 9 | X | X | X | X | X | X | X | X | X | X |
| 10 | X | X | X | X | X | X | X | X | X | X |

FIGURE 43

|   | 1 | 2 | 3 | 4 | 5 | 6 | 7 | 8 | 9 | 10 |
|---|---|---|---|---|---|---|---|---|---|---|
| 1 | | | | | | | | | | |
| 2 | | 153 | 150 | X | X | X | X | X | X | |
| 3 | | X | X | X | X | X | X | X | X | |
| 4 | | X | X | X | X | X | X | X | X | |
| 5 | | X | X | X | X | X | X | X | X | |
| 6 | | X | X | X | X | X | X | X | X | |
| 7 | | X | X | X | X | X | X | X | X | |
| 8 | | X | X | X | X | X | X | X | X | |
| 9 | | X | X | X | X | X | X | X | X | |
| 10 | | | | | | | | | | |

FIGURE 44

|   | 1 | 2 | 3 | 4 | 5 | 6 | 7 | 8 | 9 | 10 |
|---|---|---|---|---|---|---|---|---|---|----|
| 1 |   |   |   |   |   |   |   |   |   |    |
| 2 |   | 217 | 163 | X | X | X | X | X | X |   |
| 3 |   | X | X | X | X | X | X | X | X |    |
| 4 |   | X | X | X | X | X | X | X | X |    |
| 5 |   | X | X | X | X | X | X | X | X |    |
| 6 |   | X | X | X | X | X | X | X | X |    |
| 7 |   | X | X | X | X | X | X | X | X |    |
| 8 |   | X | X | X | X | X | X | X | X |    |
| 9 |   | X | X | X | X | X | X | X | X |    |
| 10|   |   |   |   |   |   |   |   |   |    |

FIGURE 45

|   | 1 | 2 | 3 | 4 | 5 | 6 | 7 | 8 | 9 | 10 |
|---|---|---|---|---|---|---|---|---|---|---|
| 1 |  |  |  |  |  |  |  |  |  |  |
| 2 |  | 120 | 116 | X | X | X | X | X | X |  |
| 3 |  | X | X | X | X | X | X | X | X |  |
| 4 |  | X | X | X | X | X | X | X | X |  |
| 5 |  | X | X | X | X | X | X | X | X |  |
| 6 |  | X | X | X | X | X | X | X | X |  |
| 7 |  | X | X | X | X | X | X | X | X |  |
| 8 |  | X | X | X | X | X | X | X | X |  |
| 9 |  | X | X | X | X | X | X | X | X |  |
| 10 |  |  |  |  |  |  |  |  |  |  |

FIGURE 46

|   | 1 | 2 | 3 | 4 | 5 | 6 | 7 | 8 | 9 | 10 |
|---|---|---|---|---|---|---|---|---|---|---|
| 1 |   |   |   |   |   |   |   |   |   |   |
| 2 |   | 111 | 124 | X | X | X | X | X | X |   |
| 3 |   | X | X | X | X | X | X | X | X |   |
| 4 |   | X | X | X | X | X | X | X | X |   |
| 5 |   | X | X | X | X | X | X | X | X |   |
| 6 |   | X | X | X | X | X | X | X | X |   |
| 7 |   | X | X | X | X | X | X | X | X |   |
| 8 |   | X | X | X | X | X | X | X | X |   |
| 9 |   | X | X | X | X | X | X | X | X |   |
| 10 |   |   |   |   |   |   |   |   |   |   |

FIGURE 47

|   | 1 | 2 | 3 | 4 | 5 | 6 | 7 | 8 | 9 | 10 |
|---|---|---|---|---|---|---|---|---|---|---|
| 1 | ▨ | ▨ | ▨ | ▨ | ▨ | ▨ | ▨ | ▨ | ▨ | ▨ |
| 2 | ▨ | 84 | 113 | X | X | X | X | X | X | ▨ |
| 3 | ▨ | X | X | X | X | X | X | X | X | ▨ |
| 4 | ▨ | X | X | X | X | X | X | X | X | ▨ |
| 5 | ▨ | X | X | X | X | X | X | X | X | ▨ |
| 6 | ▨ | X | X | X | X | X | X | X | X | ▨ |
| 7 | ▨ | X | X | X | X | X | X | X | X | ▨ |
| 8 | ▨ | X | X | X | X | X | X | X | X | ▨ |
| 9 | ▨ | X | X | X | X | X | X | X | X | ▨ |
| 10 | ▨ | ▨ | ▨ | ▨ | ▨ | ▨ | ▨ | ▨ | ▨ | ▨ |

FIGURE 48

|   | 1 | 2 | 3 | 4 | 5 | 6 | 7 | 8 | 9 | 10 |
|---|---|---|---|---|---|---|---|---|---|---|
| 1 | | | | | | | | | | |
| 2 | | 124 | 152 | X | X | X | X | X | X | |
| 3 | | X | X | X | X | X | X | X | X | |
| 4 | | X | X | X | X | X | X | X | X | |
| 5 | | X | X | X | X | X | X | X | X | |
| 6 | | X | X | X | X | X | X | X | X | |
| 7 | | X | X | X | X | X | X | X | X | |
| 8 | | X | X | X | X | X | X | X | X | |
| 9 | | X | X | X | X | X | X | X | X | |
| 10 | | | | | | | | | | |

FIGURE 49

|   | 1 | 2 | 3 | 4 | 5 | 6 |
|---|---|---|---|---|---|---|
| 1 | 118 | 34 | 188 | 134 | 194 | 196 |
| 2 | 137 | 191 | 198 | 181 | 216 | 97 |
| 3 | 251 | 136 | 122 | 86 | 161 | 14 |
| 4 | 39 | 207 | 243 | 134 | 108 | 213 |
| 5 | 71 | 129 | 103 | 170 | 156 | 145 |
| 6 | 83 | 203 | 75 | 195 | 237 | 240 |

FIGURE 51

|   | 1 | 2 | 3 | 4 | 5 | 6 |
|---|---|---|---|---|---|---|
| 1 | 144 | 118 | 114 | 123 | 183 | 175 |
| 2 | 121 | 167 | 56 | 199 | 166 | 166 |
| 3 | 132 | 147 | 78 | 117 | 161 | 14 |
| 4 | 109 | 163 | 178 | 226 | 108 | 213 |
| 5 | 98 | 127 | 132 | 161 | 151 | 168 |
| 6 | 72 | 65 | 117 | 127 | 203 | 187 |

FIGURE 52

|   | 1 | 2 | 3 | 4 | 5 | 6 |
|---|---|---|---|---|---|---|
| 1 | X | X | X | X | X | X |
| 2 | X | 84 | 92 | X | X | X |
| 3 | X | X | X | X | X | X |
| 4 | X | X | X | X | X | X |
| 5 | X | X | X | X | X | X |
| 6 | X | X | X | X | X | X |

FIGURE 53

|   | 1 | 2 | 3 | 4 | 5 | 6 |
|---|---|---|---|---|---|---|
| 1 | X | X | X | X | X | X |
| 2 | X | 125 | 149 | X | X | X |
| 3 | X | X | X | X | X | X |
| 4 | X | X | X | X | X | X |
| 5 | X | X | X | X | X | X |
| 6 | X | X | X | X | X | X |

FIGURE 54

|   | 1 | 2 | 3 | 4 | 5 | 6 |
|---|---|---|---|---|---|---|
| 1 |   |   |   |   |   |   |
| 2 |   | 153 | 141 | X | X |   |
| 3 |   | X | X | X | X |   |
| 4 |   | X | X | X | X |   |
| 5 |   | X | X | X | X |   |
| 6 |   |   |   |   |   |   |

FIGURE 55

|   | 1 | 2 | 3 | 4 | 5 | 6 |
|---|---|---|---|---|---|---|
| 1 |   |   |   |   |   |   |
| 2 |   | 217 | 164 | X | X |   |
| 3 |   | X | X | X | X |   |
| 4 |   | X | X | X | X |   |
| 5 |   | X | X | X | X |   |
| 6 |   |   |   |   |   |   |

FIGURE 56

|   | 1 | 2 | 3 | 4 | 5 | 6 |
|---|---|---|---|---|---|---|
| 1 | ▨ | ▨ | ▨ | ▨ | ▨ | ▨ |
| 2 | ▨ | 120 | 124 | X | X | ▨ |
| 3 | ▨ | X | X | X | X | ▨ |
| 4 | ▨ | X | X | X | X | ▨ |
| 5 | ▨ | X | X | X | X | ▨ |
| 6 | ▨ | ▨ | ▨ | ▨ | ▨ | ▨ |

FIGURE 57

|   | 1 | 2 | 3 | 4 | 5 | 6 |
|---|---|---|---|---|---|---|
| 1 |   |   |   |   |   |   |
| 2 |   | 111 | 143 | X | X |   |
| 3 |   | X | X | X | X |   |
| 4 |   | X | X | X | X |   |
| 5 |   | X | X | X | X |   |
| 6 |   |   |   |   |   |   |

METHODS AND SYSTEMS FOR DATA ANALYSIS AND FEATURE RECOGNITION

PRIORITY CLAIM

This application is a continuation-in-part of U.S. patent application Ser. No. 12/567,096 as filed on Aug. 25, 2009, and U.S. patent application Ser. No. 11/689,361 as filed on Mar. 21, 2007, both of which claim priority to U.S. Provisional Patent Application 60/743,711 as filed on Mar. 23, 2006. These patent applications are incorporated herein by reference.

FIELD OF THE INVENTION

The present invention, in various embodiments, relates generally to the field of data analysis and more particularly to pattern and object recognition within multispectral and hyperspectral digital data sets.

BACKGROUND OF THE INVENTION

With the increasing use of computers and computerized technology, the amount of information represented digitally has become enormous. Analysis of these vast quantities of digital data generally involves the recognition of known patterns.

Traditionally, information originating in a digital format is ultimately analyzed through manual review by a person who often requires substantial training. In order for people to efficiently interact with volumes of digital data, the information must typically be converted into a visual, audible, or other human-perceivable representation. However, during the process of translating digital data from its raw form into a convenient output format, some information may be lost or misinterpreted. Moreover, the data is often processed and/or filtered for presentation prior to analysis thereby resulting in the loss of significant information from the original data. While humans can be trained to analyze many different types of data, manual human analysis is generally more expensive with regard to time and accuracy than automated systems. Additionally, errors are often introduced due to the inherent limitations of human perception and attention span. Frequently, the data contains more detail than human senses can discern, and it is documented that human repetition begets errors.

To address the innate shortcomings of human analysis, many automated data analysis and pattern recognition systems have been developed and subsequently improved upon. However, most of these solutions are highly data-specific and/or processing intensive. The data inputs that a pattern recognition system can handle are often fixed and limited by design such that applicability is restricted to a specific data modality; otherwise stated, the system by which the data is evaluated is tightly coupled to the specific data source it is designed to evaluate. Hence, improvements across a broad range of systems are very difficult.

Furthermore, within many systems, pattern and feature recognition is processing-intensive. For example, image analysis commonly uses complex algorithms to find geometric shapes, edges, etc., for the purpose of characterizing or classifying features of interest; this requires multitudes of algorithms to be processed. The time to discover, develop, and implement each algorithm causes an incremental delay in deploying or improving the system.

Thus, there still remains substantial room for improvement in the arena of automated data analysis and pattern recognition systems.

SUMMARY OF THE INVENTION

In a preferred embodiment of the present invention, the data analysis and feature recognition system as described herein provides an automated pattern recognition and object detection system that can be rapidly developed and improved upon using a relatively minimal number of simple evaluation algorithms that function to capture primary or more fundamental relationships between data elements in order to fully discriminate features and objects within the data allthewhile reducing the need for human analysis. Advantageously, this limited set of algorithms can be implemented quickly in a specific data modality or across multiple modalities. Hence, the system as described herein is designed so as not to be limited by a specific data modality, submodality, etc., or by the incomplete knowledge of its developers.

In one aspect of the present invention, the system recognizes patterns and detects objects within data without requiring adaptation of said system to a particular application, environment, or data content. The system evaluates the data in its native form independent of the form of presentation or the form of the post-processed data.

In one aspect of the present invention, the system analyzes data from any and all multispectral and hyperspectral data modalities within all data types. Example data modalities include multi-band imagery, acoustics, and as yet undiscovered modalities. Within multispectral and hyperspectral imagery, there exists still and moving images with applications in the fields of medicine, homeland security, natural resources, geology, agriculture, food sciences, meteorology, space, military, digital rights management, and others. Within acoustic, there exists single and multi-channel audio sound, ultrasound-continuous stream, seismic, and SONAR with applications in the fields of medicine, homeland security, military, natural resources, geology, space, digital rights management, and others. Examples of other digital data streams include radar, scent, tactile, financial market and statistical data, mechanical pressure, environmental data, taste, harmonics, chemical analysis, electrical impulses, text, and others. Some data modalities are combinations of other modalities, such as video with sound or multiple forms of a single modality such as where multiple images of different types are taken of the same sample, for example correlated MRI and CT imaging or combined SAR, photograph, and IR imagery. Improvements made in the common system benefit all modalities.

In still other aspects of the present invention, the system provides an automated functionality that operates on the full resolution of the native data. The results are produced in a timely manner thereby alleviating the tedium of preliminary human analysis. Moreover, in one embodiment the system can be programmed to automatically alert the operator or user to examine a data set(s) requiring closer attention.

In additional aspects of the present invention, the method includes receiving a first multispectral or hyperspectral data set; selecting and analyzing individual bands of the data set(s) using a series of evaluation algorithms; generating an algorithm value cache of the results set of the first algorithmic training of the first data set; receiving a second multispectral or hyperspectral data set containing data bands of the same type as the first; processing the second data set using the same series of evaluation algorithms as is used to evaluate the first data set; generating a second algorithm value cache of the results set of the algorithmic processing on the second data set; comparing the algorithm value cache from the training results of the first data set with the algorithm value cache from the processing results of the second data set; and performing a processing action based upon the generated match result.

BRIEF DESCRIPTION OF THE DRAWINGS

The preferred and alternative embodiments of the present invention are described in detail herein with reference to the following drawings.

FIG. 23 shows an example ten-data element by ten-data element data array of a grey-scale image;

Figure 24:
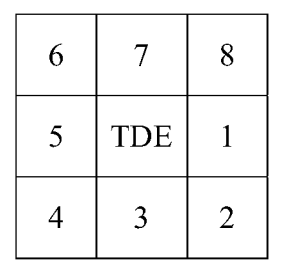

FIG. 24 shows the adjacent data element TDA;

FIG. 25 shows an example ten-data element by ten-data element data array containing the resultant algorithm values after evaluation of the original data array of FIG. 23 with the mean algorithm using the adjacent data element TDA;

FIG. 26 shows an example ten-data element by ten-data element data array containing the resultant algorithm values after evaluation of the original data array of FIG. 23 with the median algorithm using the adjacent data element TDA;

FIG. 27 shows an example ten-data element by ten-data element data array containing the resultant algorithm values after evaluation of the original data array of FIG. 23 with the spread of values algorithm using the adjacent data element TDA;

FIG. 28 shows an example ten-data element by ten-data element data array containing the resultant algorithm values after evaluation of the original data array of FIG. 23 with the standard deviation algorithm using the adjacent data element TDA;

FIG. 34 shows an example six-data element by six-data element data array of a grey-scale image;

FIG. 35 shows an example six-data element by six-data element data array containing the resultant algorithm values after evaluation of the original data array of FIG. 34 with the mean algorithm using the adjacent data element TDA;

FIG. 36 shows an example six-data element by six-data element data array containing the resultant algorithm values after evaluation of the original data array of FIG. 34 with the median algorithm using the adjacent data element TDA;

FIG. 37 shows an example six-data element by six-data element data array containing the resultant algorithm values after evaluation of the original data array of FIG. 34 with the spread of values algorithm using the adjacent data element TDA;

FIG. 38 shows an example six-data element by six-data element data array containing the resultant algorithm values after evaluation of the original data array of FIG. 34 with the standard deviation algorithm using the adjacent data element TDA;

FIG. 40 shows an example ten-data element by ten-data element data array selection of Band 13 as sourced from an AVIRIS hyperspectral data set;

FIG. 41 shows an example ten-data element by ten-data element data array selection of Band 20 as sourced from an AVIRIS hyperspectral data set;

FIG. 42 shows an example ten-data element by ten-data element data array selection of Band 173 as sourced from an AVIRIS hyperspectral data set;

FIG. 43 shows an example ten-data element by ten-data element data array selection of Band 200 as sourced from an AVIRIS hyperspectral data set;

FIG. 44 shows an example ten-data element by ten-data element data array selection of Band 13 containing the resultant algorithm values after evaluation of the original data array of FIG. 40 with the mean algorithm using the adjacent data element TDA;

FIG. 45 shows an example ten-data element by ten-data element data array selection of Band 13 containing the resultant algorithm values after evaluation of the original data array of FIG. 40 with the spread of values algorithm using the adjacent data element TDA;

FIG. 46 shows an example ten-data element by ten-data element data array selection of Band 20 containing the resultant algorithm values after evaluation of the original data array of FIG. 41 with the mean algorithm using the adjacent data element TDA;

FIG. 47 shows an example ten-data element by ten-data element data array selection of Band 20 containing the resultant algorithm values after evaluation of the original data array of FIG. 41 with the spread of values algorithm using the adjacent data element TDA;

FIG. 48 shows an example ten-data element by ten-data element data array selection of Band 173 containing the resultant algorithm values after evaluation of the original data array of FIG. 42 with the value algorithm using the adjacent data element TDA;

FIG. 49 shows an example ten-data element by ten-data element data array selection of Band 200 containing the resultant algorithm values after evaluation of the original data array of FIG. 43 with the value algorithm masked with 0xFFFC using the adjacent data element TDA;

FIG. 51 shows an example six-data element by six-data element data array selection of Band 13 as sourced from an AVIRIS hyperspectral data set;

FIG. 52 shows an example six-data element by six-data element data array selection of Band 20 as sourced from an AVIRIS hyperspectral data set;

FIG. 53 shows an example six-data element by six-data element data array selection of Band 173 as sourced from an AVIRIS hyperspectral data set;

FIG. 54 shows an example six-data element by six-data element data array selection of Band 200 as sourced from an AVIRIS hyperspectral data set;

FIG. 55 shows an example six-data element by six-data element data array selection of Band 13 containing the resultant algorithm values after evaluation of the original data array of FIG. 51 with the mean algorithm using the adjacent data element TDA;

FIG. 56 shows an example six-data element by six-data element data array selection of Band 13 containing the resultant algorithm values after evaluation of the original data array of FIG. 51 with the spread of values algorithm using the adjacent data element TDA;

FIG. 57 shows an example six-data element by six-data element data array selection of Band 20 containing the resultant algorithm values after evaluation of the original data array of FIG. 52 with the mean algorithm using the adjacent data element TDA;

FIG. 58 shows an example six-data element by six-data element data array selection of Band 20 containing the resultant algorithm values after evaluation of the original data array of FIG. 52 with the spread of values algorithm using the adjacent data element TDA;

FIG. 59 shows an example six-data element by six-data element data array selection of Band 173 containing the resultant algorithm values after evaluation of the original data array of FIG. 53 with the value algorithm using the adjacent data element TDA;

FIG. 60 shows an example six-data element by six-data element data array selection of Band 200 containing the resultant algorithm values after evaluation of the original data array of FIG. 54 with the value algorithm masked with 0xFFFC using the adjacent data element TDA;

DETAILED DESCRIPTION OF THE PREFERRED EMBODIMENT

Figure 1:
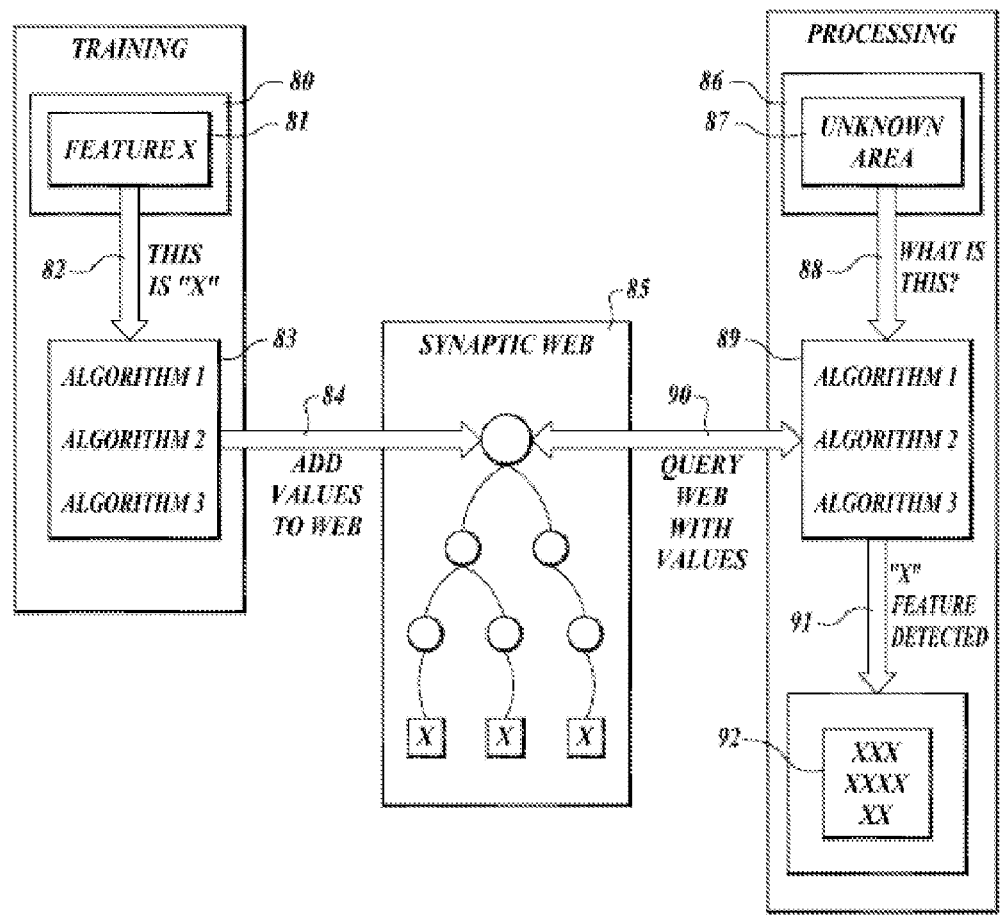
FIG. 1 shows an overview of one embodiment of an example data analysis and feature recognition system.

Although several of the following embodiments and examples of a data analysis and feature recognition system are described with reference to specific data types, such as multispectral and hyperspectral image data, the invention is not limited to analysis of these data types. The methods and systems as described herein can be used to recognize discrete features in one or a plurality of data sets or any other collection of information that can be represented in a quantifiable datastore.

The embodiments of a data analysis and feature recognition system described herein generally involve the analysis and organization of digital multispectral or hyperspectral data streams for the purpose of learning and repeatedly recognizing patterns and objects within the data. In some embodiments, the data organization structure used by the system involves a web (hereafter "synaptic web") of interconnected data fields used to describe the data elements of a defined object or feature.

As used herein, the term "datastore" carries its traditional meaning and refers to any software or hardware element capable of at least temporarily storing data. In one embodiment, the datastores referred to herein contain a plurality of known features represented by a plurality of synaptic webs with each synaptic web comprised of a plurality of synaptic leaves joined by synaptic paths.

As used herein, the term "target data element" (TDE) refers to a discrete portion of a larger data set in a given data stream or medium that is being evaluated for characteristics using evaluation algorithms and a given target data area. A TDE can be any size appropriate for a particular data type, modality, submodality, etc. For example, in an image data set, a TDE can consist of a single pixel. In several embodiments and regardless of size, a TDE is a "point" that is evaluated in a single discrete step before processing moves to the next valid TDE in the data set or selection therein.

As used herein, the term "target data area" (TDA) refers to an ordered collection of data elements immediately surrounding a TDE. In one embodiment, the size and shape of the TDA vary depending upon the type of data or medium that is evaluated, user specifications, and/or industry- or system-acceptable standards and functions to define the member data elements available for inclusion during evaluation of a given TDE.

As used herein, the term "known feature" (KF) refers to an element of data representing an entity, item, object, pattern, or other discretely definable piece of information known to be present in a particular data set during training. At the time of processing, the system searches a new data set for one or more of the previously trained known features.

As used herein, the term "synaptic web," which is also embodied herein in the form of an algorithm datastore, refers to an organizational structure for storing information about discrete features, patterns, objects, or other known data sets in an implementation such as a rooted, fixed depth tree, a binary tree, or some other acceptable user-specified, preset, or automatically determined structure. A synaptic web advantageously allows the information about the known feature(s) to be quickly added and an unknown data set to be quickly evaluated in order to identify any known features contained therein.

As used herein, the term "synaptic leaf" refers to a terminal node in a synaptic web that represents a plurality of known features identified by the set of algorithm values used to reach the leaf.

As used herein, the term "synaptic path" refers to an evaluation pathway built from a plurality of algorithm values resulting from the analysis of a given TDE with a set of evaluation algorithms and a TDA. The synaptic path is used to reach a synaptic leaf based upon algorithmic calculations for a TDE.

As used herein, the term "training event" refers to the process of associating a plurality of algorithm values and data patterns from a given data set or selection therein to a particular known feature by establishing and/or updating synaptic paths and synaptic leaves as stored in a user-specified, preset, or automatically determined organizational storage structure, such as a synaptic web or algorithm datastore.

As used herein, the term "algorithm" carries its traditional meaning and refers without limitation to any series of repeatable steps resulting in a discrete value. In one embodiment, an algorithm is any mathematical calculation. In several embodiments, various algorithms are performed on a TDE in relation to a previously defined TDA in order to produce a single, meaningful value.

As used herein, the term "positive training value sets" refers to the sets of algorithm values that are located within the area of data trained as the user-defined known feature.

As used herein, the term "negative training value sets" refers to the sets of algorithm values that are located outside the area of data trained as the user-defined known feature and that are typically used to identify training values unique to the positive training value sets.

As used herein, the term "area training" refers to a process used during a training event whereby each set of algorithm values found in a positive training value set (i.e., all data patterns within the current selection) is used to generate synaptic paths for the known feature.

As used herein, the term "area untraining" refers to a process used during an untraining event whereby each set of algorithm values found in a positive training value set (i.e., all data patterns within the current selection) is dissociated from the known feature.

As used herein, the term "relative adjusted training" refers to a process used during a training event whereby each set of algorithm values found in a negative training value set nullifies one matching set of algorithm values found in the positive training value set. The remaining positive training value sets can then be used to generate synaptic paths (i.e., training entry value sets) for the known feature.

As used herein, the term "absolute adjusted training" refers to a process used during a training event whereby each set of algorithm values found in a negative training value set nullifies all matching sets of algorithm values found in the positive training value set. The remaining positive training value sets can then be used to generate synaptic paths (i.e., training entry value sets) for the known feature.

As used herein, the term "hit detection" refers to a method for determining whether a known feature is present in a test data set based upon matching a synaptic path encountered during processing with any path in the synaptic web that is trained for the known feature.

As used herein, the term "cluster detection" refers to a method of determining whether a known feature is present in a test data set based upon both hit detection and the detection of a specified number of additional known feature hits within a pre-defined "cluster range" of the TDE.

As used herein, the term "cluster range" refers to a set of data elements surrounding a given centralized data element or TDE over which a known feature is evaluated. In one embodiment, the cluster range is a number representing an actual physical distance, in the sense of radius or norm in, over which the known feature operates, while in an alternate embodiment it represents a mathematical relationship between the known feature hit locations. In either embodiment, the cluster range is dictated by the topology and dimensionality of the data set or selection therein that is being processed.

As used herein, the term "threshold detection" refers to a method for determining whether a known feature is present in a test data set based upon both hit detection and the number of times the synaptic path, which is used in hit detection, is trained as the known feature.

As used herein, the term "(data) modality" retains its traditional meaning and refers to one of the various different forms or formats of digital data that can be processed. For example, image data represents one modality, while sound data represents another. In addition to describing data types that conform to one or more human sensory modalities, the term is also intended to encompass data types and formats that might have little or no relation to the human senses. For example, financial data, demographic data, and literary data also represent modalities within the meaning of the term as used herein.

As used herein, the term "(data) submodality" refers to a sub-classification of a data modality. In some embodiments, a submodality refers to one of the applications or sources for the data that can affect how the data is processed. For example, X-ray and satellite photography are submodalities of the imaging modality. Moreover, systems manufactured by different vendors (e.g., GENERAL ELECTRIC, SIEMENS) but used for producing X-ray images can vary enough in their data formats to require distinction into different submodalities.

FIG. 1 shows one embodiment of an overview of an example data analysis and feature recognition system that is configured to accept an original source data set 80 or selection therein containing one or a plurality of known and pre-identified features 81 (e.g., a known pattern, shape, object, or entity). The system is generally configured such that the user "trains" 82 said system to recognize the known feature 81 via the execution of one or a plurality of evaluation algorithms in association with a particular TDA. These algorithms and the TDA are used in concert to assess 83 the representative data of the given data set selection 80 in order to identify unique sets of algorithm values and data patterns characterizing the feature(s) 81. In one embodiment, once training of all known features 81 is complete, the training values defining said features are stored 84 in an organizational structure, such as a synaptic web 85, which is comprised of a plurality of synaptic leaves interconnected by a plurality of synaptic paths, or an algorithm datastore. In one embodiment, once the system has been trained for a known feature(s) 81, a new data set selection 86 containing an unknown set of features 87 is presented to the system for subsequent analysis 88. The same pluralities of evaluation algorithms and the same TDA as are used during preliminary known feature training are then called to evaluate 89 the new data set selection. The resultant algorithmically determined data values and patterns are subsequently compared 90 to the previously identified and stored algorithm values and data patterns 85 for the purpose of positively identifying any previously trained known features contained therein. In one embodiment, the results of this known feature processing exercise are then stored in another organizational storage structure, such as a known feature data output overlay, which is sized and addressed in the same manner as the original data set or selection therein, for retrieval at a future time if needed. In one embodiment, once a known feature(s) is found in the new data set, the system notifies 91 the user as to the identification of said feature(s) and/or presents a representation 92 (e.g., a graphical image, an audible sound) of the known feature(s) to the user.

Figure 2:
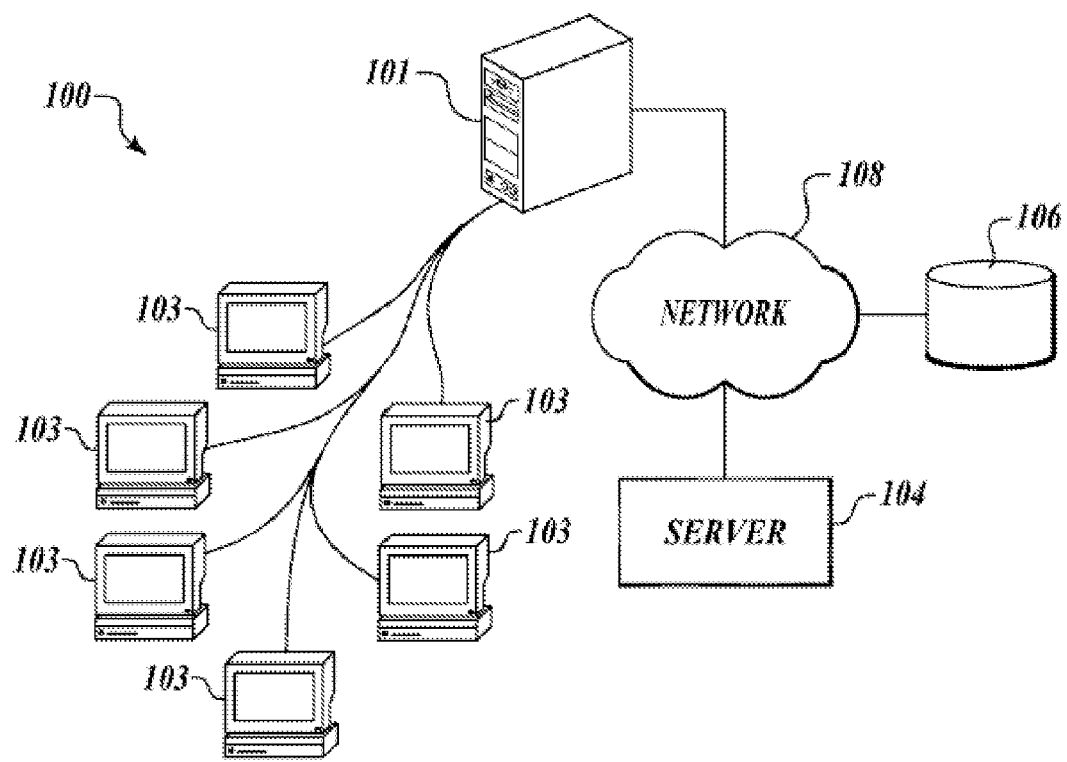
FIG. 2 shows one embodiment of an example system for executing data analysis and feature recognition.

FIG. 2 shows an example system 100 for executing data analysis and feature recognition. In one embodiment, the system 100 includes a single computer 101. In an alternate embodiment, the system 100 includes a computer 101 in communication with a plurality of other computers 103. In an alternate embodiment, the computer 101 is connected with a plurality of other computers 103, a server 104, a datastore 106, and/or a network 108, such as an intranet or the Internet. In yet another embodiment, a bank of servers, a wireless device, a cellular telephone, and/or another data capture/entry device(s) is used in place of the computer 101. In one embodiment, a data storage device 106 stores a data analysis and feature recognition datastore. The datastore 106 can be stored locally at the computer 101 or at any remote location while remaining retrievable by the computer 101. In one embodiment, an application program, which can create the datastore 106, is run by the server 104 or by the computer 101. In one embodiment, the computer 101 or server 104 includes an application program(s) that trains a known feature and/or identifies a previously defined known feature in digital data media. In one embodiment, the medium is one or a plurality of image pixels or at least one sound recording sample.

Figure 3:
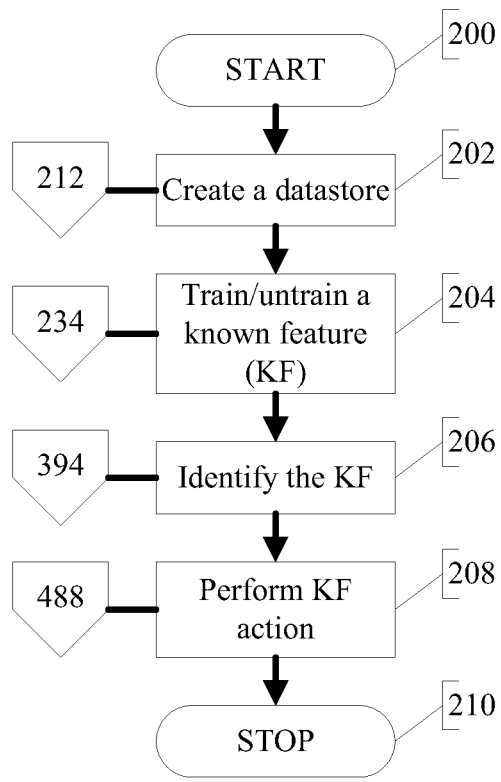
FIG. 3 shows an example method for using a data analysis and feature recognition system.

FIG. 3 shows a method formed in accordance with an embodiment of the present invention. The method initializes at block 200, and at block 202 a datastore is created. This is described in more detail with reference to FIGS. 4-5. At block 204, a known feature is trained or untrained into the datastore. This is described in more detail with reference to FIGS. 6-15. At block 206, the known feature is identified. This is described in more detail with reference to FIGS. 16-20. At block 208, an associated known feature action(s)-on-detection is performed. This is described in more detail with reference to FIGS. 21-22. At block 210, the method for creation and processing of a known feature(s) is complete.

Figure 4:
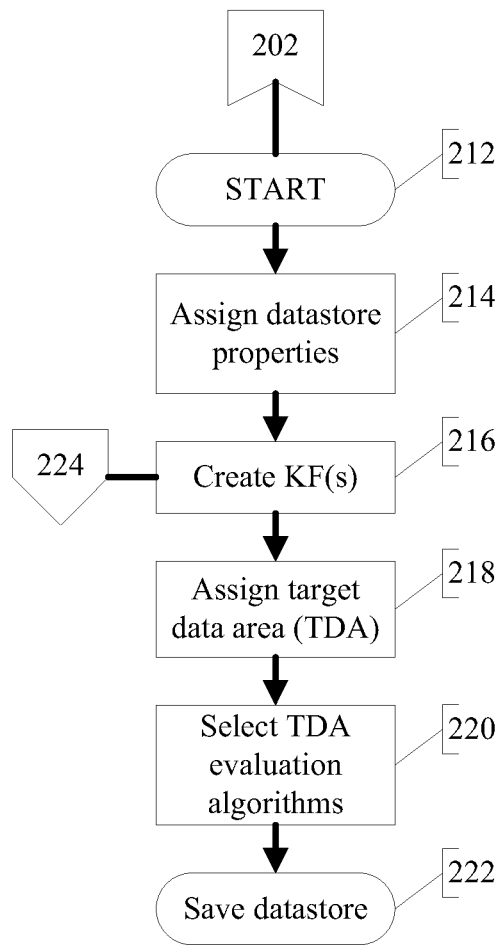
FIG. 4 shows an example method for creating a datastore.

FIG. 4 shows an example method 202 for creating a datastore. The method 202 initializes at block 212, and at block 214 a plurality of datastore properties are assigned. In one embodiment, the datastore properties include declaration of the data modality and/or submodality. In one embodiment, at block 216 a known feature(s) is created. This is described in more detail with reference to FIG. 5. In one embodiment, at block 218 a TDA shape is assigned. The TDA used during data analysis and feature recognition can exist in any applicable geometric configuration, shape, or pattern, can contain any number of applicable dimensions, and can consist of any number of data elements. One example of a TDA to be used in association with the multispectral or hyperspectral imaging modality is a pattern of near and far neighboring pixels surrounding a single, centralized TDE. In another example, the TDA exists in a starburst-like pattern of eight, three-pixel radials surrounding a TDE (hereafter "starburst 8×3 TDA").

In one embodiment, at block 220 of FIG. 4 the TDA evaluation algorithms are selected. In one embodiment, the methods and systems for data analysis and feature recognition as disclosed herein draw from a plurality of acceptable user-specified, preset, or automatically determined evaluation algorithms in order to characterize the original data set or selection therein. In an alternate embodiment, the TDA evaluation algorithms to be used are determined based upon the TDA selected for use. In another embodiment, an automated process is used to decipher the "best available" TDA and/or evaluation algorithm(s) for use in the analysis of the original data set or selection therein. Here, the "best available" TDA and/or evaluation algorithm(s) possess any of the following characteristics, which are important or relevant to evaluation of the subject data set or selection therein, including inter alia increased efficiency, productivity, and/or specificity and reduced cost with regard to time and/or processing requirements. In yet another embodiment, the evaluation algorithm(s) are masked, divided, etc., so as to decrease the specificity of the resultant algorithm values and patterns.

At block 222 of FIG. 4, the datastore 106 is saved to the computer 101 or the network 108, and the method 202 is complete. Blocks 214, 216, and the combination of blocks 218 and 220 can be executed in any order.

Figure 5:
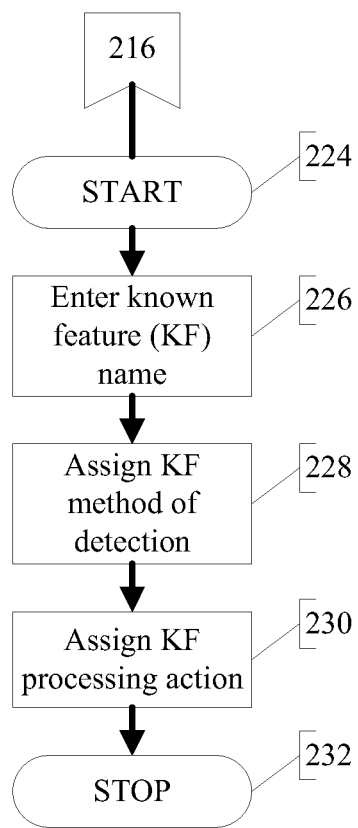
FIG. 5 shows an example method for creating a known feature.

FIG. 5 shows an example method 216 for creating a known feature. The method 216 initializes at block 224, and at block 226 a name for the known feature is entered into the system by the user. In one embodiment, at block 228 the known feature method of detection attribute is assigned. In one embodiment, the method of detection is selected as hit detection, while in alternate embodiments cluster detection, threshold detection, or cluster and threshold detection are selected. In one embodiment, at block 230 of FIG. 4 the known feature processing action-on-detection is assigned In one embodiment, this processing action is the method of notification used to alert the user when a known feature is positively identified for a given data element within the subject data set or selection therein. In one embodiment, the user chooses to execute no processing action; to play a user-specified, preset, or automatically determined sound; to paint pluralities of activated data elements a user-specified, preset, or automatically determined color; or to execute another acceptable user-specified, preset, or automatically determined action. At block 232, the method 216 is complete. Blocks 226, 228, and 230 can be executed in any order.

Figure 6:
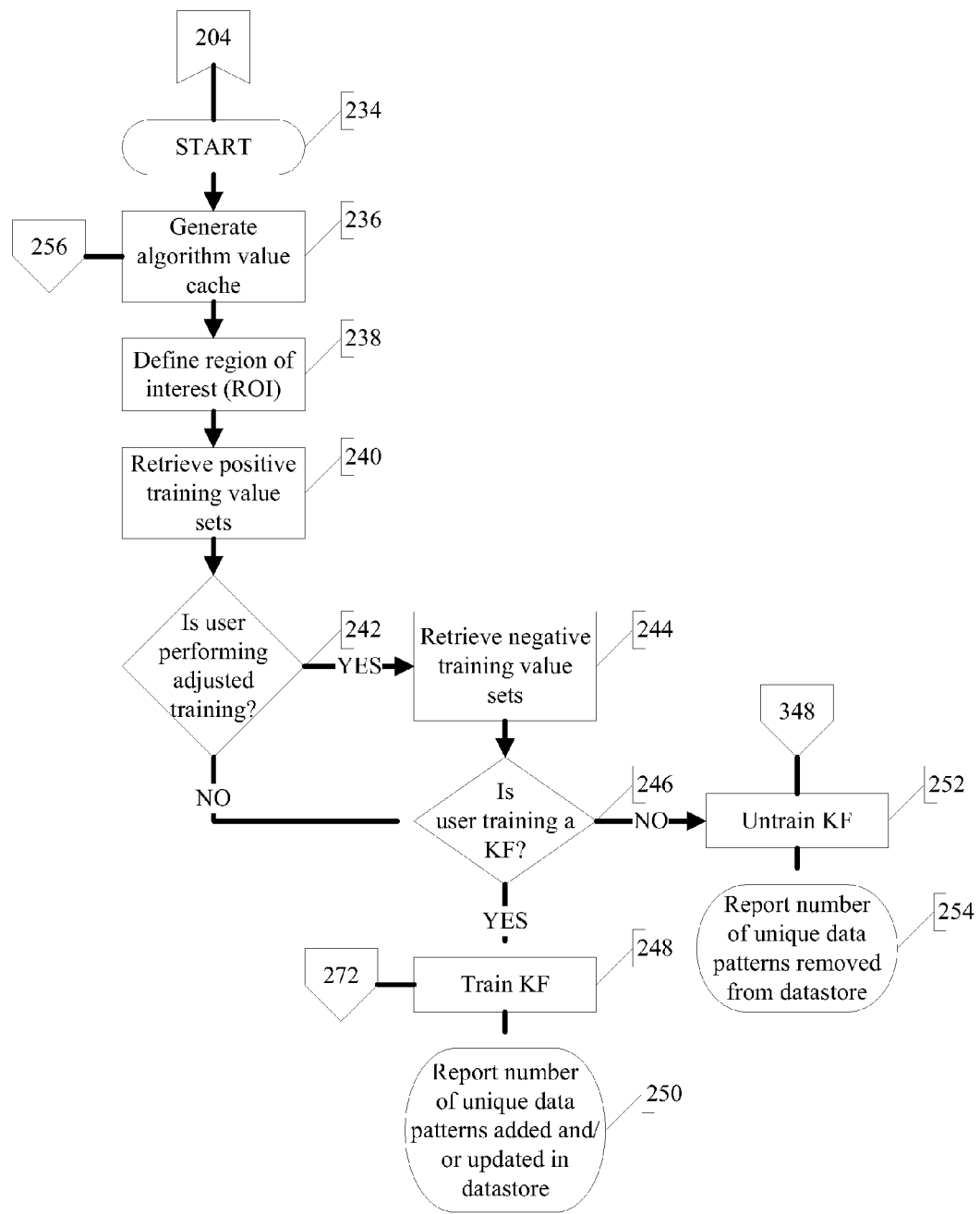
FIG. 6 shows an example method for modifying a synaptic web by training or untraining a known feature.

FIG. 6 shows an example method 204 for modifying a synaptic web by training or untraining a known feature. In one embodiment, the method 204 initializes at block 234, and at block 236 an algorithm value cache is generated. This is described in more detail with reference to FIG. 7. At block 238, a region of interest (hereafter "ROI"), which is an area of data within the original data set or selection therein that is known to contain the feature to be trained or untrained, is defined by the user. At block 240, the positive training value sets are retrieved. In one embodiment, at block 242 a decision is made as to whether the user is performing adjusted training of the feature. In some circumstances, limitations in the ability of the user to finely tune a region of interest can cause some of the positive training value sets to actually contain portions of the data that the user knows should not be trained as the current known feature. Such occurrences are handled by adjusted training, which can be selected by the user as the method for training. In a given multispectral or hyperspectral image, this area outside the region of interest is often the background or noise area that the user does not wish to train as the known feature. By identifying these negative training value sets, those sets of algorithm values that are not associated with the current known feature but exist within the region of interest can be removed. If YES at block 242, at block 244 the negative training value sets are retrieved, and the method 204 proceeds to block 246. If NO at block 242, the method 204 proceeds to block 246.

In one embodiment, at block 246 of FIG. 6 a decision is made as to whether the user is training a known feature. If YES at block 246, at block 248 the known feature is trained. This is described in more detail with reference to FIGS. 8-12. In one embodiment, at block 250 the number of unique synaptic paths (i.e., algorithm values and data patterns) added to and/or updated in the synaptic web is reported, and the method 204 is complete.

If NO at block 246 of FIG. 6, at block 252 a known feature is untrained. This is described in more detail with reference to FIGS. 13-15. In one embodiment, at block 254 the number of unique synaptic paths removed from the synaptic web is reported, and the method 204 is complete. Blocks 236 and 238 can be executed in any order. Block 240 and the combination of blocks 242 and 244 can be executed in any order.

Figure 7:
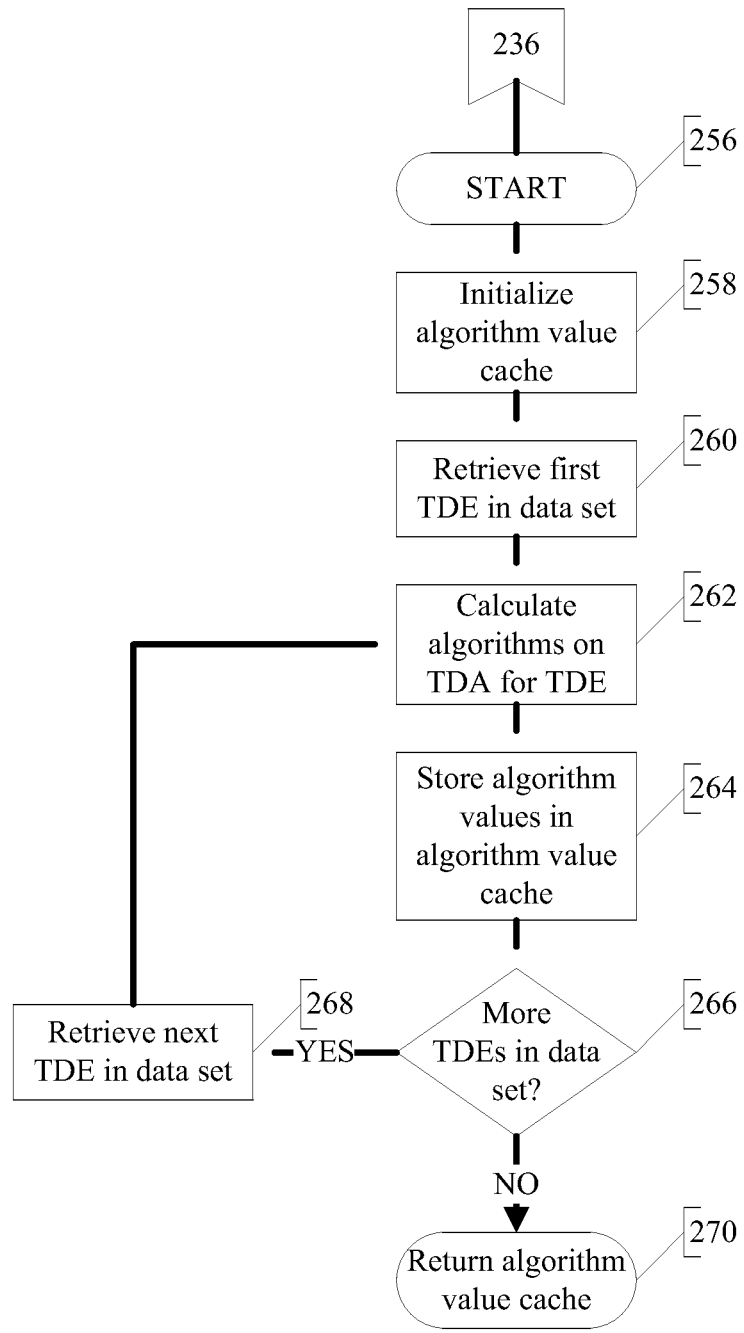
FIG. 7 shows an example method for generating an algorithm value cache.

FIG. 7 shows an example method 236 for generating and populating an algorithm value cache. In one embodiment, an algorithm value cache, which is sized and addressed in the same manner as the original data set or selection therein, consists of a data array to store the numerical results of the evaluation algorithm training or analysis processes. The method 236 initializes at block 256, and at block 258 an algorithm value cache is initialized. At block 260, the first TDE in the current data set or selection therein is retrieved. At block 262, the algorithm values are calculated on the TDA for the TDE. At block 264, the resultant algorithm values are stored in the algorithm value cache at the location specified by the subject TDE. At block 266, a decision is made as to whether there are more TDEs to analyze in the current data set or selection therein. If YES at block 266, at block 268 the next TDE in the data set or selection therein is retrieved, and the method 236 returns to block 262. If NO at block 266, the completed algorithm cache is returned, and the method 236 is complete.

Figure 8:
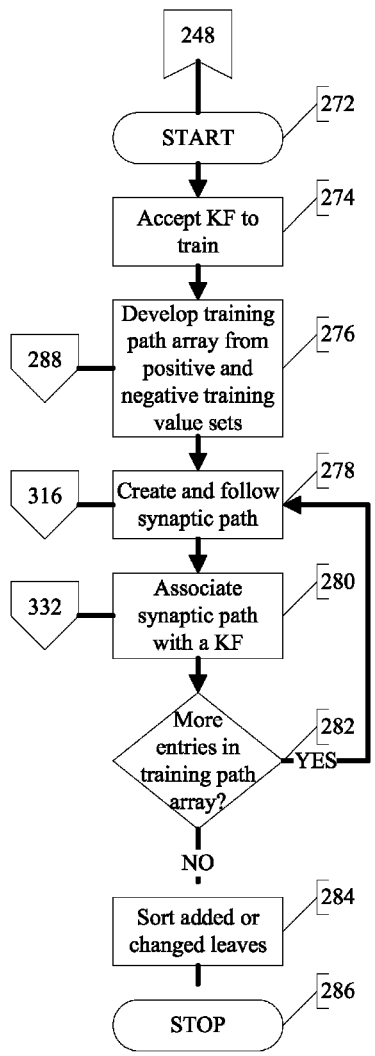
FIG. 8 shows an example method for training a known feature.

FIG. 8 shows an example method 248 for training a known feature. The method 248 initializes at block 272, and at block 274 a known feature to be trained is accepted from the user. At block 276, the training synaptic path array is developed from the positive and negative training value sets, which are determined at FIG. 6. This is described in more detail with reference to FIGS. 9-10. At block 278, a new synaptic path is created and followed. This is described in more detail with reference to FIG. 11. At block 280, the synaptic path is associated with a known feature. This is described in more detail with reference to FIG. 12. At block 282, a decision is made as to whether there are more entries remaining in the training synaptic path array. If YES at block 282, the method 248 returns to block 278. If NO at block 282, at block 284 the training counts are updated. In one embodiment, this is accomplished by sorting the added or changed synaptic leaves. At block 286, the method 248 is complete. Blocks 274 and 276 can be executed in any order. Blocks 282 and 284 can be executed in any order.

Figure 9:
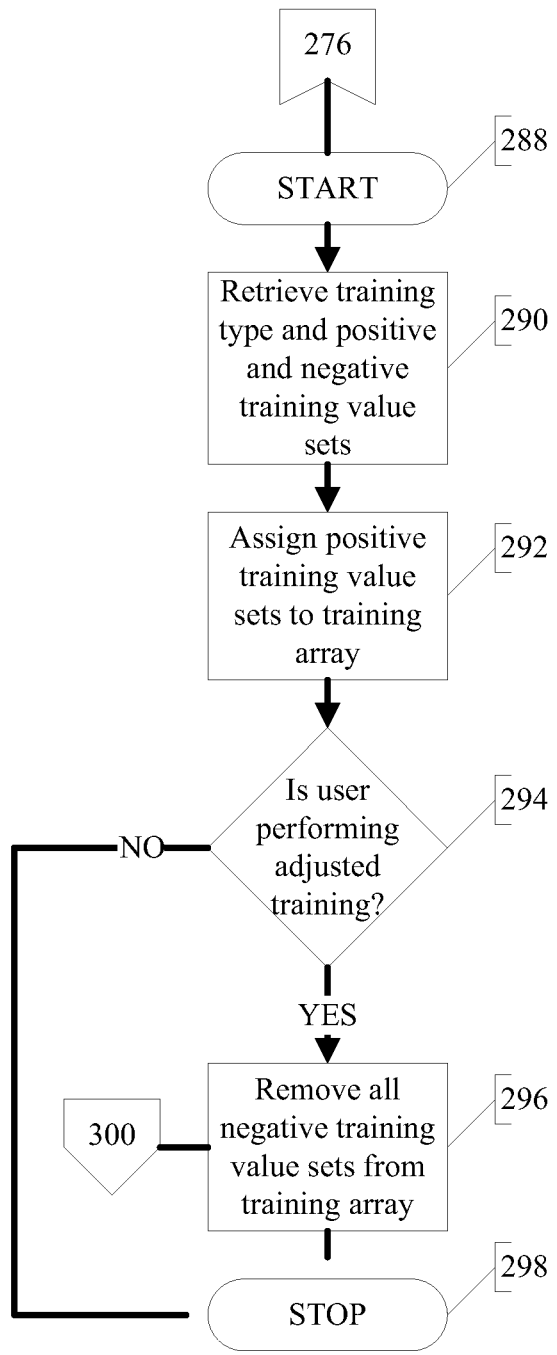
FIG. 9 shows an example method for creating a collection of synaptic training paths from positive and negative training value sets.

FIG. 9 shows an example method 276 for developing a training synaptic path array from positive and negative training value sets, which are determined at FIG. 6. The method 276 initializes at block 288, and at block 290 a training type and the positive and negative training value sets are retrieved. In one embodiment, the known feature training types include: area training, which functions to associate all data patterns within the current data set or selection therein to a given known feature; area untraining, which functions to dissociate all data patterns within the current data set or selection therein from a given known feature; absolute adjusted training, which takes any occurrence of a data pattern for a given known feature that is found outside the current data set or selection therein and removes all occurrences of the same data pattern that are found inside the current data set or selection therein; and relative adjusted training, which takes each occurrence of a data pattern for a given known feature that is found outside the current data set or selection therein and nullifies only one occurrence of the same data pattern that is found inside the current data set or selection therein. In the preferred embodiment, the user selects the method of training that is optimal for the specific data type, modality, submodality, etc., and sample quality.

At block 292 of FIG. 9, the positive training value sets are assigned to the training synaptic path array. At block 294, a decision is made as to whether the user is performing adjusted training. If YES at block 294, at block 296 all the negative training value sets are removed from the training synaptic path array. This is described in more detail with reference to FIG. 10. The method 276 then proceeds to block 298. If NO at block 294, at block 298 the method 276 for developing the training synaptic path array is complete.

Figure 10:
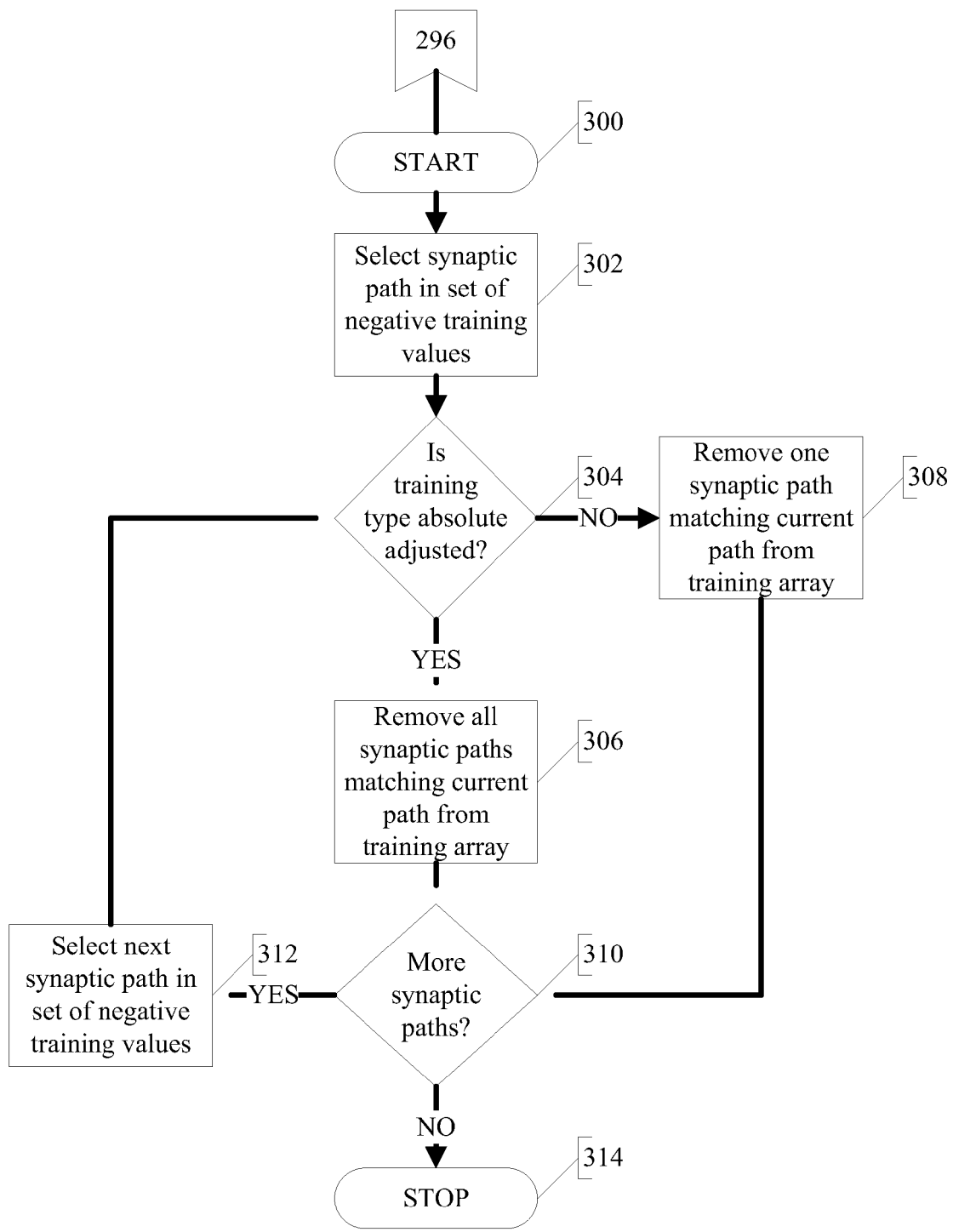
FIG. 10 shows an example method for removing negative training value sets from the collection of training paths.

FIG. 10 shows an example method 296 for removing the negative training value sets from the training synaptic path array; otherwise stated, FIG. 10 shows an example method 296 for performing adjusted training. In one embodiment, relative or absolute adjusted training, as described previously at FIG. 9, are available for use. The method 296 initializes at block 300, and at block 302 a synaptic path in a set of negative training value sets is selected. At block 304, a decision is made as to whether the training type is set to absolute adjusted training. If YES at block 304, at block 306 all training synaptic paths matching the current training synaptic path are removed from the training synaptic path array, and the method 296 proceeds to block 310. If NO at block 304, at block 308, one training synaptic path matching the current training synaptic path is removed from the training synaptic path array, and the method 296 proceeds to block 310.

At block 310 of FIG. 10, a decision is made as to whether there are more training synaptic paths remaining in the set of negative training values. If YES at block 310, at block 312, the next training synaptic path in the set of negative training values is selected, and the method 296 returns to block 304. If NO at block 310, at block 314 the method 296 is complete.

Figure 11:
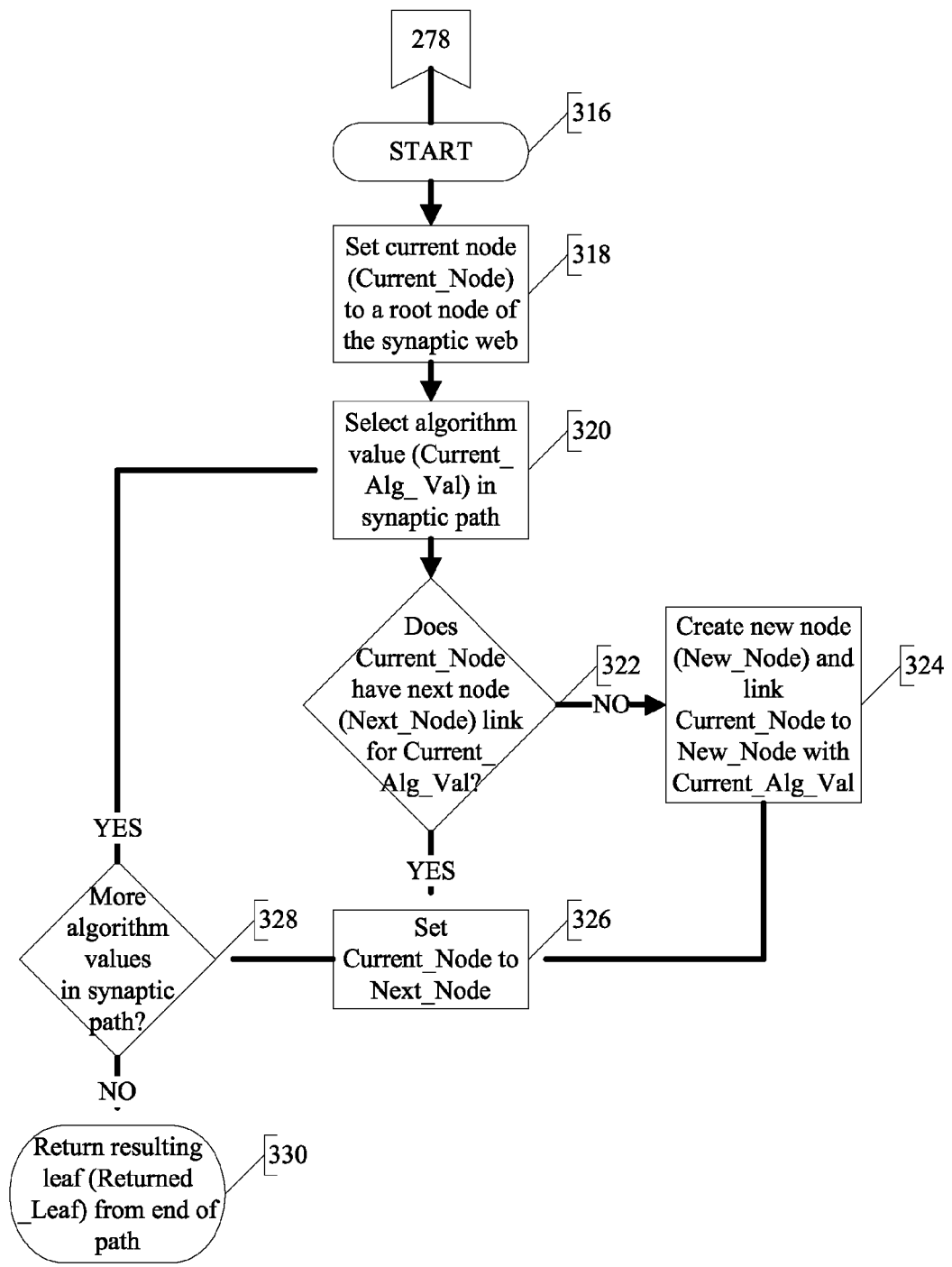
FIG. 11 shows an example method for creating and following a synaptic path from a training synaptic path array.

FIG. 11 shows an example method 278 for creating and following a synaptic path from a training synaptic path array. The method 278 initializes at block 316, and at block 318 the current node (hereafter "Current_Node") is set to a root node of the synaptic web. At block 320, an algorithm value (hereafter "Current_Alg_Val") in a synaptic path is selected. At block 322, a decision is made as to whether the Current_Node has a next node (hereafter "Next_Node") link for the Current_Alg_Val. If YES at block 322, the method 278 proceeds to block 326. If NO at block 322, at block 324 a new node (hereafter "New_Node") is created, and the Current_Node is linked to the New_Node via the Current_Alg_Val. The method 278 then proceeds to block 326.

At block 326 of FIG. 11, the Current_Node is set to the Next_Node. At block 328, a decision is made as to whether there are more algorithm values remaining in the synaptic path. If YES at block 328, the method 278 returns to block 320. If NO at block 328, at block 330 the resulting synaptic leaf (hereafter "Returned_Leaf") is returned from the end of the synaptic path, and the method 278 is complete.

Figure 12:
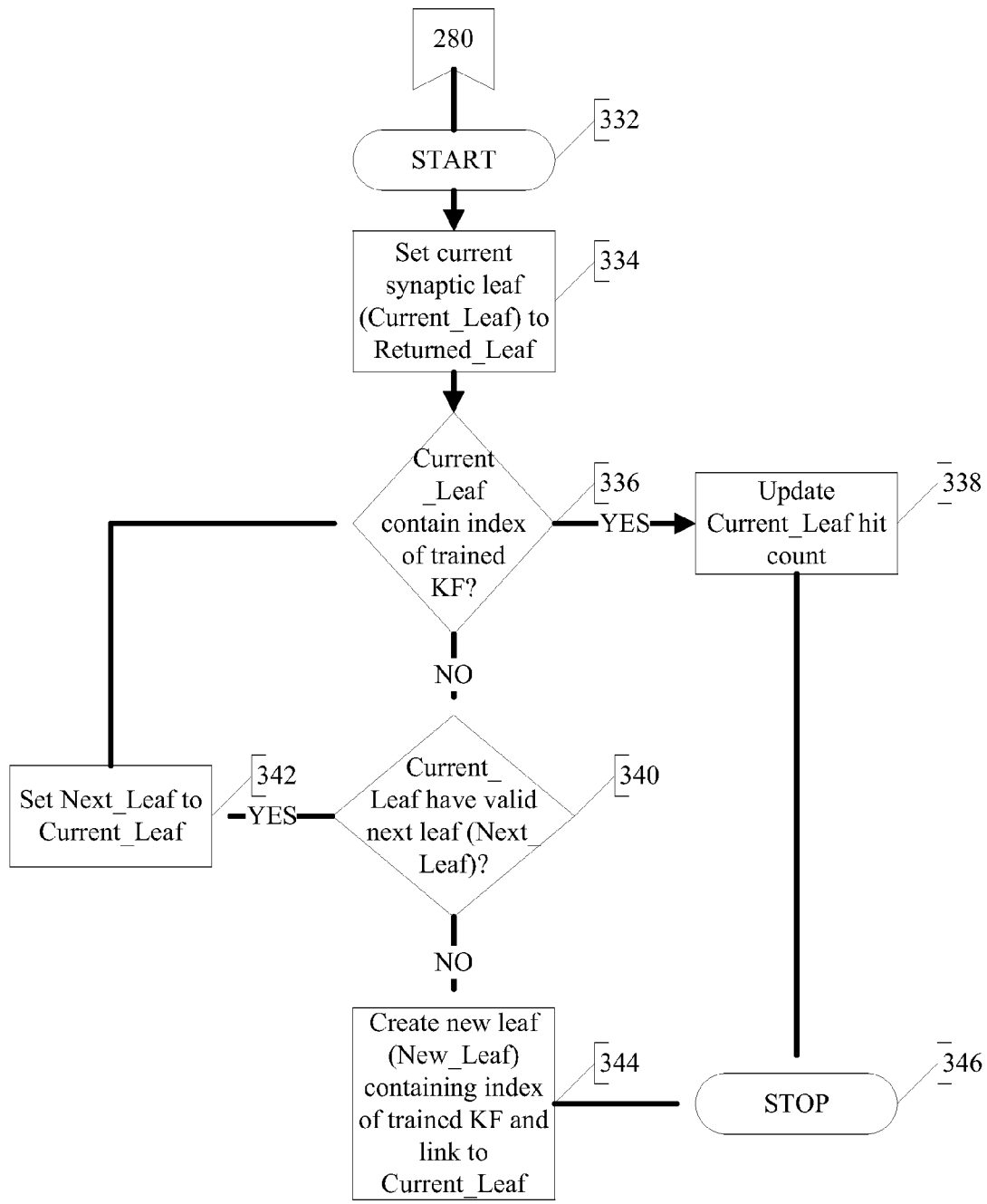
FIG. 12 shows an example method for associating a synaptic path with a known feature.

FIG. 12 shows an example method 280 for associating the synaptic path with a known feature. The method 280 initializes at block 332, and at block 334 a current synaptic leaf (hereafter "Current_Leaf") is set to the Returned_Leaf (from block 330 of FIG. 11). At block 336, a decision is made as to whether the Current_Leaf contains the index value of the trained known feature. If YES at block 336, at block 338 the hit count of the Current_Leaf is updated, and the method 280 proceeds to block 346. If NO at block 336, at block 340 a decision is made as to whether the Current_Leaf has a valid next synaptic leaf (hereafter "Next_Leaf"). If YES at block 340, at block 342 the Next_Leaf is set to the Current_Leaf, and the method 280 returns to block 336. If NO at block 340, at block 344 a new synaptic leaf (hereafter "New_Leaf"), which contains the index value of the trained known feature, is created and linked to the Current_Leaf. At block 346, the method 280 is complete.

Figure 13:
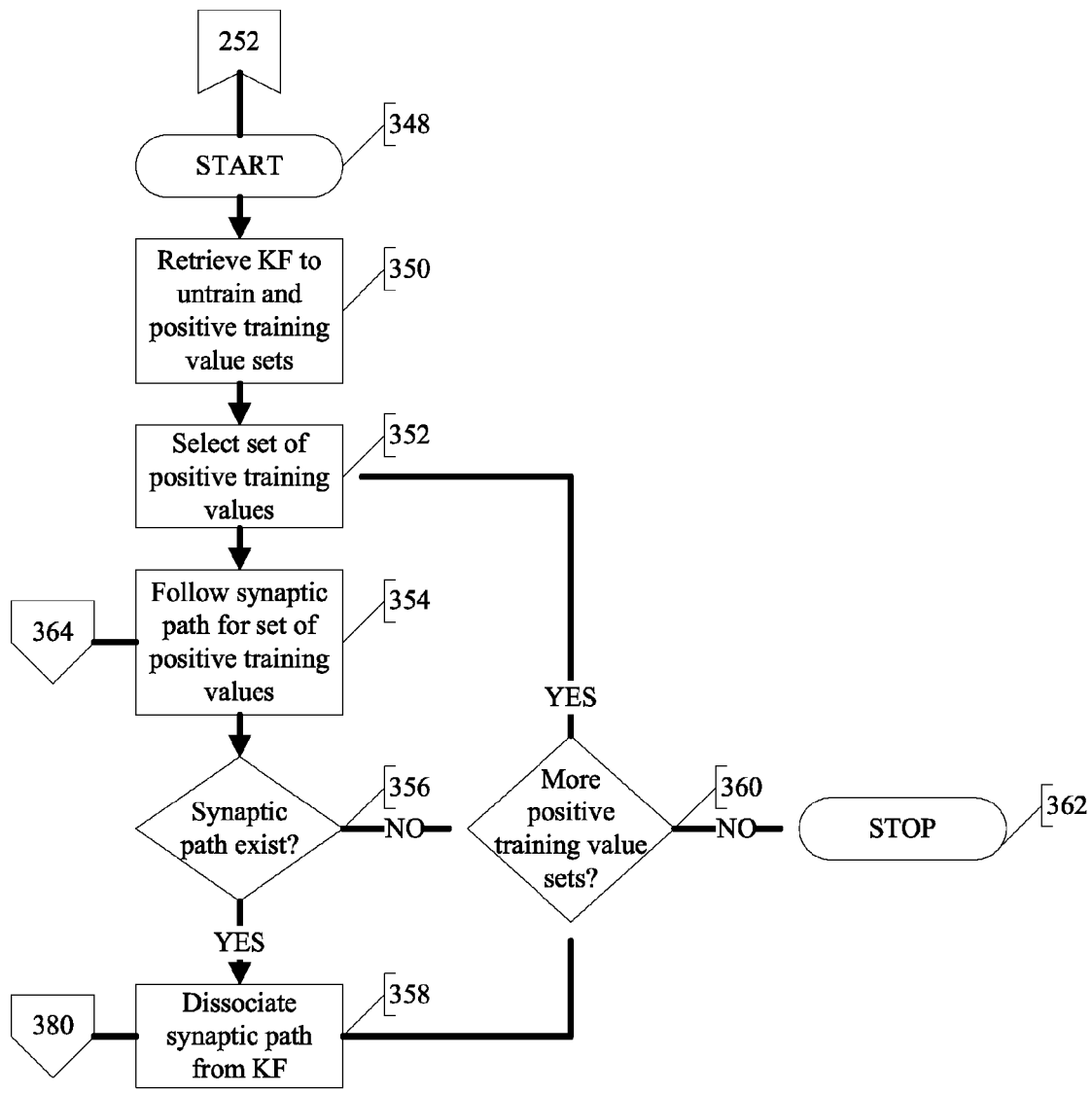
FIG. 13 shows an example method for untraining a known feature.

FIG. 13 shows an example method 252 for untraining a known feature. The method 252 initializes at block 348, and at block 350 a known feature to be untrained and a plurality of positive training value sets, which are determined at FIG. 6, are retrieved. At block 352, a set of positive training values is selected. At block 354, the synaptic path for the set of positive training values is followed. This is described in more detail with reference to FIG. 14. At block 356, a decision is made as to whether the synaptic path exists within the training synaptic path array. If YES at block 356, at block 358 the synaptic path is dissociated from the known feature. This is described in more detail with reference to FIG. 15. The method 252 then proceeds to block 360. If NO at block 356, at block 360 a decision is made as to whether there are more positive training value sets remaining in the plurality of positive training value sets retrieved at block 350. If YES at block 360, the method 252 returns to block 352. If NO at block 360, at block 362 the method 252 is complete.

Figure 14:
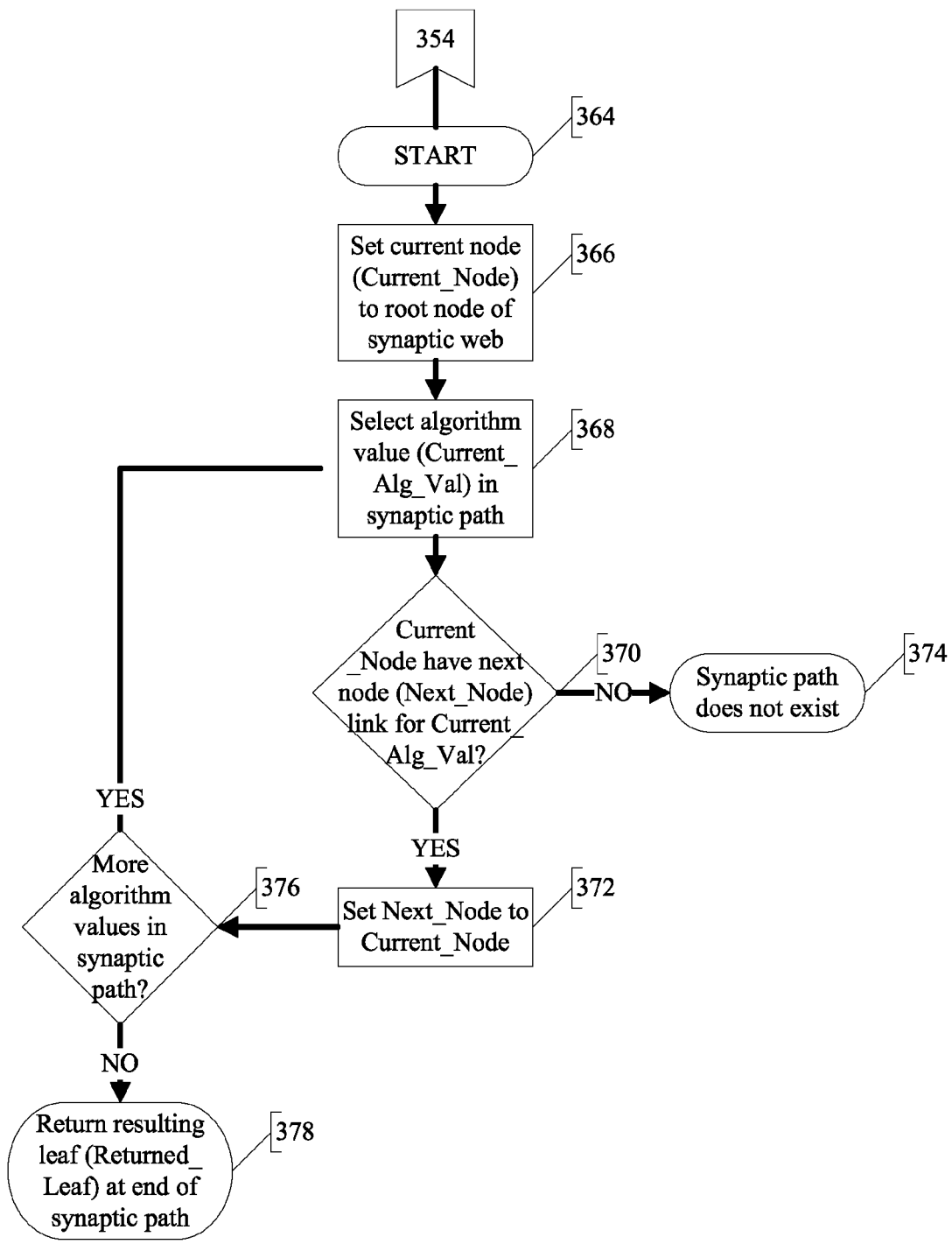
FIG. 14 shows an example method for using a set of algorithm values to retrieve a synaptic leaf in the synaptic web.

FIG. 14 shows an example method 354 for following a synaptic path for a set of positive training values in order to identify a synaptic leaf based upon a set of algorithm values. The method 354 initializes at block 364, and at block 366 the Current_Node is set to a root node of the synaptic web. At block 368, the Current_Alg_Val for the Current_Node of the synaptic path is selected. At block 370, a decision is made as to whether the Current_Node has a Next_Node link for the Current_Alg_Val. If YES at block 370, at block 372 the Next_Node is set to the Current_Node, and the method 354 proceeds to block 376. If NO at block 370, at block 374 the synaptic path does not exist, and the method 354 is complete.

At block 376 of FIG. 14, a decision is made as to whether there are more algorithm values remaining in the synaptic path. If YES at block 376, the method 354 returns to block 368. If NO at block 376, at block 378 the resulting synaptic leaf (hereafter "Returned_Leaf") is returned at the end of the synaptic path, and the method 354 is complete.

Figure 15:
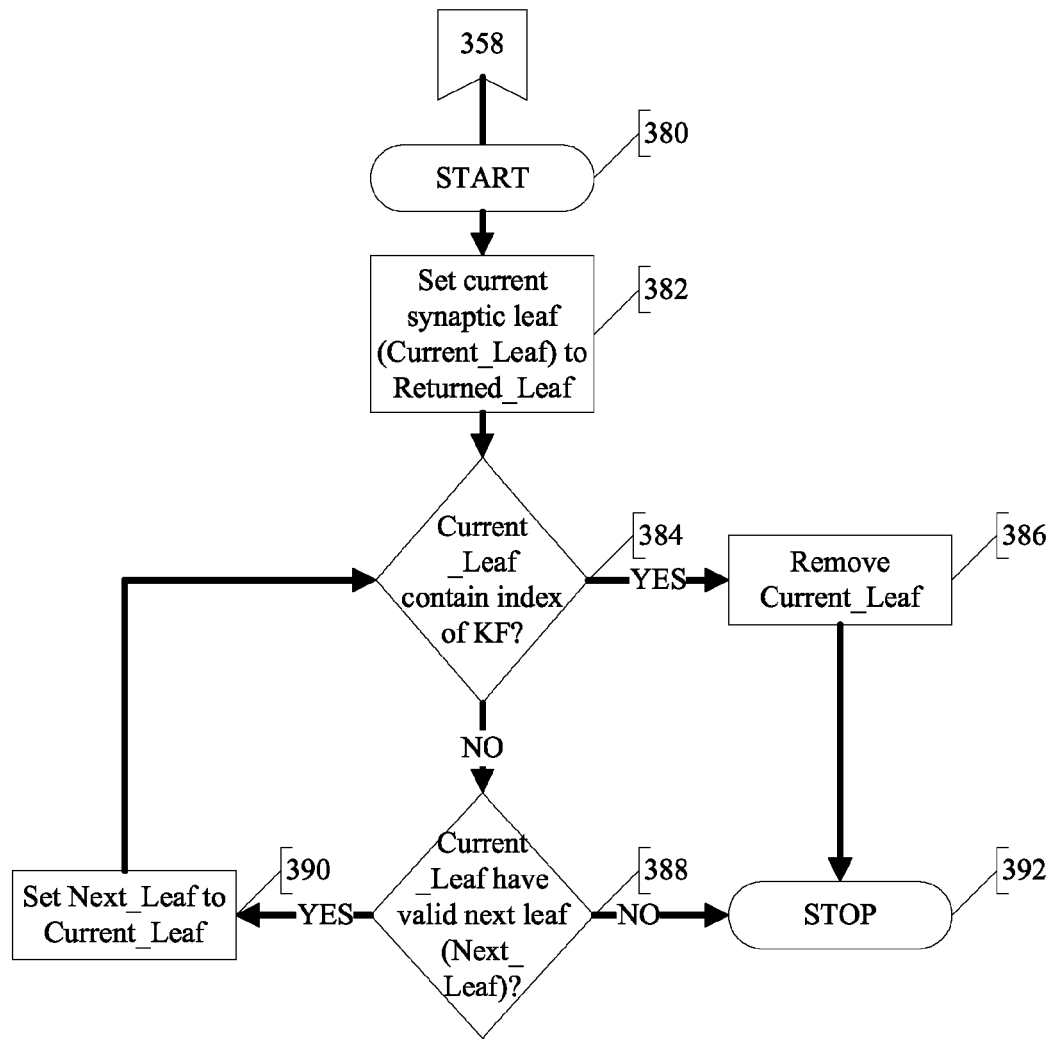
FIG. 15 shows an example method for dissociating a synaptic leaf from a known feature.

FIG. 15 shows an example method 358 for dissociating a synaptic leaf from a known feature. The method 358 initializes at block 380, and at block 382 the Current_Leaf is set to the Returned_Leaf (from block 378 of FIG. 14). At block 384, a decision is made as to whether the Current_Leaf contains the index value of the trained known feature. If YES at block 384, at block 386 the Current_Leaf is removed from the synaptic path, and the method 358 proceeds to block 392. If NO at block 384, at block 388 a decision is made as to whether the Current_Leaf has a valid Next_Leaf. If YES at block 388, at block 390 the Next_Leaf is set to the Current_Leaf, and the method 358 returns to block 384. If NO at block 388, at block 392 the method 358 is complete.

Figure 16:
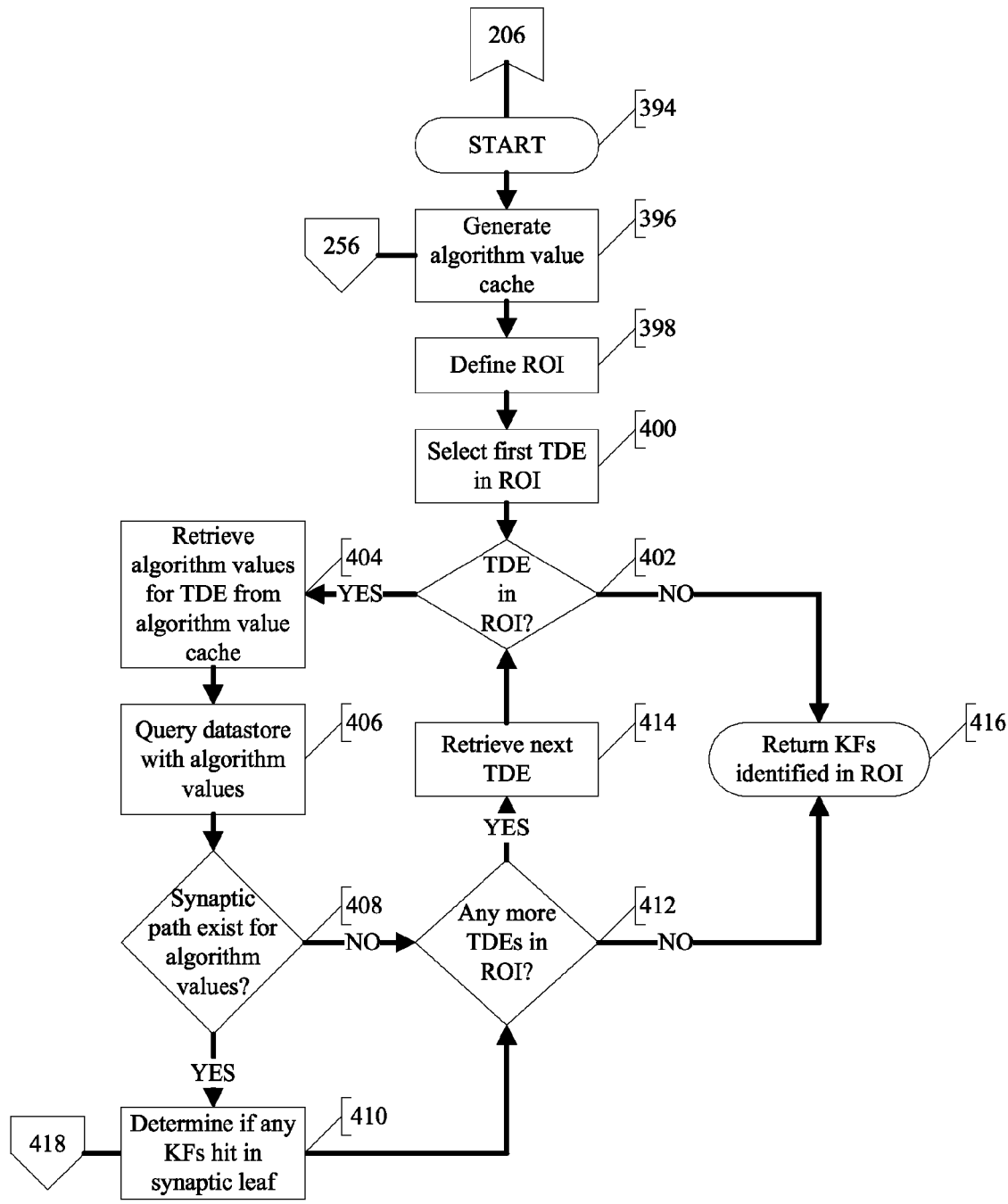
FIG. 16 shows an example method for identifying a known feature(s)

FIG. 16 shows an example method 206 for identifying a known feature in a given data set or selection therein. In one embodiment, the method 206 initializes at block 394, and at block 396 an algorithm value cache is generated. This is described in more detail with reference to FIG. 7. At block 398, a region of interest within the data set or selection therein is defined by the user. At block 400, the first TDE in the data set or selection therein is selected. At block 402, a decision is made as to whether the TDE is located within the selected region of interest. If YES at block 402, the method 206 proceeds to block 404. If NO at block 402, the method 206 proceeds to block 416.

At block 404 of FIG. 16, the algorithm values for the TDE are retrieved from the algorithm value cache; if the algorithm value cache is unavailable, the algorithm values are calculated for the TDE. At block 406, the synaptic web is queried with the algorithm values. (Reference FIG. 14.) At block 408, a decision is made as to whether a synaptic path exists for the algorithm values. If YES at block 408, at block 410 a determination is made as to whether any known features hit in the synaptic leaf. This is described in more detail with reference to FIGS. 17-20. The method 206 then proceeds to block 412. If NO at block 408, at block 412 a decision is made as to whether there are more TDEs remaining in the region of interest. If YES at block 412, at block 414 the next TDE in the region of interest is retrieved, and the method 206 returns to block 402. If NO at block 412, at block 416 the known feature(s) identified within the region of interest is returned, and the method 206 is complete. Blocks 396 and 398 can be executed in any order.

Figure 17:
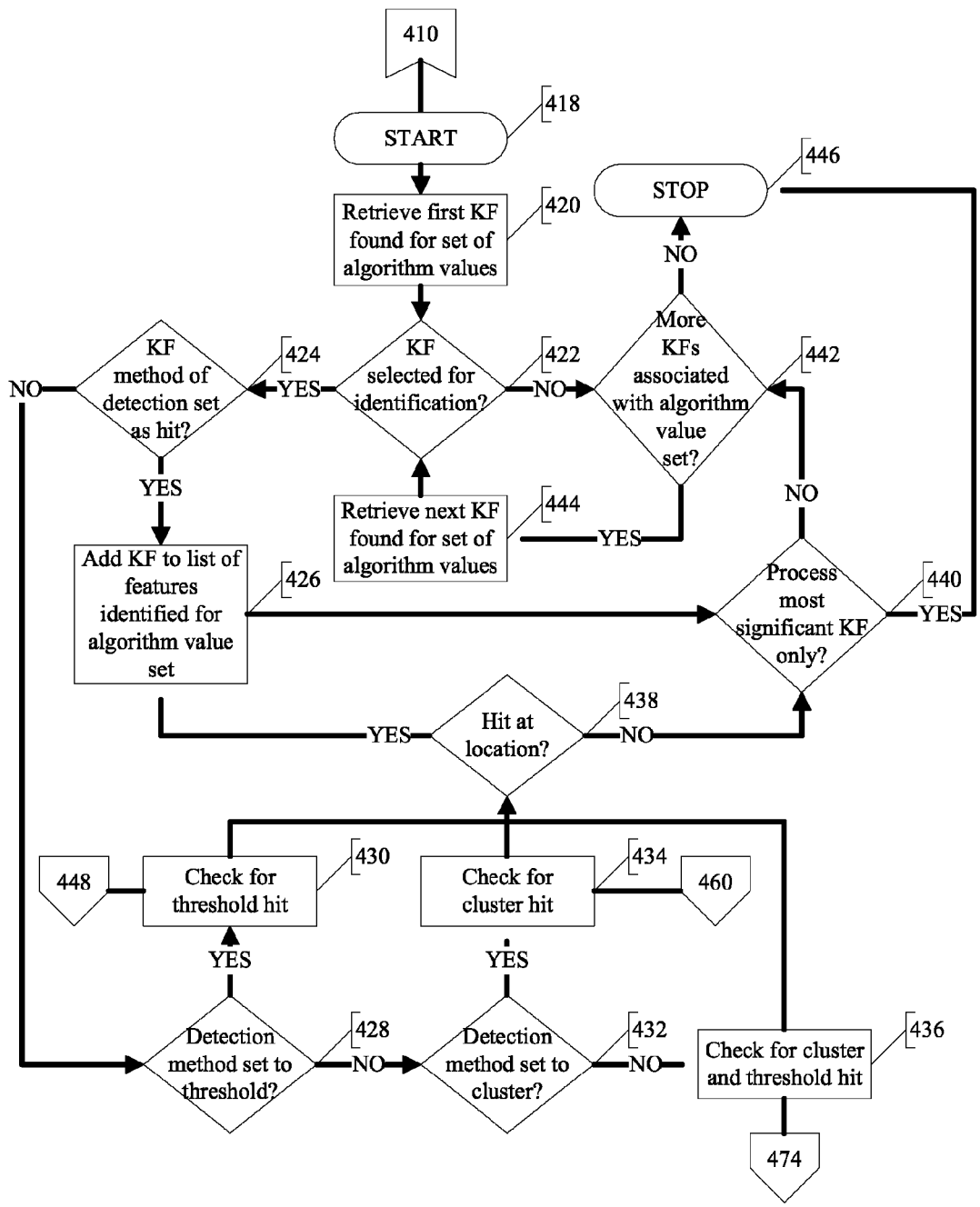
FIG. 17 shows an example method for determining if a known feature(s) is identified within the data set or selection therein.

FIG. 17 shows an example method 410 for determining if a known feature hits for a synaptic leaf. The method 410 initializes at block 418, and at block 420 the first known feature found for the current leaf (i.e., the current algorithm value set) is retrieved. At block 422, a decision is made as to whether the known feature is selected by the user for identification. If YES at block 422, the method 410 proceeds to block 424. If NO at block 422, the method 410 proceeds to block 442.

At block 424 of FIG. 17, a decision is made as to whether the method of known feature detection is set to hit detection. If YES at block 424, at block 426 the known feature is added to the list of identified features for the current synaptic leaf, and the method 410 proceeds to block 440. If NO at block 424, at block 428 a decision is made as to whether the method of known feature detection is set to threshold detection. If YES at block 428, at block 430 the known feature is checked for a threshold hit. This is described in more detail with reference to FIG. 18. The method 410 then proceeds to block 438. If NO at block 428, at block 432 a decision is made as to whether the method of known feature detection is set to cluster detection. If YES at block 432, at block 434 the known feature is checked for a cluster hit. This is described in more detail with reference to FIG. 19. The method 410 then proceeds to block 438. If NO at block 432, at block 436 the known feature is checked for a threshold and cluster hit. This is described in more detail with reference to FIG. 20. The method 410 then proceeds to block 438.

At block 438 of FIG. 17, a decision is made as to whether the known feature is positively identified (i.e. hits) at the current data element location. If YES at block 438, the method 410 returns to block 426. If NO at block 438, the method 410 proceeds to block 440.

At block 440 of FIG. 17, a decision is made as to whether the method of known feature detection is set to process only the most significant known feature found for the given data element. Since it is possible following known feature processing for multiple known features to be identified at any given data element location, known features can be processed in different ways. When determining whether a particular known feature positively activates for a given data element, the system can use any known feature that hits for the given data element or only the known feature trained most often (i.e., the most significant known feature) for the given data element. If YES at block 440, the method 410 proceeds to block 446. If NO at block 440, the method 410 proceeds to block 442.

At block 442 of FIG. 17, a decision is made as to whether there are more known features associated with the current synaptic leaf. If YES at block 442, at block 444 the next known feature found for the current synaptic leaf is retrieved, and the method 410 returns to block 422. If NO at block 442, at block 446 the method 410 is complete.

Figure 18:
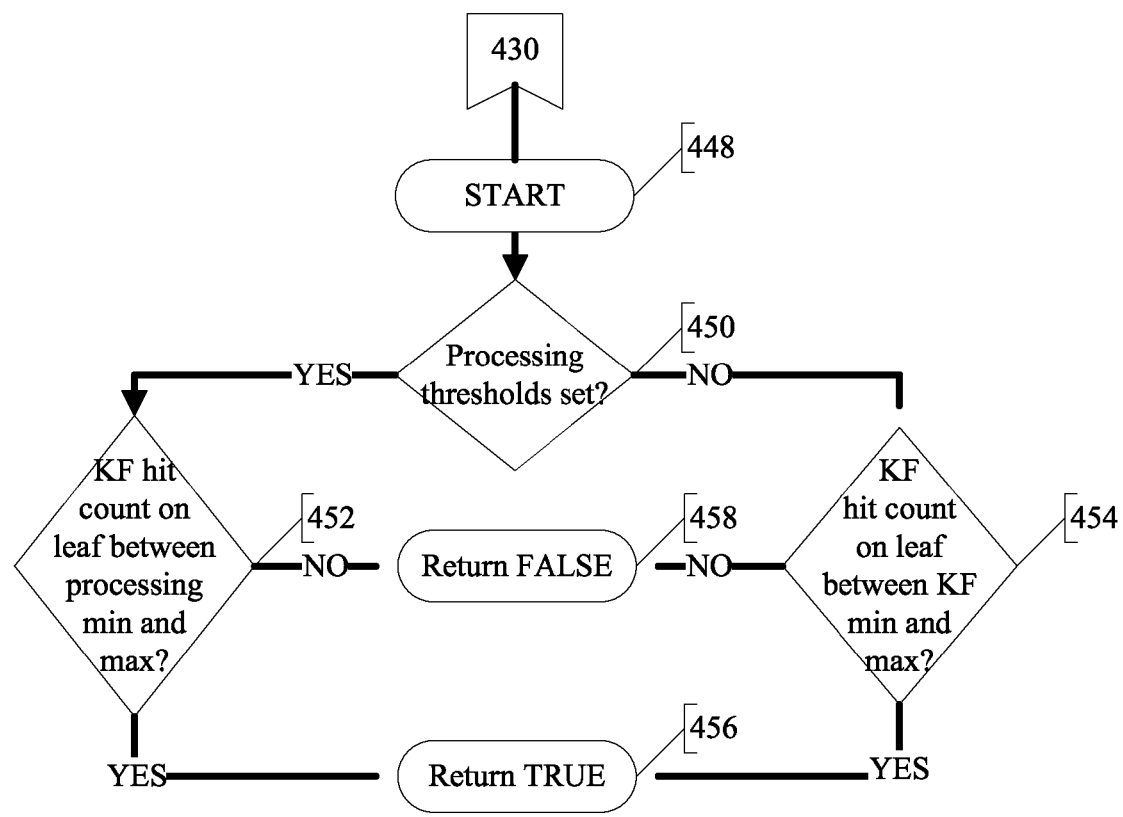
FIG. 18 shows an example method for evaluating threshold detection.

FIG. 18 shows an example method 430 for determining whether a known feature is identified via a threshold hit. The method 430 initializes at block 448, and at block 450 a decision is made as to whether the processing thresholds are set. The processing threshold value defines the minimum number of times a known feature must be associated with the synaptic path during training in order for said feature to be positively identified at the given data element location. The associated limit value defines the maximum number of times a known feature must be associated with the synaptic path during training in order for said feature to be positively identified at the given data element location. If YES at block 450, the method 430 proceeds to block 452. If NO at block 450, the method 430 proceeds to block 454.

At block 452 of FIG. 18, a decision is made as to whether the known feature hit count on the synaptic leaf is between the processing minimum and maximum hit count values. If YES at block 452, the method 430 proceeds to block 456. If NO at block 452, the method 430 proceeds to block 458.

At block 454 of FIG. 18, a decision is made as to whether the known feature hit count on the synaptic leaf is between the known feature minimum and maximum hit count values. If YES at block 454, at block 456 a value of TRUE is returned, and the method 430 is complete. If NO at block 454, at block 458 a value of FALSE is returned, and the method 430 is complete.

Figure 19:
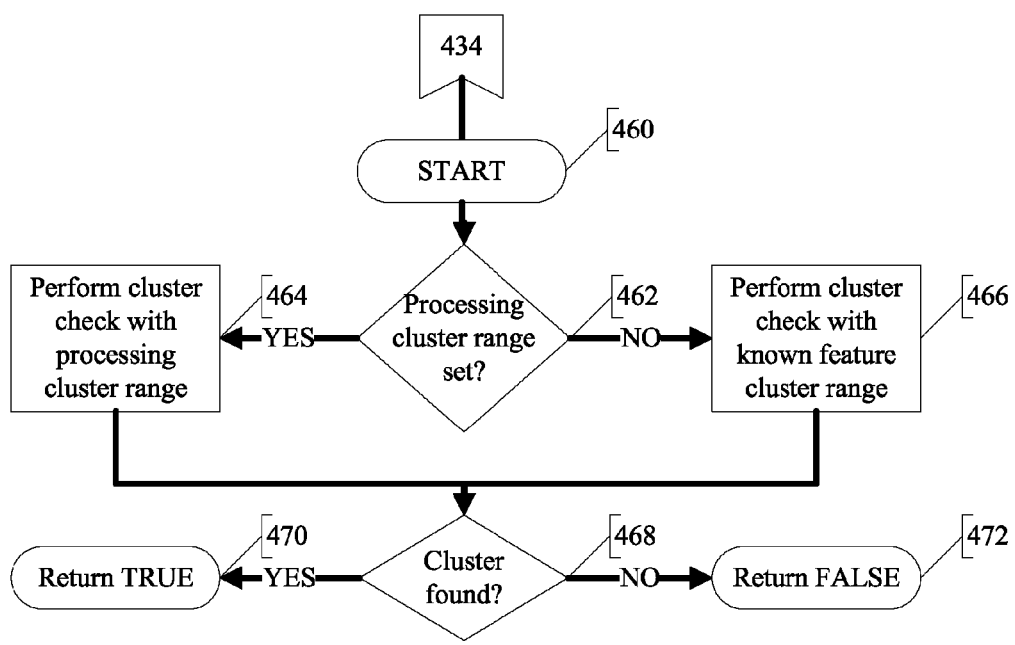
FIG. 19 shows an example method for evaluating cluster detection.

FIG. 19 shows an example method 434 for determining whether a known feature is identified via a cluster hit. The method 434 initializes at block 460, and at block 462 a decision is made as to whether the processing cluster range value is set. In one embodiment, the cluster range value defines how far, in each applicable direction and dimension (e.g., X, Y, and Z for three-dimensional imagery), from where a known feature is identified that another positive identification (i.e., "hit") of the same known feature must also be located in order for the given known feature to be positively identified for a given data element. In one embodiment, this cluster range value, which can be user-specified, preset, or automatically determined, refers to the actual physical distance in which the known features operate; in an alternate embodiment, the value simply represents some mathematical relationship between the known features. Typically, the cluster range value of a particular known feature defaults to a value of zero to yield a cluster area containing a single data element. A cluster range value set to one results in a cluster area containing all the data elements, located in each applicable direction and dimension, within one unit of the subject data element. For linear data this includes three data elements—one before and one following the subject data element. For two-dimensional data, this includes a square of eight data elements surrounding the subject data element. For three-dimensional data, this includes a cubical cluster of 26 data elements surrounding the subject data element.

If YES at block 462 of FIG. 19, at block 464 a cluster check based upon the processing cluster range value is performed, and the method 434 proceeds to block 468. If NO at block 462, at block 466 a cluster check based upon the known feature cluster range value is performed, and the method 434 proceeds to block 468.

At block 468 of FIG. 19, a decision is made as to whether a cluster of known features is found. If YES at block 468, at block 470 a value of TRUE is returned, and the method 434 is complete. If NO at block 468, at block 472 a value of FALSE is returned, and the method 434 is complete.

Figure 20:
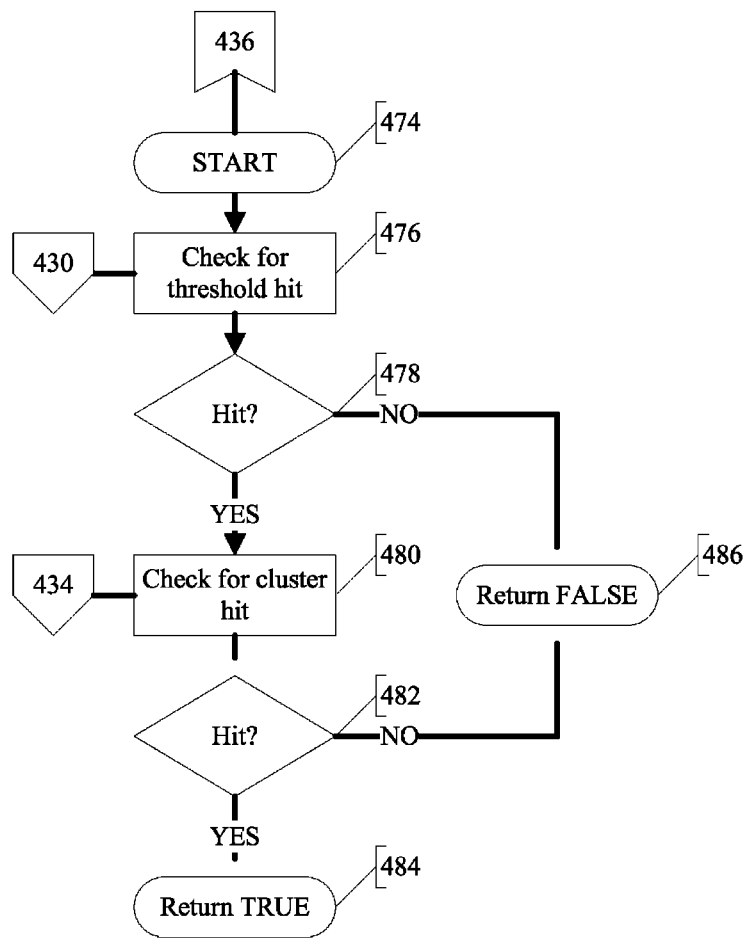
FIG. 20 shows an example method for evaluating threshold and cluster detection.

FIG. 20 shows an example method 436 for determining whether a known feature is identified via a threshold and cluster hit. The method 436 initializes at block 474, and at block 476 the known feature is checked for a threshold hit. This is described in more detail with reference to FIG. 18. At block 478, a decision is made as to whether a threshold hit is present. If YES at block 478, the method 436 proceeds to block 480. If NO at block 478, the method 436 proceeds to block 486.

At block 480 of FIG. 20, the known feature is checked for a cluster hit. This is described in more detail with reference to FIG. 19. At block 482, a decision is made as to whether a cluster hit is present. If YES at block 482, at block 484 a value of TRUE is returned, and the method 436 is complete. If NO at block 482, at block 486 a value of FALSE is returned, and the method 436 is complete. The combination of blocks 476 and 478 and the combination of blocks 480 and 482 can be executed in any order.

Figure 21:
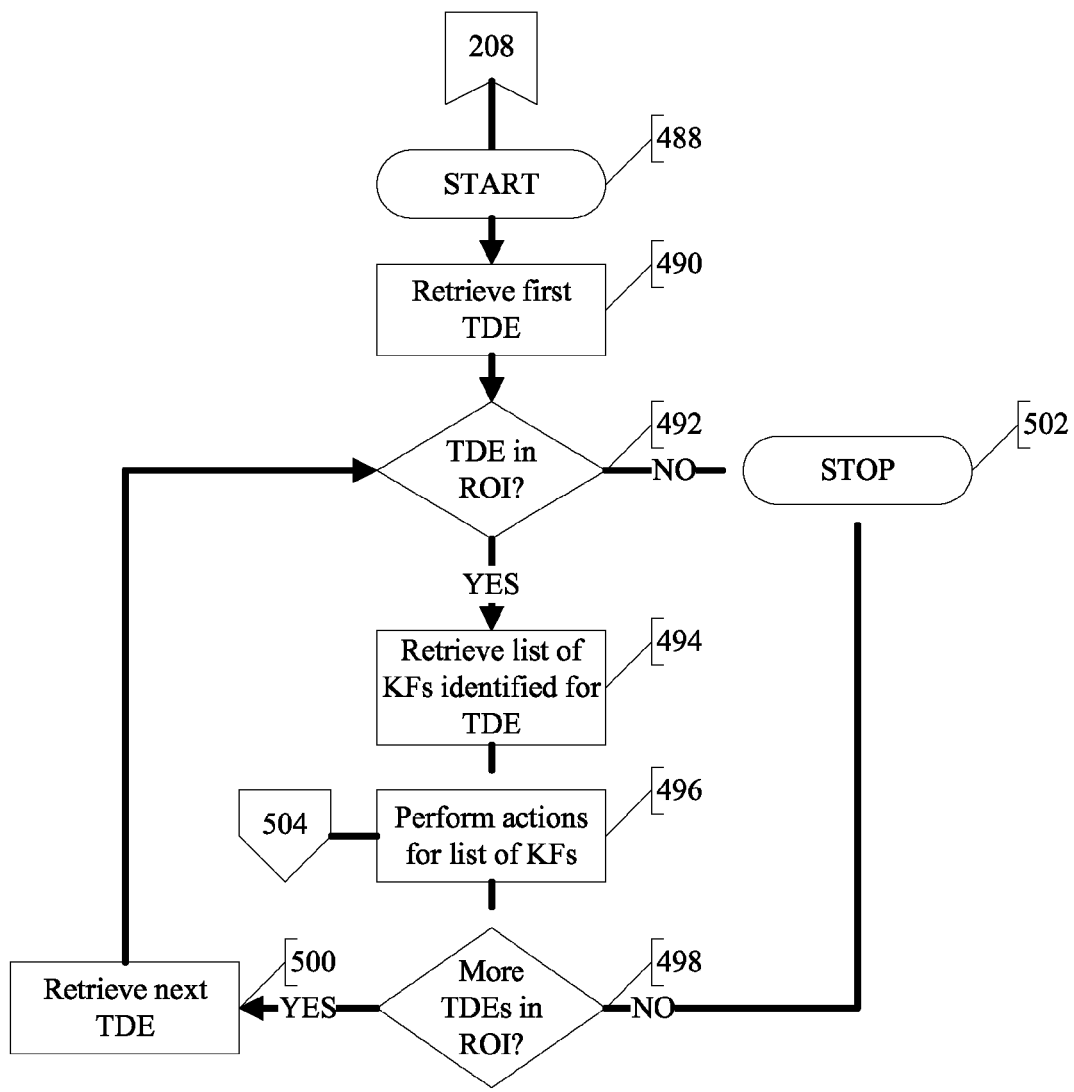
FIG. 21 shows an example method for processing the known feature(s) identified for a given data set or selection therein.

FIG. 21 shows an example method 208 for processing the known feature(s) identified for a given data set or selection therein. The method 208 initializes at block 488, and at block 490 the first TDE within the data set or selection therein is retrieved. At block 492, a decision is made as to whether the TDE is located within the user-specified region of interest. If YES at block 492, the method 208 proceeds to block 494. If NO at block 492, the method 208 proceeds to block 502.

At block 494 of FIG. 21, the list of known features identified for the subject TDE is retrieved. At block 496, the associated action(s)-on-detection for the list of features are performed. This is described in more detail with reference to FIG. 22. At block 498, a decision is made as to whether there are more TDEs remaining in the region of interest. If YES at block 498, at block 500 the next TDE within the data set or selection therein is retrieved, and the method 208 returns to block 492. If NO at block 498, at block 502 the method 208 is complete.

Figure 22:
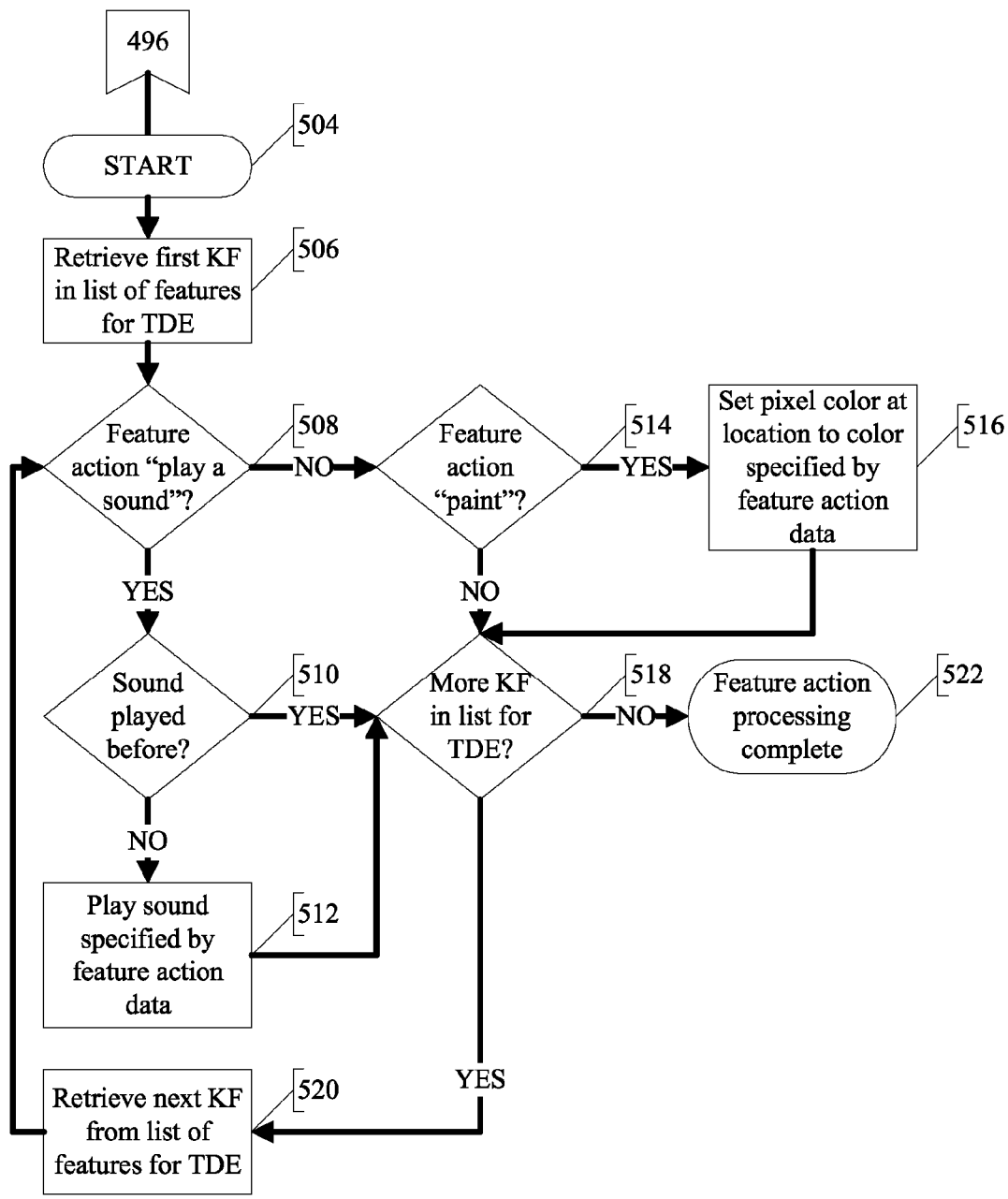
FIG. 22 shows an example method for performing the known feature action(s)-on-detection.

FIG. 22 shows an example method 496 for performing the action(s) associated with the list of identified known features. The method 496 initializes at block 504, and at block 506 the first known feature is retrieved from the list of known features identified for a given TDE. At block 508, a decision is made as to whether the known feature action-on-detection is set to play a user-specified, preset, or automatically determined sound. If YES at block 508, the method 496 proceeds to block 510. If NO at block 508, the method 496 proceeds to block 514.

At block 510 of FIG. 22, a decision is made as to whether the sound has been played by the system at least once before. If YES at block 510, the method 496 proceeds to block 518. If NO at block 510, at block 512 the sound specified by the known feature action-on-detection attribute is played by the system, and the method 496 proceeds to block 518.

At block 514 of FIG. 22, a decision is made as to whether the known feature action-on-detection is set to paint a data element(s) a user-specified, preset, or automatically determined color. If YES at block 514, at block 516 the data element color at the TDE location is set to the color specified by the known feature action-on-detection attribute, and the method 496 proceeds to block 518. If NO at block 514, the method 496 proceeds to block 518.

At block 518 of FIG. 22, a decision is made as to whether there are more known features in the list of identified known features for the subject TDE. If YES at block 518, at block 520 the next known feature in the list of identified known features for a given TDE is retrieved, and the method 496 returns to block 508. If NO at block 518, at block 522 the method 496 for known feature action-on-detection processing is complete. Additional known feature actions or combinations of actions are possible as needed or specified by alternate embodiments of the present invention. The actions can be checked and/or executed in any order.

For illustrative purposes, the use of a data analysis and feature recognition system as described herein is accomplished with reference to the following examples. FIGS. 23-39 depict known feature training and subsequent recognition within two-dimensional data sets, while FIGS. 40-61 depict known feature training and recognition within hyperspectral data sets. It is important to note that data analysis and feature recognition using the system of the present invention is not limited to applicability in the imagery data type alone. The methods and systems as described herein can be used to evaluate discrete features in any single or multidimensional data set or any other collection of information that can be represented in a quantifiable datastore.

In each of the data arrays of the following examples, the X-location coordinate for each data element of the data array is indicated by the corresponding label in the column header, and the Y-location coordinate for each data element is indicated by the corresponding label in the row header as is common in the art. In one embodiment, the numbers shown within each data array are the grey-scale data element values of the original image selection, while in an alternate embodiment, the numbers represent some other quantifiable characteristic (i.e., location, brightness, elevation, etc.) of the data elements. The numbers shown are the data element values that are analyzed during known feature training and/or recognition.

FIG. 23 shows an example data array for a two-dimensional, grey-scale, ten-data element (i.e., pixel) by ten-data element image selection of a known feature. The image selection contains a total of 100 data elements.

FIG. 24 shows the adjacent data element TDA, which exists as a localized grouping of the eight adjacent data elements surrounding a single, centralized TDE. In this example, use of the adjacent data element TDA ensures that at some point during training, the data values of every data element in the original data set are considered. In an alternate embodiment, the adjacent data element TDA does not necessarily represent the preferred TDA embodiment for all data types, modalities, submodalities, etc. As shown in the data arrays of FIGS. 23, 34, 40-43, and 51-54, the first and last rows and columns of data values are highlighted because the data elements contained therein do not abut the requisite data elements as required for complete analysis in accordance with the adjacent data element TDA; as such, these data elements are considered "invalid" during data analysis. This concept is further exemplified in the post-analyzed data arrays of FIGS. 25-28, 35-38, 44-49, and 55-60 wherein the data elements of the first and last rows and columns are devoid of algorithm values.

In the example of FIGS. 23-39, the TDA evaluation algorithms used to accomplish known feature training include: the mean algorithm (hereafter "Alg1"), the median algorithm (hereafter "Alg2"), the spread of values algorithm (hereafter "Alg3"), and the standard deviation algorithm (hereafter "Alg4"). In an alternate embodiment, selection of the TDA to be used during known feature training automatically determines which evaluation algorithms are used. In another embodiment, selection of a given TDA or selection of a given evaluation algorithm determines all subsequent algorithms to be used throughout known feature training.

For this example, algorithmic analysis (i.e., known feature training) of the FIG. 23 data array begins at any valid, user-specified, preset, or automatically determined data element. In one embodiment, analysis with Alg1 using the adjacent data element TDA initializes at TDE (2, 2) and returns a value of 153, count 1. This resultant value 153 is stored in an algorithm value cache, which is sized and addressed in the same manner as the FIG. 23 data array, at the corresponding TDE location (2, 2).

In one embodiment, TDE (2, 2) of the FIG. 23 data array is then processed with Alg2 using the adjacent data element TDA. A value of 159, count 1, is returned and is stored in the algorithm value cache at the corresponding TDE location (2, 2).

In one embodiment, TDE (2, 2) of the FIG. 23 data array is then processed with Alg3 using the adjacent data element TDA. A value of 217, count 1, is returned and is stored in the algorithm value cache at the corresponding TDE location (2, 2).

In one embodiment, TDE (2, 2) of the FIG. 23 data array is then processed with Alg4 using the adjacent data element TDA. A value of 64, count 1, is returned and is stored in the algorithm value cache at the corresponding TDE location (2, 2).

In one embodiment, following the evaluation of TDE (2, 2) of the FIG. 23 data array with Alg1, Alg2, Alg3, and Alg4 using the adjacent data element TDA, known feature training proceeds to the next valid TDE and then continues until the collection of valid TDEs in the data array is exhausted or processing is terminated. In an alternate embodiment, all valid TDEs of the FIG. 23 data array are analyzed with a single evaluation algorithm using the adjacent data element TDA prior to initialization of analysis with any subsequent algorithms.

FIG. 25 shows an example data array for the ten-data element by ten-data element image selection (as shown in the FIG. 23 data array) after analysis with Alg1 (i.e., the mean algorithm) using the adjacent data element TDA. The first valid data element is (2, 2), and the resultant Alg1 value 153, count 1, is used further starting at FIG. 29.

FIG. 26 shows an example data array for the ten-data element by ten-data element image selection (as shown in the FIG. 23 data array) after analysis with Alg2 (i.e., the median algorithm) using the adjacent data element TDA. The first valid data element is (2, 2), and the resultant Alg2 value 159, count 1, is used further starting at FIG. 29.

FIG. 27 shows an example data array for the ten-data element by ten-data element image selection (as shown in the FIG. 23 data array) after analysis with Alg3 (i.e., the spread of values algorithm) using the adjacent data element TDA. The first valid data element is (2, 2), and the resultant Alg3 value 217, count 1, is used further starting at FIG. 29.

FIG. 28 shows an example data array for the ten-data element by ten-data element image selection (as shown in the FIG. 23 data array) after analysis with Alg4 (i.e., the standard deviation algorithm) using the adjacent data element TDA. The first valid data element is (2, 2) and the resultant Alg4 value 64, count 1, is used further starting at FIG. 29.

Figure 29:
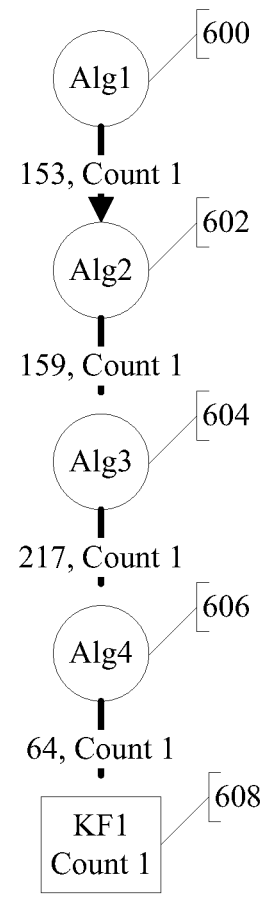
FIG. 29 shows an example synaptic web containing a single synaptic path built from the algorithmic evaluation of TDE (2, 2) of the FIG. 23 data array with the mean, median, spread of values, and standard deviation algorithms using the adjacent data element TDA.

FIG. 29 shows one embodiment of an example synaptic web containing a single synaptic path formed after algorithm evaluation of the first valid TDE (2, 2) of the FIG. 23 data array with Alg1, Alg2, Alg3, and Alg4 using the adjacent data element TDA. The first node 600 shows the resultant algorithm value 153, count 1, of algorithmic analysis of TDE (2 2) with Alg1 using the adjacent data element TDA. A count of one signifies the number of times during known feature training that evaluation of the original data array of FIG. 23 with Alg1 results in a value of 153; the count value is incremented each time the resultant algorithm value 153 is found after evaluation of a TDE with Alg1. The second node 602 of the FIG. 29 synaptic web shows the resultant algorithm value 159, count 1, after algorithmic analysis of TDE (2, 2) with Alg2 using the adjacent data element TDA. The third node 604 shows the resultant algorithm value 217, count 1, after algorithmic analysis of TDE (2, 2) with Alg3 using the adjacent data element TDA. Finally, the fourth node 606 shows the resultant algorithm value 64, count 1, after algorithmic analysis of TDE (2, 2) with Alg4 using the adjacent data element TDA. Following this synaptic path leads to a synaptic leaf 608 containing a known feature (hereafter "KF1"). Since this is the first time this synaptic path is established (i.e., identified) for KF1, the count for said known feature is also one. In this example, the synaptic leaf 608 is the first synaptic leaf of the synaptic web.

Figure 30:
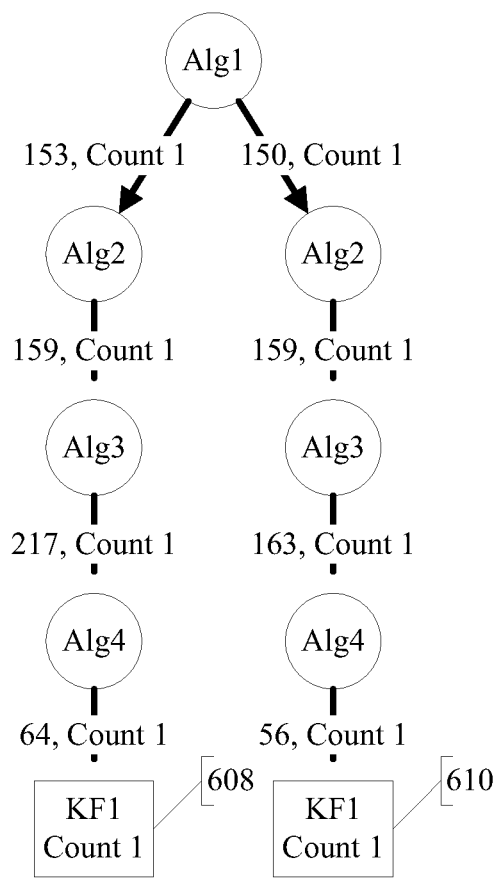
FIG. 30 shows an example synaptic web containing two synaptic paths built from the algorithmic evaluation of TDE (2, 2) and TDE (3, 2) of the FIG. 23 data array with the mean, median, spread of values, and standard deviation algorithms using the adjacent data element TDA.

FIG. 30 shows one embodiment of an example synaptic web containing two synaptic paths formed after algorithmic evaluation of TDE (2, 2) and TDE (3, 2) of the FIG. 23 data array with Alg1, Alg2, Alg3, and Alg4 using the adjacent data element TDA. The synaptic leaf 610 results from the algorithmic evaluation of TDE (3, 2). After the analysis of TDE (2, 2) and (3, 2) of the original data array of FIG. 23, there are two different synaptic paths that identify the same known feature, "KF1."

Figure 31:
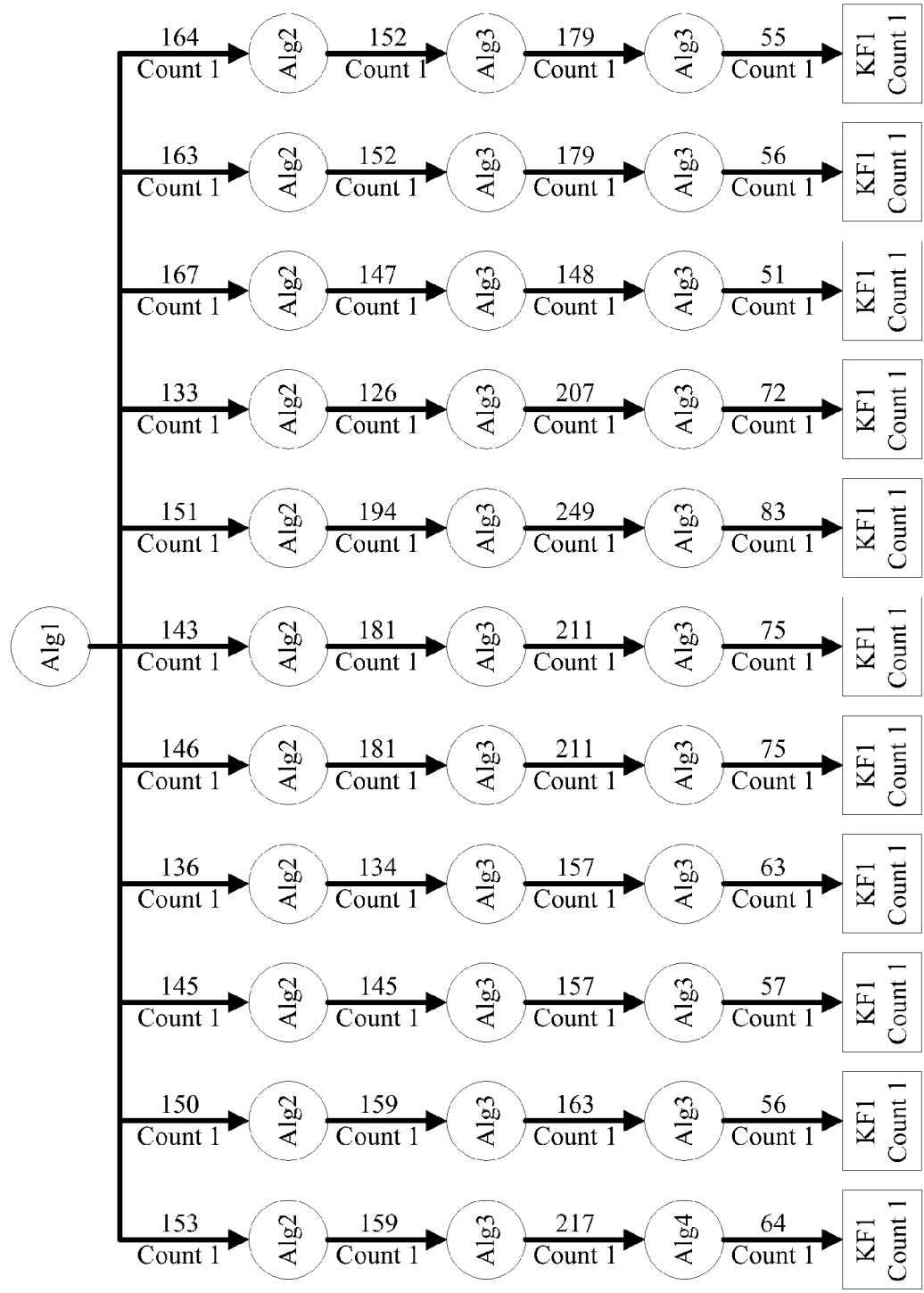
FIG. 31 shows an example synaptic web containing eleven synaptic paths built from the algorithm evaluation of TDEs (2, 2) through (9, 2) and TDEs (2, 3) through (4, 3) of the FIG. 23 data array with the mean, median, spread of values, and standard deviation algorithms using the adjacent data element TDA.

FIG. 31 shows one embodiment of an example synaptic web containing eleven synaptic paths formed after algorithmic evaluation TDEs (2, 2) through (9, 2) and TDEs (2, 3) through (4, 3) of the FIG. 23 data array with Alg1, Alg2, Alg3, and Alg4 using the adjacent data element TDA. The data elements are analyzed from left to right within the data array rows, and the corresponding resultant algorithm values are presented from left to right within the synaptic web. There are no repeat algorithm values calculated as a result of Alg1, and accordingly, for each data element evaluated in the original data array of FIG. 23, a new synaptic path terminating in a new synaptic leaf is added to the synaptic web.

Figure 32:
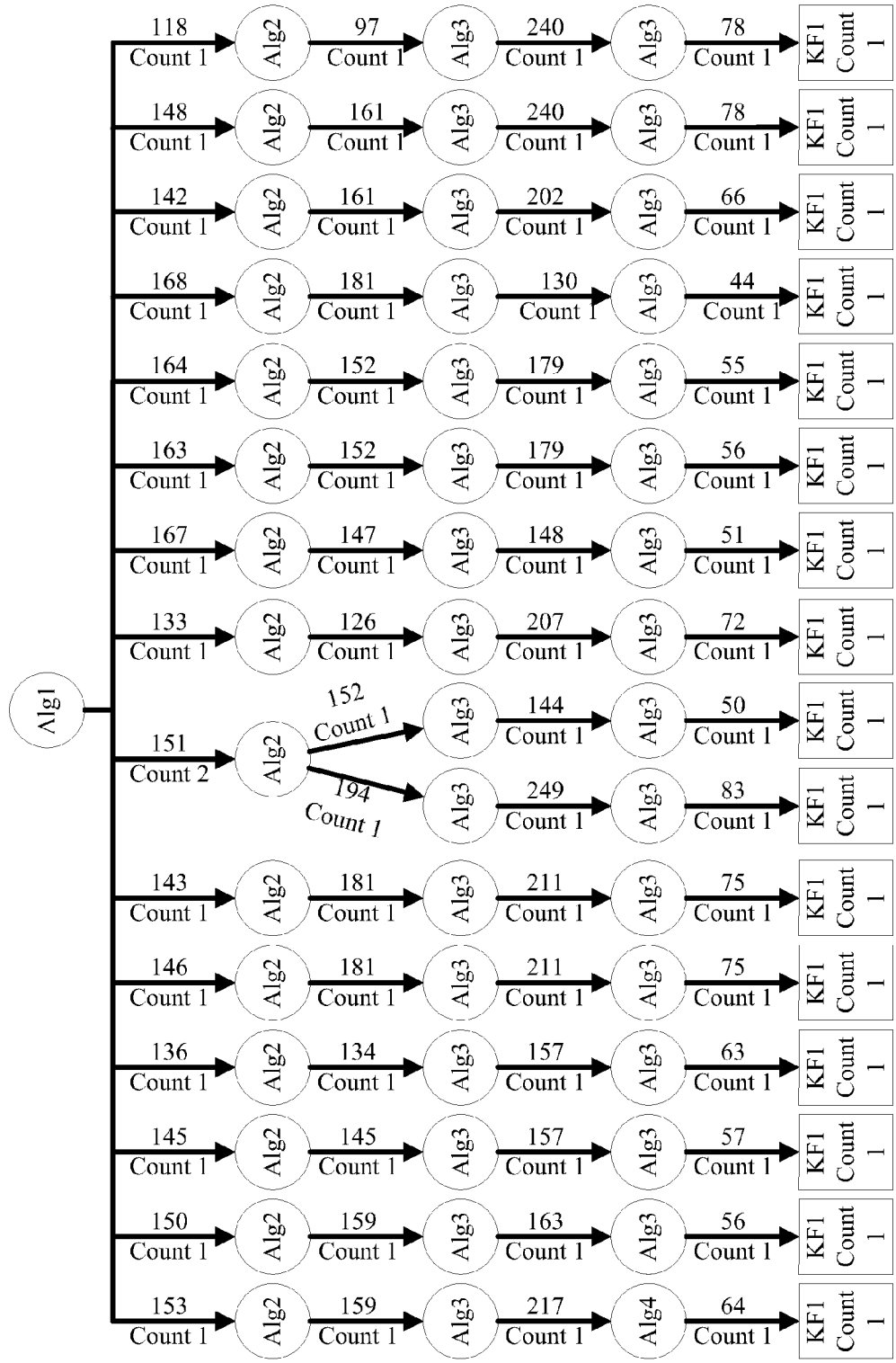
FIG. 32 shows an example synaptic web containing sixteen synaptic paths built from the algorithmic evaluation of TDEs (2, 2) through (9, 2) and TDEs (2, 3) through (9, 3) of the FIG. 23 data array with the mean, median, spread of values, and standard deviation algorithms using the adjacent data element TDA.

FIG. 32 shows one embodiment of an example synaptic web containing sixteen synaptic paths formed after algorithmic evaluation of TDEs (2, 2) through (9, 2) and TDEs (2, 3) through (9, 3) of the FIG. 23 data array with Alg1, Alg2, Alg3, and Alg4 using the adjacent data element TDA. Again, the data elements are analyzed from left to right within the data array rows, and the corresponding resultant algorithm values are presented from left to right within the synaptic web. In this example, as analysis proceeds through the TDEs and each synaptic path is built, a repeat in the resulting Alg1 value of 151 is calculated at TDE (8, 2) and TDE (5, 3). Since this value of 151 for Alg1 is encountered twice, the associated value count is incremented to two. As the algorithmic analysis continues, the synaptic path associated with the Alg1 value of 151 branches into separate synaptic paths because the resulting Alg2 values for TDE (8, 2) and TDE (5, 2) are different.

Figure 33:
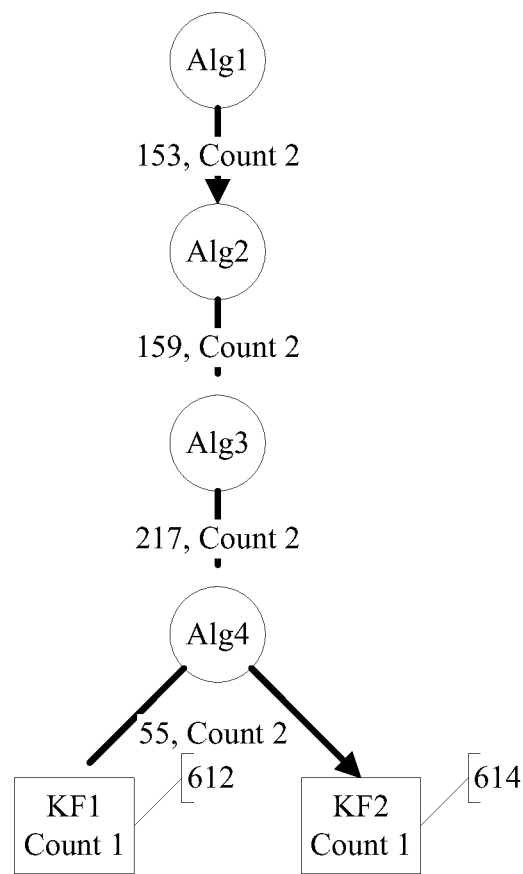
FIG. 33 shows an example synaptic web containing one synaptic path that terminates in a synaptic leaf having multiple known features.

FIG. 33 shows one embodiment of an example synaptic web containing a single synaptic path that results in a synaptic leaf with two known features 612 and 614. When multiple known features are associated with a single synaptic path, said features are stored in a sorted list that is ordered by each feature hit count value. The known feature that is most often associated with the synaptic pattern appears first in the list, and it is followed by the other known features, which are in order by decreasing hit count values. In the case of a tie, the first known feature associated with the synaptic path appears first in the list.

In one embodiment, once training of one or a plurality of known features from the original ten-data element by ten-data element data array of FIG. 23 is complete and the training values are stored in the synaptic web (which is partially shown in FIG. 32), a new data set selection containing one or a plurality of unknown features is presented to the system for analysis and known feature recognition.

FIG. 34 shows an example data array for a two-dimensional, grey-scale, six-data element (i.e., pixel) by six-data element image selection of a known feature. In the preferred embodiment, it is presumed that this example image selection is obtained using the same type of data capture device as is used to obtain the example data array of FIG. 23. The image selection contains a total of thirty-six data elements.

It is important to note that the same evaluation algorithms and the same TDA as are used during preliminary known feature training (as described with relation to FIGS. 23-32) must be employed to evaluate the new data set selection (as shown in FIG. 34). For this example, the adjacent data element TDA (as shown in FIG. 24) and the mean algorithm (i.e., Alg1), the median algorithm (i.e., Alg2), the spread of values algorithm (i.e., Alg3), and the standard deviation algorithm (i.e., Alg4) are used to accomplish known feature recognition.

For this example, algorithmic processing of the FIG. 34 data array begins at any valid, user-specified, preset, or automatically determined data element. In one embodiment, processing with Alg1 using the adjacent data element TDA initializes at TDE (2, 2) and returns a value of 164, count 1. This resultant value 164 is stored in an algorithm value cache, which is sized and addressed in the same manner as the FIG. 34 data array, at the corresponding TDE location (2, 2).

In one embodiment, TDE (2, 2) of the FIG. 34 data array is then processed with Alg2 using the adjacent data element TDA. A value of 152, count 1, is returned and is stored in the algorithm value cache at the corresponding TDE location (2, 2).

In one embodiment, TDE (2, 2) of the FIG. 34 data array is then processed with Alg3 using the adjacent data element TDA. A value of 179, count 1, is returned and is stored in the algorithm value cache at the corresponding TDE location (2, 2).

In one embodiment, TDE (2, 2) of the FIG. 34 data array is then processed with Alg4 using the adjacent data element TDA. A value of 55, count 1, is returned and is stored in the algorithm value cache at the corresponding TDE location (2, 2).

In one embodiment, following the evaluation of TDE (2, 2) of the FIG. 34 data array with Alg1, Alg2, Alg3, and Alg4 using the adjacent data element TDA, processing proceeds to the next valid TDE and then continues until the collection of valid TDEs in the data array is exhausted or training is terminated. In an alternate embodiment, all valid TDEs of the FIG. 34 data array are processed with a single evaluation algorithm using the adjacent data element TDA prior to initialization of processing with any subsequent algorithms.

FIG. 35 shows an example data array for the six-data element by six-data element image selection (as shown in the FIG. 34 data array) after analysis with Alg1 (i.e., the mean algorithm) using the adjacent data element TDA. The first valid data element is (2, 2), and the resultant Alg1 value 164, count 1, is used further starting at FIG. 39.

FIG. 36 shows an example data array for the six-data element by six-data element image selection (as shown in the FIG. 34 data array) after analysis with Alg2 (i.e., the median algorithm) using the adjacent data element TDA. The first valid data element is (2, 2), and the resultant Alg2 value 152, count 1, is used further starting at FIG. 39.

FIG. 37 shows an example data array for the six-data element by six-data element image selection (as shown in the FIG. 34 data array) after analysis with Alg3 (i.e., the spread of values algorithm) using the adjacent data element TDA. The first valid data element is (2, 2), and the resultant Alg3 value 179, count 1, is used further starting at FIG. 39.

FIG. 38 shows an example data array for the six-data element by six-data element image selection (as shown in the FIG. 34 data array) after analysis with Alg4 (i.e., the standard deviation algorithm) using the adjacent data element TDA. The first valid data element is (2, 2), and the resultant Alg4 value 55, count 1, is used further starting at FIG. 39.

Figure 39:
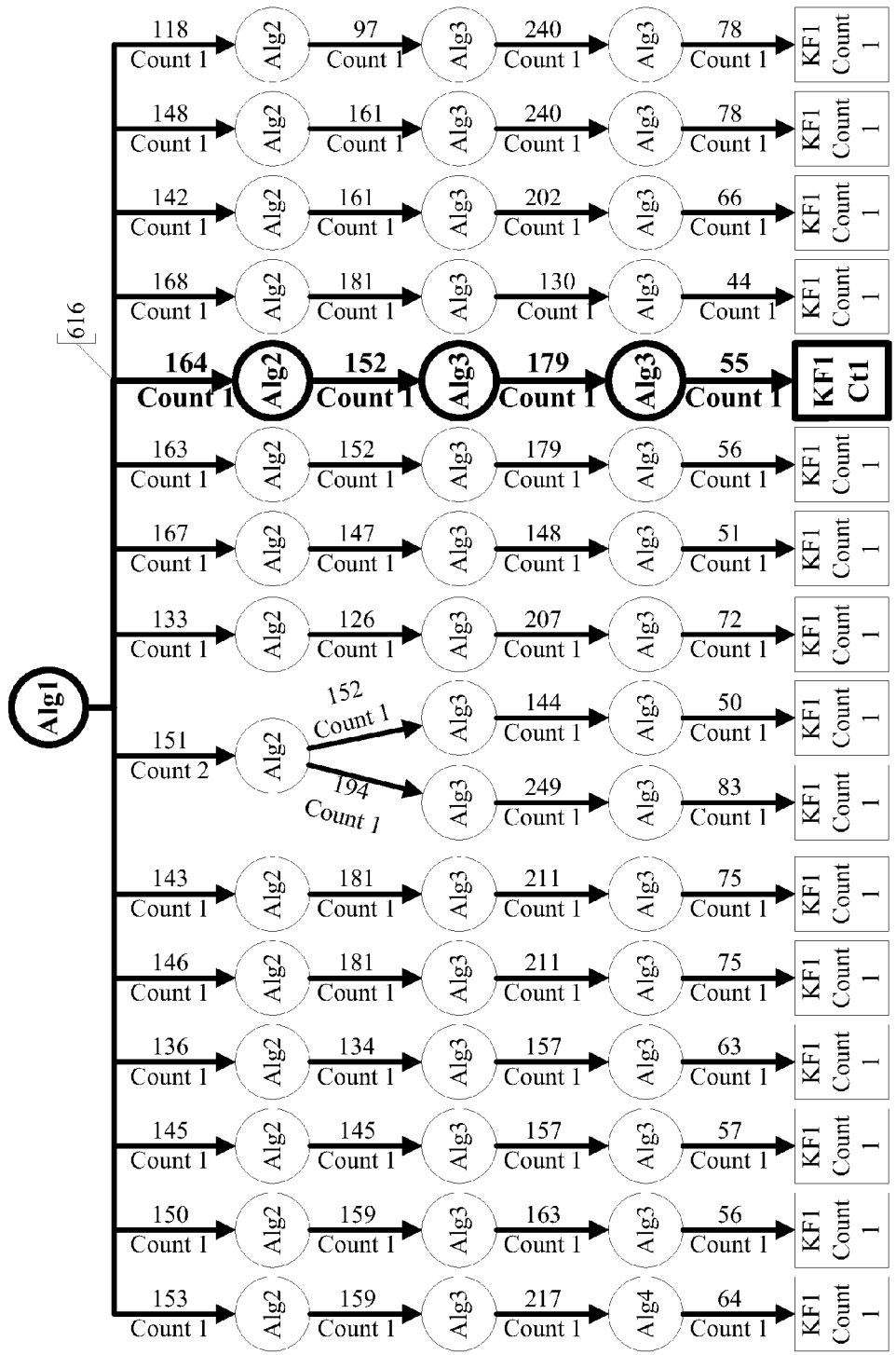
FIG. 39 shows an example synaptic web wherein the algorithm processing results of the first valid data element of FIG. 34 are compared to the values of the existing partial synaptic web trained from the algorithmic evaluation of the FIG. 23 data array in an effort to identify a known feature(s) within the data array of FIG. 34.

FIG. 39 shows one embodiment of an example synaptic web wherein the algorithm processing results of the first valid data element (2, 2) of the FIG. 34 data array (as shown in the data arrays of FIGS. 35-38) are compared to the existing partial synaptic web (as originally shown in FIG. 32), which is trained from the algorithmic evaluation of the FIG. 23 data array (as shown in the data arrays of FIGS. 25-28). Referencing the previously trained synaptic web of FIG. 32, the list of Alg1 values is searched for the value 164, and a node for the second algorithm (i.e., Alg2) is found. At the second node, a search for the Alg2 value of 152 is conducted, and a node for the third algorithm (i.e., Alg3) is found. At the third node, a search for the Alg3 value of 179 is conducted, and a node for the fourth algorithm (i.e., Alg4) is found. At the fourth node, a search for the Alg4 value of 55 is also found. Thus, the first valid data element (2, 2) of the sample data array of FIG. 34 is identified as being consistent with KF1 following the known synaptic path 616 as highlighted.

In one embodiment, the results of the known feature processing example (as described in FIGS. 34-39) are stored in another organizational storage structure, such as a known feature data output overlay, which is sized and addressed in the same manner as the original data set selection of FIG. 34, for retrieval at a future time if needed. In one embodiment, once a known feature(s) is identified in a new data set, the system notifies the user as to the identification of the feature(s) and/or presents the user with a representation (e.g., a graphical image or an audible sound) associated with the known feature(s).

For further illustrative purposes, the use of a data analysis and feature recognition system as described herein is accomplished with reference to a hyperspectral data example sourced from NASA's Airborne Visible/Infrared Imaging Spectrometer (referred to hereafter as "AVIRIS"), which collected data in 224 contiguous spectral bands with a bandwidth of 0.10 μm. The AVIRIS sensor was utilized to collect data and spectrally analyze the hydrothermal mineral alterations in rocks of the Cuprite mining district in western Nevada, USA. For the example as shown in FIGS. 40-61, four bands (i.e., Band 13, Band 20, Band 173, and Band 200) of this hyperspectral data set are analyzed using one embodiment of the system of the present invention.

FIG. 40 shows an example data array representing a selection of Band 13, which is located at 500.5 nanometers on the visible spectrum and is hereafter referred to as "B13," of the AVIRIS hyperspectral data set. In this example, B13 is represented as a two-dimensional, ten-data element by ten-data element selection of a known feature. The data selection has a total of 100 data elements.

FIG. 41 shows an example data array representing a selection of Band 20, which is located at 558.7 nanometers on the visible spectrum and is hereafter referred to as "B20," of the AVIRIS hyperspectral data set. In this example, B20 is represented by a two-dimensional, ten-data element by ten-data element selection of a known feature. The data selection has a total of 100 data elements.

FIG. 42 shows an example data array representing Band 173, which is located at 2,000.5 nanometers on the infrared spectrum and is hereafter referred to as "B173," of the AVIRIS hyperspectral data set. In this example, B173 is represented by a two-dimensional, ten-data element by ten-data element selection of a known feature. The data selection has a total of 100 data elements. For the purpose of simplicity, only the values for data elements (2, 2) and (3, 2) are shown; the remaining data element values are represented by the symbol "X" within this data array.

FIG. 43 shows an example data array representing Band 200, which is located at 2,270.2 nanometers on the infrared spectrum and is hereafter referred to as "B200," of the AVIRIS hyperspectral data set. In this example, Band 200 is represented by a two-dimensional, ten-data element by ten-data element selection of a known feature. The data selection has a total of 100 data elements. For the purpose of simplicity, only the values for data elements (2, 2) and (3, 2) are shown; the remaining data element values are represented by the symbol "X" within this data array.

In the example of FIGS. 40-61, the adjacent data element TDA as shown in FIG. 24 is used to accomplish known feature training. In addition, the TDA evaluation algorithms to be used to accomplish known feature training include: the mean algorithm (hereafter "Alg1") and the spread of values algorithm (hereafter "Alg3"), which are used to analyze B13 (as shown in the FIG. 40 data array) and B20 (as shown in the FIG. 41 data array) of the AVIRIS hyperspectral data set; the value algorithm (hereafter "Alg5"), which is used to analyze B173 (as shown in the FIG. 42 data array); and the value algorithm with a mask of 0xFFFC (hereafter "Alg6"), which is used to analyze B200 (as shown in the FIG. 43 data array). In an alternate embodiment, selection of the TDA to be used during known feature training automatically determines which evaluation algorithms are used. In another embodiment, selection of a given TDA or selection of a given evaluation algorithm determines all subsequent algorithms to be used throughout known feature training.

For this example, algorithmic analysis of a selection of B13 as shown in the FIG. 40 data array begins at any valid, user-specified, preset, or automatically determined data element. In one embodiment, analysis with Alg1 (which is hereafter designated with relation to B13 as "B13Alg1") using the adjacent data element TDA initializes at TDE (2, 2) and returns a value of 153, count 1. This resultant value 153 is stored in an algorithm value cache, which is sized and addressed in the same manner as the FIG. 40 data array, at the corresponding TDE location (2, 2).

In one embodiment, TDE (2, 2) of B13 as shown in the FIG. 40 data array is then processed with Alg3 (which is hereafter designated with relation to B13 as "B13Alg3") using the adjacent data element TDA. A value of 217, count 1, is returned and is stored in the algorithm value cache at the corresponding TDE location (2, 2).

In one embodiment, following the evaluation of TDE (2, 2) of the FIG. 40 data array with B13Alg1 and B13Alg3 using the adjacent data element TDA, known feature training proceeds to the next valid TDE and then continues until the collection of valid TDEs in the data array is exhausted or processing is terminated. In an alternate embodiment, all valid TDEs of the FIG. 40 data array are processed with a single evaluation algorithm using the adjacent data element TDA prior to initialization of training with any subsequent algorithms.

FIG. 44 shows an example data array for the ten-data element by ten-data element selection of B13 (as shown in the FIG. 40 data array) after analysis with B13Alg1 (i.e., the mean algorithm) using the adjacent data element TDA. The first valid data element is (2, 2), and the resultant B13Alg1 value 153, count 1, is used further starting at FIG. 50.

FIG. 45 shows an example data array for the ten-data element by ten-data element image selection of B13 (as shown in the FIG. 40 data array) after analysis with B13Alg3 (i.e., the spread of values algorithm) using the adjacent data element TDA. The first valid data element is (2, 2), and the resultant B13Alg3 value 217, count 1, is used further starting at FIG. 50.

For this example, algorithmic analysis of a selection of B20 as shown in the FIG. 41 data array begins at any valid, user-specified, preset, or automatically determined data element. In one embodiment, analysis with Alg1 (which is hereafter designated with relation to B20 as "B20Alg1") using the adjacent data element TDA initializes at TDE (2, 2) and returns a value of 120, count 1. This resultant value 120 is stored in an algorithm value cache, which is sized and addressed in the same manner as the FIGS. 40-41 data arrays, at the corresponding TDE location (2, 2).

In one embodiment, TDE (2, 2) of B20 as shown in the FIG. 41 data array is then processed with Alg3 (which is hereafter designated with relation to B20 as "B20Alg3") using the adjacent data element TDA. A value of 116, count 1, is returned and is stored in the algorithm value cache at the corresponding TDE location (2, 2).

In one embodiment, following the evaluation of TDE (2, 2) of the FIG. 41 data array with B20Alg1 and B20Alg3 using the adjacent data element TDA, known feature training proceeds to the next valid TDE and then continues until the collection of valid TDEs in the data array is exhausted or processing is terminated. In an alternate instance, all valid TDEs of the FIG. 41 data array are processed with a single evaluation algorithm using the adjacent data element TDA prior to initialization of processing with any subsequent algorithms.

FIG. 46 shows an example data array for the ten-data element by ten-data element selection of B20 (as shown in the FIG. 41 data array) after analysis with B20Alg1 (i.e., the mean algorithm) using the adjacent data element TDA. The first valid data element is (2, 2), and the resultant B20Alg1 value 120, count 1, is used further starting at FIG. 50.

FIG. 47 shows an example data array for the ten-data element by ten-data element image selection of B20 (as shown in the FIG. 41 data array) after analysis with B20Alg3 (i.e., the spread of values algorithm) using the adjacent data element TDA. The first valid data element is (2, 2) and the resultant B20Alg3 value 111, count 1, is used further starting at FIG. 50.

For this example, algorithmic analysis of a selection of B173 as shown in the FIG. 42 data array begins at any valid, user-specified, preset, or automatically determined data element. In one embodiment, processing with Alg5 (which is hereafter designated with relation to B173 as "B173Alg5") using the adjacent data element TDA initializes at TDE (2, 2) and returns a value of 84, count 1. This resultant value 84 is stored in an algorithm value cache, which is sized and addressed in the same manner as the FIGS. 40-42 data arrays, at the corresponding TDE location (2, 2).

In one embodiment, following the evaluation of TDE (2, 2) of the FIG. 42 data array with B173Alg5 using the adjacent data element TDA, known feature training proceeds to the next valid TDE and then continues until the collection of valid TDEs in the data array is exhausted or processing is terminated.

FIG. 48 shows an example data array for the ten-data element by ten-data element selection of B173 (as shown in the FIG. 42 data array) after analysis with B173Alg5 (i.e., the value algorithm) using the adjacent data element TDA. The first valid data element is (2, 2), and the resultant B173Alg5 value 84, count 1, is used further starting at FIG. 50.

For this example, algorithmic processing of a selection of B200 as shown in the FIG. 43 data array begins at any valid, user-specified, preset, or automatically determined data element. In one embodiment, analysis with Alg6 (which is hereafter designated with relation to B200 as "B200Alg6") using the adjacent data element TDA initializes at TDE (2, 2) and returns a value of 124, count 1. This resultant value 124 is stored in an algorithm value cache, which is sized and addressed in the same manner as the FIGS. 40-43 data arrays, at the corresponding TDE location (2, 2).

In one embodiment, following the evaluation of TDE (2, 2) of the FIG. 43 data array with B200Alg6 using the adjacent data element TDA, known feature training proceeds to the next valid TDE and then continues until the collection of valid TDEs in the data array is exhausted or processing is terminated.

FIG. 49 shows an example data array for the ten-data element by ten-data element selection of B200 (as shown in the FIG. 43 data array) after analysis with B200Alg6 (i.e., the value algorithm masked with 0xFFFC) using the adjacent data element TDA. The first valid data element is (2, 2), and the resultant B200Alg6 value 124, count 1, is used further starting at FIG. 50.

Figure 50:
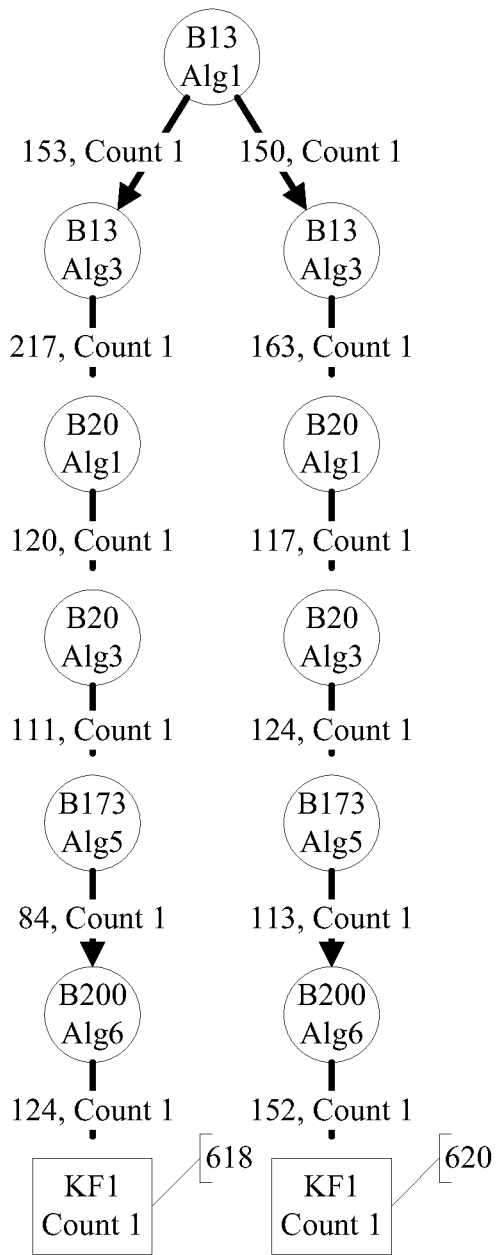
FIG. 50 shows an example synaptic web containing two synaptic paths built from the algorithmic evaluation of TDE (2, 2) and TDE (3, 2) of the FIGS. 40-43 data arrays, which represent data selections within Bands 13, 20, 173, and 200, respectively, of the AVIRIS hyperspectral data set, with the mean, spread of values, value, and value masked with 0xFFFC algorithms using the adjacent data element TDA.

FIG. 50 shows one embodiment of an example synaptic web containing two synaptic paths formed after algorithmic evaluation of TDE (2, 2) and TDE (3, 2) of the FIG. 40 data array (which represents a data selection from B13 of the AVIRIS hyperspectral data set) with B13Alg1 and B13Alg3; TDE (2, 2) and TDE (3, 2) of the FIG. 41 data array (which represents a data selection from B20 of the AVIRIS hyperspectral data set) with B20Alg1 and B20Alg3; TDE (2, 2) and TDE (3, 2) of the FIG. 42 data array (which represents a data selection from B173 of the AVIRIS hyperspectral data set) with B173Alg5; and TDE (2, 2) and TDE (3, 2) of the FIG. 43 data array (which represents a data selection from B200 of the AVIRIS hyperspectral data set) with B200Alg6 using the adjacent data element TDA. After analyzing TDE (2, 2) and (3, 2), there are two different synaptic paths that terminate with two synaptic leaves 618 and 620, each of which identify the same known feature, "KF1."

In one embodiment, once training of one or a plurality of known features from the original ten-data element by ten-data element data arrays (as shown in FIGS. 40-43) is complete and the training values are stored in the synaptic web (as shown in FIG. 50), a new data set selection containing one or a plurality of unknown features is presented to the system for analysis and known feature recognition.

FIG. 51 shows an example data array representing a selection of B13 of the AVIRIS hyperspectral data set. In this example, B13 is represented as a two-dimensional, six-data element by six-data element selection of a known feature. In one embodiment, it is presumed that this example data selection is obtained using the same type of data capture device as is used to obtain the example data array of FIG. 40. The image selection has a total of thirty-six data elements.

FIG. 52 shows an example data array representing a selection of B20 of the AVIRIS hyperspectral data set. In this example, B20 is represented as a two-dimensional, six-data element by six-data element selection of a known feature. In one embodiment, it is presumed that this example data selection is obtained using the same type of data capture device as is used to obtain the example data array of FIG. 41. The image selection has a total of thirty-six data elements.

FIG. 53 shows an example data array representing a selection of B173 of the AVIRIS hyperspectral data set. In this example, B173 is represented as a two-dimensional, six-data element by six-data element selection of a known feature. In one embodiment, it is presumed that this example data selection is obtained using the same type of data capture device as is used to obtain the example data array of FIG. 42. The image selection has a total of thirty-six data elements.

FIG. 54 shows an example data array representing a selection of B200 of the AVIRIS hyperspectral data set. In this example, B200 is represented as a two-dimensional, six-data element by six-data element selection of a known feature. In one embodiment, it is presumed that this example data selection is obtained using the same type of data capture device as is used to obtain the example data array of FIG. 43. The image selection has a total of thirty-six data elements.

As previously noted, the same evaluation algorithms and the same TDA as are used during preliminary known feature training (as described with relation to FIGS. 40-50) must be employed to evaluate the new data set selections (as shown in FIGS. 51-54). For this example, the adjacent data element TDA (as shown in FIG. 24) and the mean algorithm, the spread of values algorithm, the value algorithm, and the value algorithm masked with 0xFFFC are used to accomplish known feature recognition.

For this example, algorithmic processing of a selection of B13 as shown in the FIG. 51 data array begins at any valid, user-specified, preset, or automatically determined data element. In one embodiment, processing with B13Alg1 using the adjacent data element TDA initializes at TDE (2, 2) and returns a value of 153, count 1. This resultant value 153 is stored in an algorithm value cache, which is sized and addressed in the same manner as the FIG. 51 data array, at the corresponding TDE location (2, 2).

In one embodiment, TDE (2, 2) of B13 as shown in the FIG. 51 data array is then processed with B13Alg3 using the adjacent data element TDA. A value of 217, count 1, is returned and is stored in the algorithm value cache at the corresponding TDE location (2, 2).

In one embodiment, following the evaluation of TDE (2, 2) of the FIG. 51 data array with B13Alg1 and B13Alg3 using the adjacent data element TDA, processing proceeds to the next valid TDE and then continues until the collection of valid TDEs in the data array is exhausted or processing is terminated. In an alternate embodiment, all valid TDEs of the FIG. 51 data array are processed with a single evaluation algorithm using the adjacent data element TDA prior to initialization of processing with any subsequent algorithms.

FIG. 55 shows an example data array for the six-data element by six-data element selection of B13 (as shown in the FIG. 51 data array) after analysis with B13Alg1 (i.e., the mean algorithm) using the adjacent data element TDA. The first valid data element is (2, 2), and the resultant B13Alg1 value 153, count 1, is used further starting at FIG. 61.

FIG. 56 shows an example data array for the six-data element by six-data element selection of B13 (as shown in the FIG. 51 data array) after analysis with B13Alg3 (i.e., the spread of values algorithm) using the adjacent data element TDA. The first valid data element is (2, 2), and the resultant B13Alg3 value 217, count 1, is used further starting at FIG. 61.

For this example, algorithmic processing of a selection of B20 as shown in the FIG. 52 data array begins at any valid, user-specified, preset, or automatically determined data element. In one embodiment, processing with B20Alg1 using the adjacent data element TDA initializes at TDE (2, 2) and returns a value of 120, count 1. This resultant value 120 is stored in an algorithm value cache, which is sized and addressed in the same manner as the FIGS. 51-52 data arrays, at the corresponding TDE location (2, 2).

In one embodiment, TDE (2, 2) of B13 as shown in the FIG. 52 data array is then processed with B20Alg3 using the adjacent data element TDA. A value of 111, count 1, is returned and is stored in the algorithm value cache at the corresponding TDE location (2, 2).

In one embodiment, following the evaluation of TDE (2, 2) of the FIG. 52 data array with B20Alg1 and B20Alg3 using the adjacent data element TDA, processing proceeds to the next valid TDE and then continues until the collection of valid TDEs in the data array is exhausted or processing is terminated. In an alternate instance, all valid TDEs of the FIG. 52 data array are processed with a single evaluation algorithm using the adjacent data element TDA prior to initialization of processing with any subsequent algorithms.

FIG. 57 shows an example data array for the six-data element by six-data element selection of B20 (as shown in the FIG. 52 data array) after analysis with B20Alg1 (i.e., the mean algorithm) using the adjacent data element TDA. The first valid data element is (2, 2), and the resultant B20Alg1 value 120 count 1, is used further starting at FIG. 61.

FIG. 58 shows an example data array for the six-data element by six-data element selection of B20 (as shown in the FIG. 52 data array) after analysis with B20Alg3 (i.e., the spread of values algorithm) using the adjacent data element TDA. The first valid data element is (2, 2), and the resultant B20Alg3 value 143, count 1, is used further starting at FIG. 61.

For this example, algorithmic processing of a selection of B173 as shown in the FIG. 53 data array begins at any valid, user-specified, preset, or automatically determined data element. In one embodiment, processing with B173Alg5 using the adjacent data element TDA initializes at TDE (2, 2) and returns a value of 84, count 1. This resultant value 84 is stored in an algorithm value cache, which is sized and addressed in the same manner as the FIGS. 51-53 data arrays, at the corresponding TDE location (2, 2).

In one embodiment, following the evaluation of TDE (2, 2) of the FIG. 53 data array with B173Alg5 using the adjacent data element TDA, processing proceeds to the next valid TDE and then continues until the collection of valid TDEs in the data array is exhausted or processing is terminated.

Figure 59:
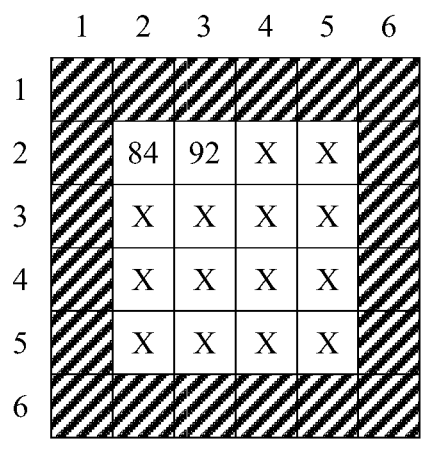

FIG. 59 shows an example data array for the six-data element by six-data element selection of B173 (as shown in the FIG. 53 data array) after analysis with B173Alg5 (i.e., the value algorithm) using the adjacent data element TDA. The first valid data element is (2, 2), and the resultant B173Alg5 value 84, count 1, is used further starting at FIG. 61.

For this example, algorithmic processing of a selection of Band 200 as shown in the FIG. 54 data array begins at any valid, user-specified, preset, or automatically determined data element. In one embodiment, processing with B200Alg6 using the adjacent data element TDA initializes at TDE (2, 2) and returns a value of 124, count 1. This resultant value 124 is stored in an algorithm value cache, which is sized and addressed in the same manner as the FIGS. 51-54 data arrays, at the corresponding TDE location (2, 2).

In one embodiment, following the evaluation of TDE (2, 2) of the FIG. 54 data array with B200Alg6 using the adjacent data element TDA, processing proceeds to the next valid TDE and then continues until the collection of valid TDEs in the data array is exhausted or processing is terminated.

Figure 60:
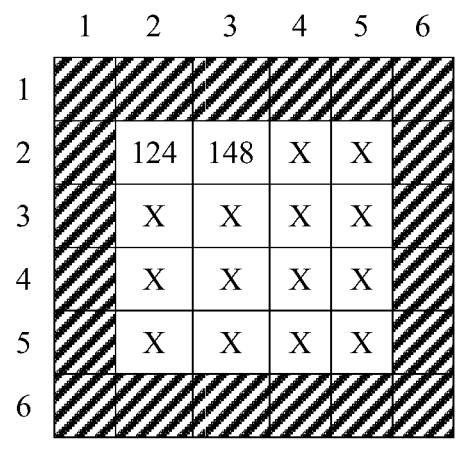

FIG. 60 shows an example data array for the six-data element by six-data element selection of B200 (as shown in the FIG. 54 data array) after analysis with B200Alg6 (i.e., the value algorithm masked with 0xFFFC) using the adjacent data element TDA. The first valid data element is (2, 2), and the resultant B200Alg6 value 124, count 1, is used further starting at FIG. 61.

Figure 61:
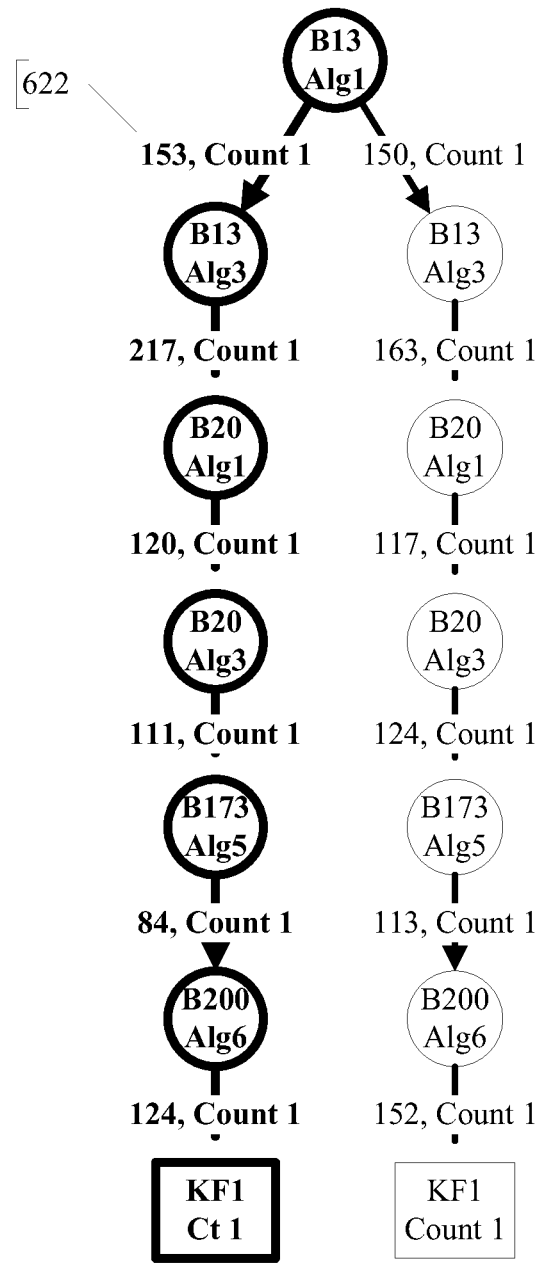
FIG. 61 shows an example synaptic web wherein the algorithm processing results of the first valid data element (2, 2) of FIGS. 51-54 are compared to the values of the existing partial synaptic web trained from the algorithmic evaluation of the FIGS. 40-43 data arrays in an effort to identify a known feature(s) within the data arrays of FIGS. 51-54.

FIG. 61 shows one embodiment of an example synaptic web wherein the algorithm processing results of the first valid data element (2, 2) of the FIGS. 51-54 data arrays (as shown in the data arrays of FIGS. 55-60) are compared to the existing partial synaptic web (as originally shown in FIG. 50), which is trained from the algorithmic evaluation of the data arrays of FIGS. 40-43 (as previously described in FIGS. 44-49). Referencing the previously trained synaptic web of FIG. 50, the list of B13Alg1 values is searched for the value 153, and a node for the second algorithm (i.e., B13Alg3) is found. In the second node, a search for the B13Alg3 value of 217 is conducted, and a node for the third algorithm (i.e., B20Alg1) is found. In the third node, a search for the B20Alg1 value of 120 is conducted, and a node for the fourth algorithm (i.e., B20Alg3) is found. In the fourth node, a search for the B20Alg3 value of 111 is conducted, and a node for the fifth algorithm (i.e., B173Alg5) is found. In the fifth node, a search for the B173Alg5 value of 84 is conducted, and a node for the sixth algorithm (i.e., B200Alg6) is found. In the sixth node, a search for the B200Alg6 value of 124 is also found. Thus, the first valid data element (2, 2) of the sample data arrays of FIGS. 55-60 is identified as being consistent with KF1 following the known synaptic path 622 as highlighted.

The screenshots presented in FIGS. 62-104 represent one embodiment of a user interface for data analysis and feature recognition in the multispectral and/or hyperspectral imagery modality; infinite alternatives exist.

Figure 62:
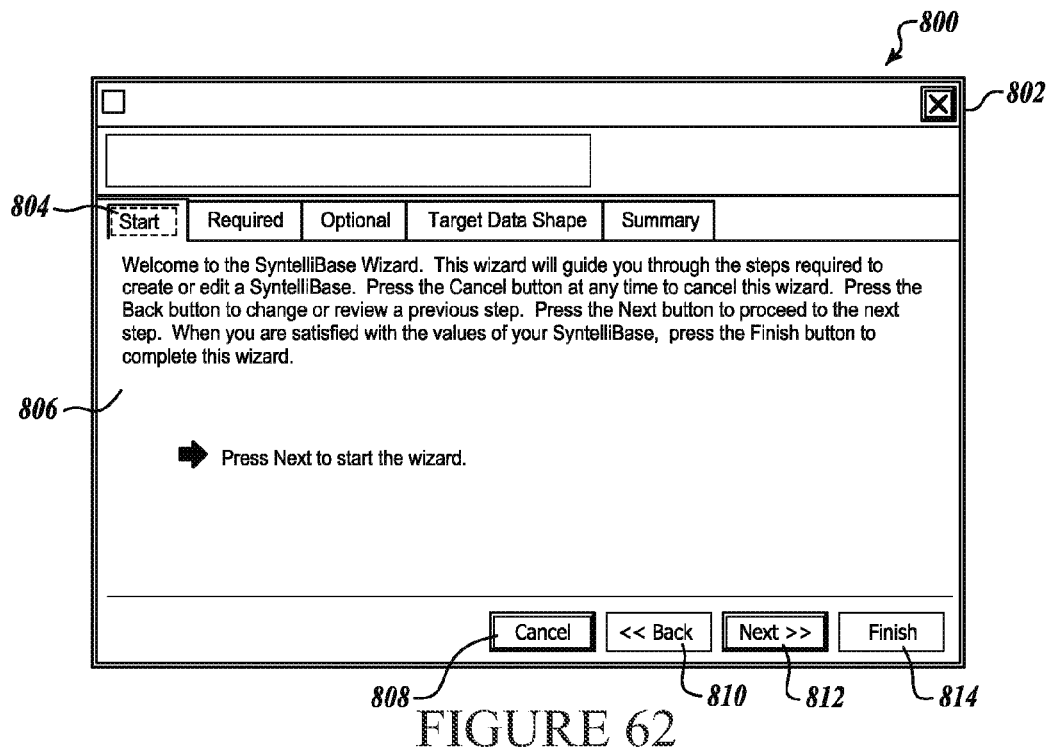
FIG. 62 shows a screenshot of the "Start" tab or introduction screen of the "New SyntelliBase Wizard"

FIG. 62 is a screenshot 800 showing the "Start" tab 804 or introduction screen of the "New SyntelliBase Wizard," which guides the user through the step-by-step creation and/or editing of a datastore (which is embodied herein as a synaptic web and which may be referred to hereafter as a "SyntelliBase"). In the top right corner of the wizard is a button 802 to close and exit the wizard. In one embodiment, the user navigates through the wizard using the tab controls at the top of each wizard dialog box or the "Cancel 808," "Back 810," "Next 812," and "Finish 814" buttons at the bottom. This general layout for the wizard as described herein is prevalent throughout most wizard dialog boxes.

Figure 63:
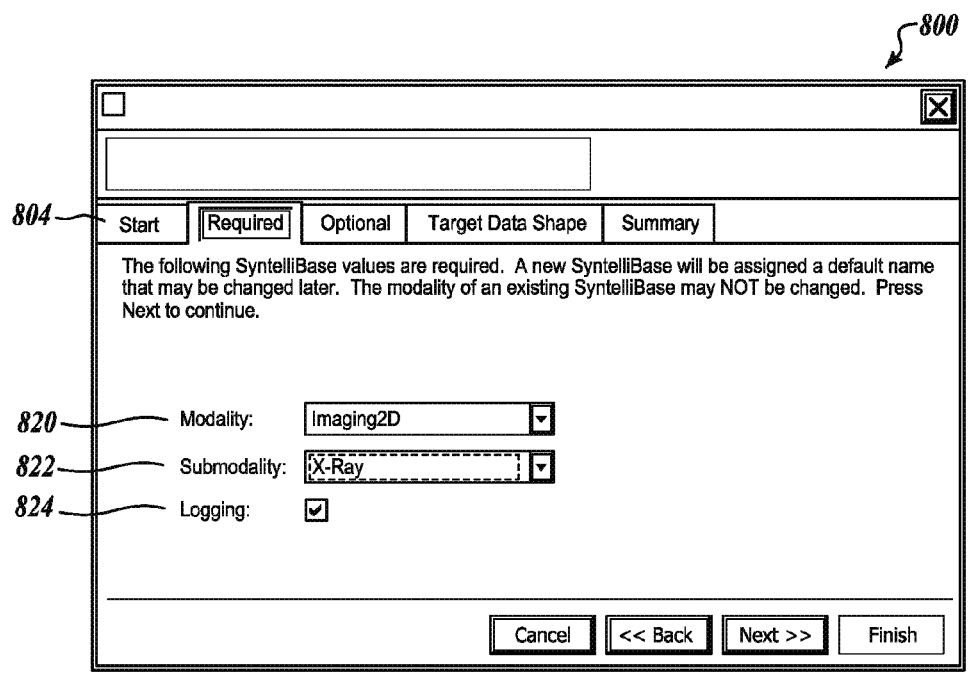
FIG. 63 shows a screenshot of the "Required" tab of the "New SyntelliBase Wizard"

FIG. 63 is a screenshot 800 showing the "Required" tab 804 of the "New SyntelliBase Wizard" wherein the initial values defining the datastore are set by the user. The type of digital data to be processed is identified by the "Modality" combination box 820, which contains a listing of data modalities specifying the digital data stream format, and the "Submodality" combination box 822, which contains a series of data submodalities specifying the use of the data or specific application of the data modality. While the SyntelliBase name can be changed later and at any time, the modality and submodality information cannot. Also located on this tab, the user decides whether or not to turn on "Logging" 824.

Figure 64:
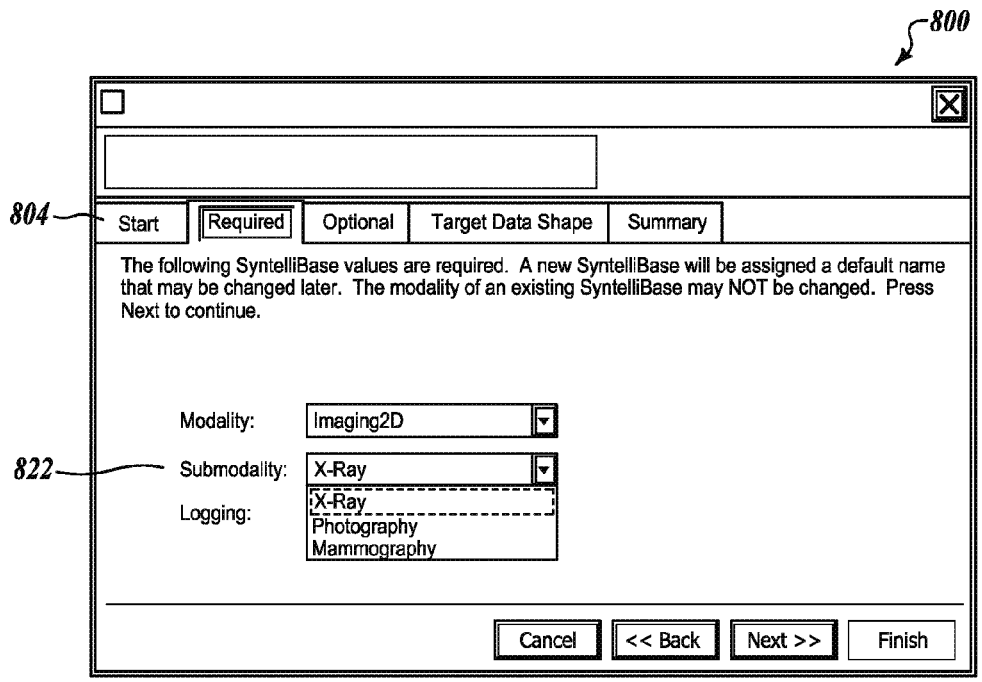
FIG. 64 shows a screenshot of the expanded "Submodality" combination box of the "Required" tab of the "New SyntelliBase Wizard"

FIG. 64 is a screenshot 800 showing the expanded "Submodality" combination box 822 of the "Required" tab 804 of the "New SyntelliBase Wizard." In one embodiment, the "Submodality" combination box 822 contains a configurable list of data sub-classifications (i.e., submodalities) that are currently available for selection within the previously selected digital data "Modality." Assigning a data submodality enables a user to address differences in digital data within a given data modality.

Figure 65:
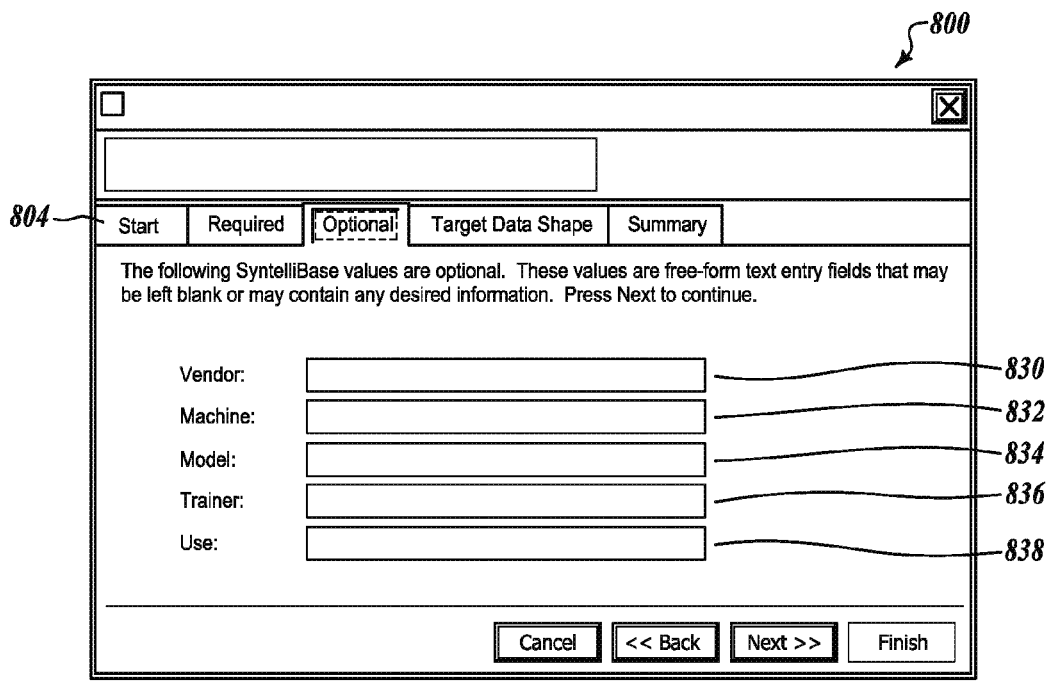
FIG. 65 shows a screenshot of the "Optional" tab of the "New SyntelliBase Wizard"

FIG. 65 is a screenshot 800 showing the "Optional" tab 804 of the "New SyntelliBase Wizard" wherein descriptive demographic parameters for information relating to the machine "Vendor" name 830, "Machine" type 832, machine "Model" 834, "Trainer" name 836, and datastore "Use" 838 are optionally entered into text boxes by the user. In one embodiment, this information is used to categorize datastores received and/or stored by a network.

Figure 66:
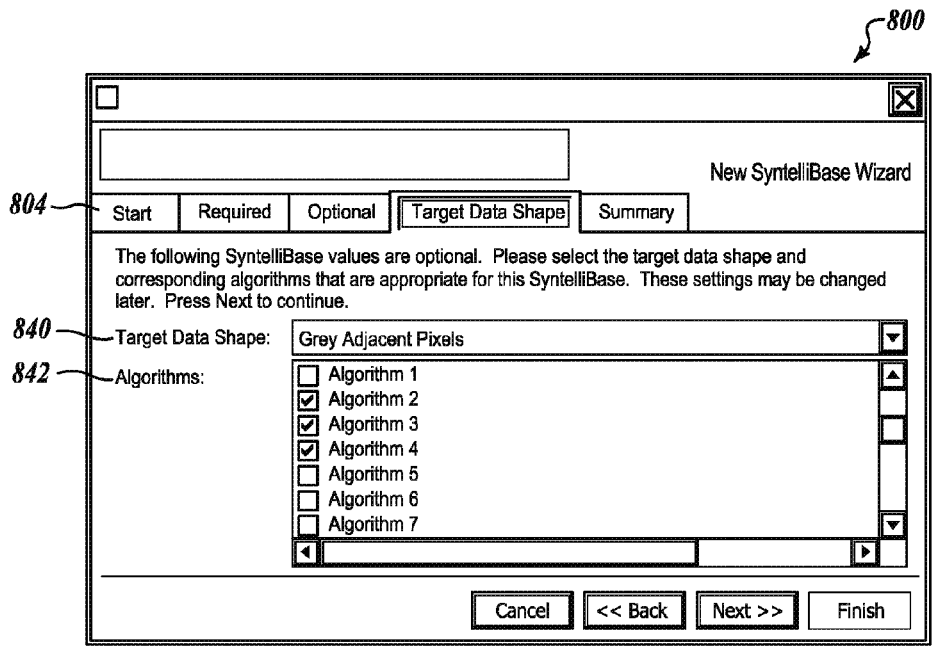
FIG. 66 shows a screenshot of the "Target Data Shape" tab of the "New SyntelliBase Wizard"

FIG. 66 is a screenshot 800 showing the "Target Data Shape" tab 804 of the "New SyntelliBase Wizard" wherein the target data shape 840 (i.e., TDA) and a set of evaluation algorithms 842 corresponding to the selected target data shape are selected by the user. The "Target Data Shape" combination box 840 provides a listing of available TDAs that are used to determine how data immediately surrounding a given TDE is collected for analysis by the evaluation algorithms. In this example, the "Target Data Shape" box 840 is set to the "Grey Adjacent Pixels" TDA, which exists as a square of the nine adjacent pixels surrounding a single, central pixel (i.e., TDE). In one embodiment, the process of selecting the evaluation algorithms applicable to the current processing run begins by choosing a specific TDA shape, while in an alternate embodiment the evaluation algorithms are selected independently from the TDA. In this example a series of three evaluation algorithms 842, "Algorithm 2," "Algorithm 3," and "Algorithm 4," are selected by the user. It is a combination of the analysis results for the selected evaluation algorithms, not just the analysis results for a single evaluation algorithm, using the "Grey Adjacent Pixel" target data shape that is employed for training and processing by the synaptic web.

Figure 67:
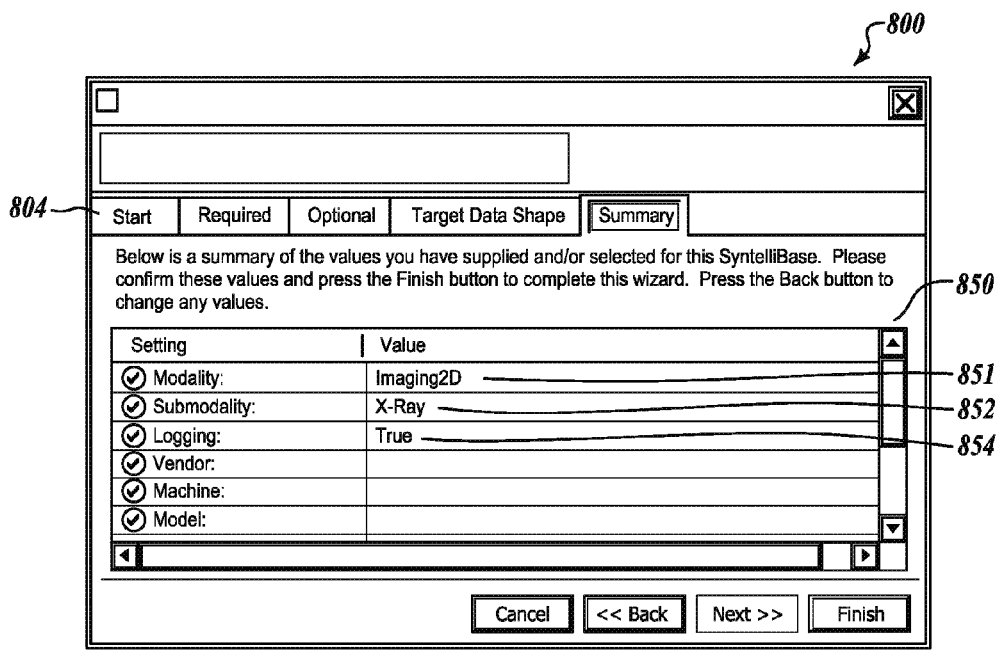
FIG. 67 shows a screenshot of the "Summary" tab of the "New SyntelliBase Wizard"

FIG. 67 is a screenshot 800 showing the "Summary" tab 804 of the "New SyntelliBase Wizard" wherein the current datastore properties and settings are displayed in a table 850 for easy user reference and review. In one embodiment, the selections can be edited by selecting the "Back" button and confirmed by selecting the "Finish" button. In this example, the data "Modality" is "Imaging2D" 851; the data "Submodality" is "X-Ray" 852; and "Logging" is "True" 854.

Figure 68:
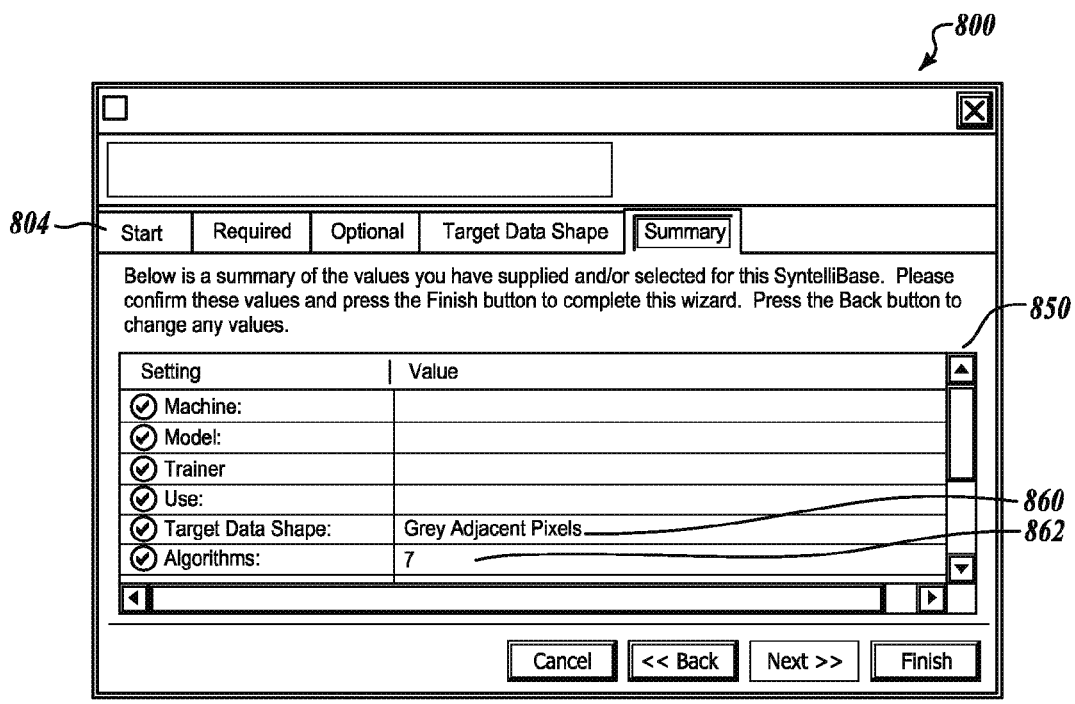
FIG. 68 shows a screenshot of the "Summary" tab of the "New SyntelliBase Wizard.

FIG. 68 is a screenshot 800 showing the "Summary" tab 804 of the "New SyntelliBase Wizard" wherein the table 850, which displays the current datastore properties and settings for easy user reference and review, is scrolled down. In this example, the "Target Data Shape" is "Grey Adjacent Pixels" 860 and the number of evaluation "Algorithms" selected is "7" 862.

Figure 69:
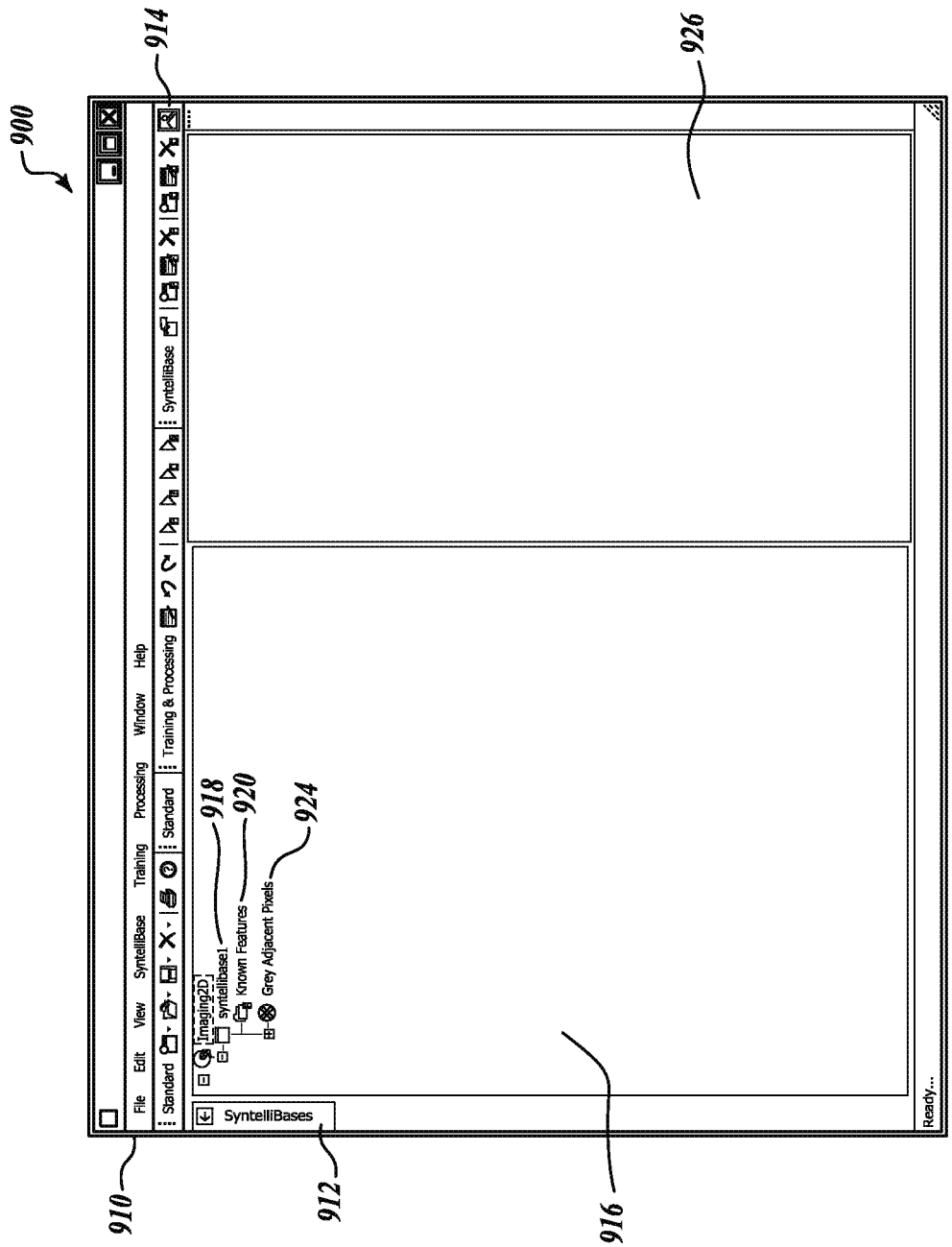
FIG. 69 shows a screenshot of one embodiment of a user-interface for a data analysis and feature recognition system as it after datastore creation is complete.

FIG. 69 is a screenshot 900 showing one embodiment of a user-interface for a data analysis and feature recognition system that is used to accomplish known feature training and identification and as it exists after the completion of datastore creation; infinite alternatives exist. In one embodiment, the application contains some or all of the following user-interface features: a menu bar(s) 910, which is known in the art; sets of icons 914 representing toolbar options designed to provide easy access to the most commonly used application operations while also allowing customization of user preferences; and an application workspace 926. The left-most panel 916 of the user interface, titled "SyntelliBases" 912, contains information including any associated attributes and user settings about any currently open datastores. In this example, there is one datastore, "syntellibase1" 918, opened in the "Imaging2D" data modality; a set of known features, when defined and trained, are stored in the "Known Features" folder 920; and the "Grey Adjacent Pixels" TDA 924 is selected to train "syntellibase1." The right-most panel 926 is a workspace wherein any currently open images, which can be used to train the opened datastore(s) and then subsequently processed to identify the presence of any trained known features, are displayed.

Figure 70:
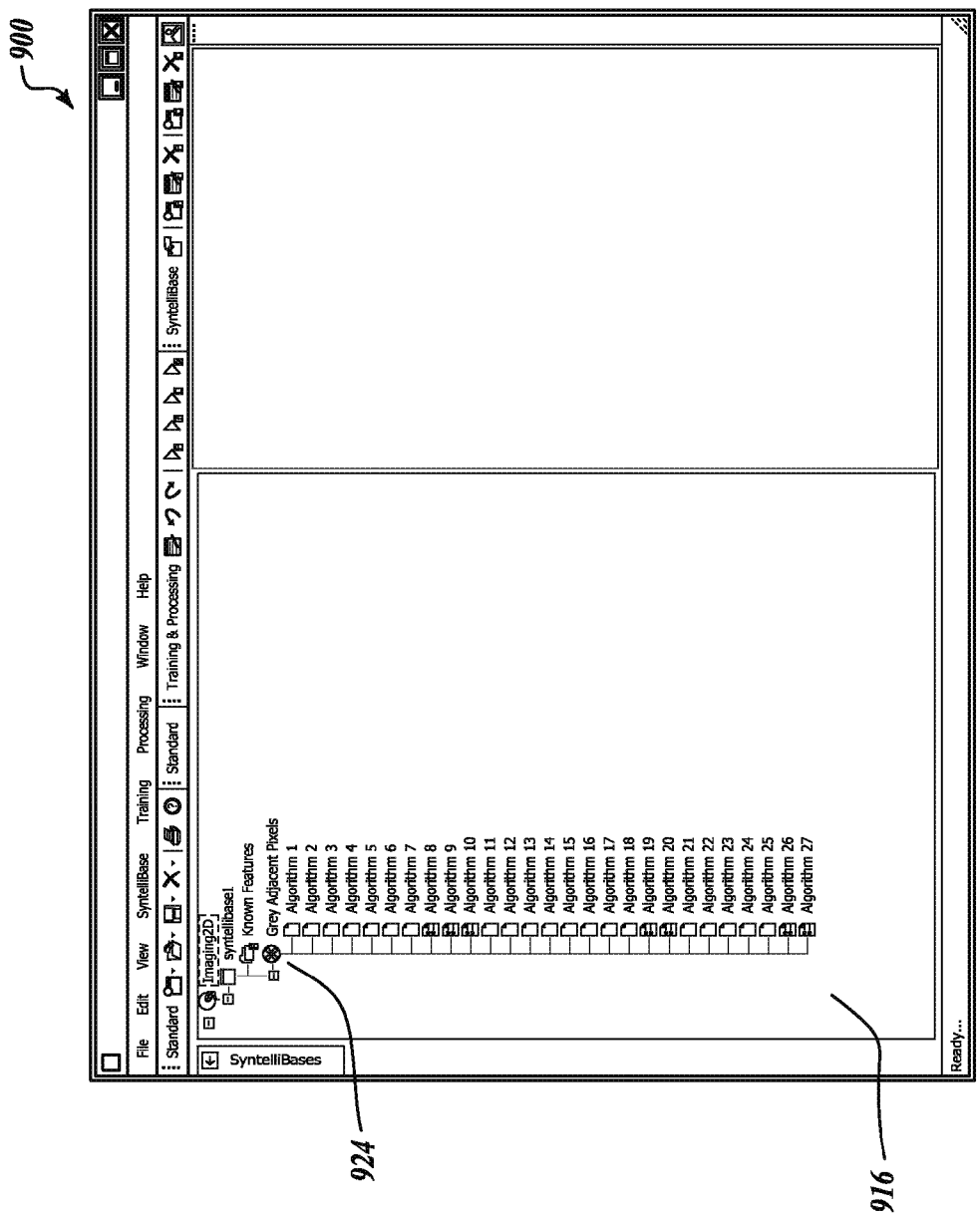
FIG. 70 shows a screenshot of one embodiment of an application to accomplish data analysis and feature recognition wherein the "Grey Adjacent Pixels" TDA is expanded to show a listing of all available evaluation algorithms.

FIG. 70 is a screenshot showing one embodiment of a user-interface for a data analysis and feature recognition system wherein the "Grey Adjacent Pixels" TDA 924 attribute of "syntellibase1" is expanded to reveal a listing of all the associated evaluation algorithms that can be selected for use in conjunction with the current TDA. In this example, the selected evaluation algorithms, which include "Algorithm 8," "Algorithm 9," "Algorithm 10," "Algorithm 19," "Algorithm 20," "Algorithm 26," and "Algorithm 27," are designated by filled-in icons.

Figure 71:
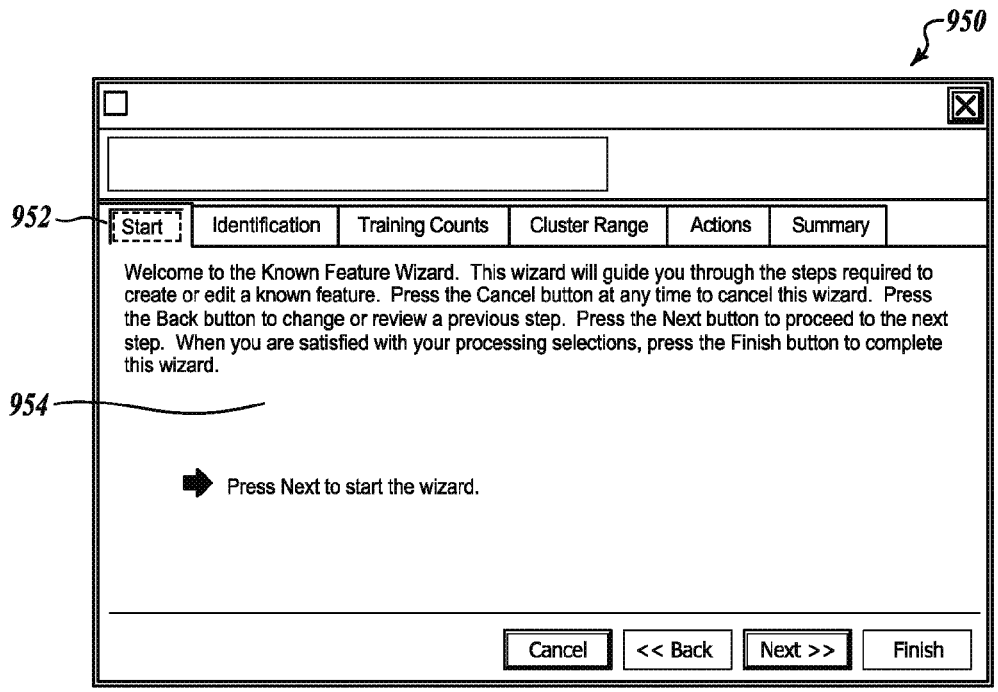
FIG. 71 shows a screenshot of the "Start" tab of the "New Known Feature Wizard"

FIG. 71 is a screenshot 950 showing the "Start" tab 952 or introduction screen of the "New Known Feature Wizard," which guides the user through the step-by-step creation and/or editing of a known feature. The layout of the "New Known Feature Wizard" is described in more detail with reference to FIG. 62.

Figure 72:
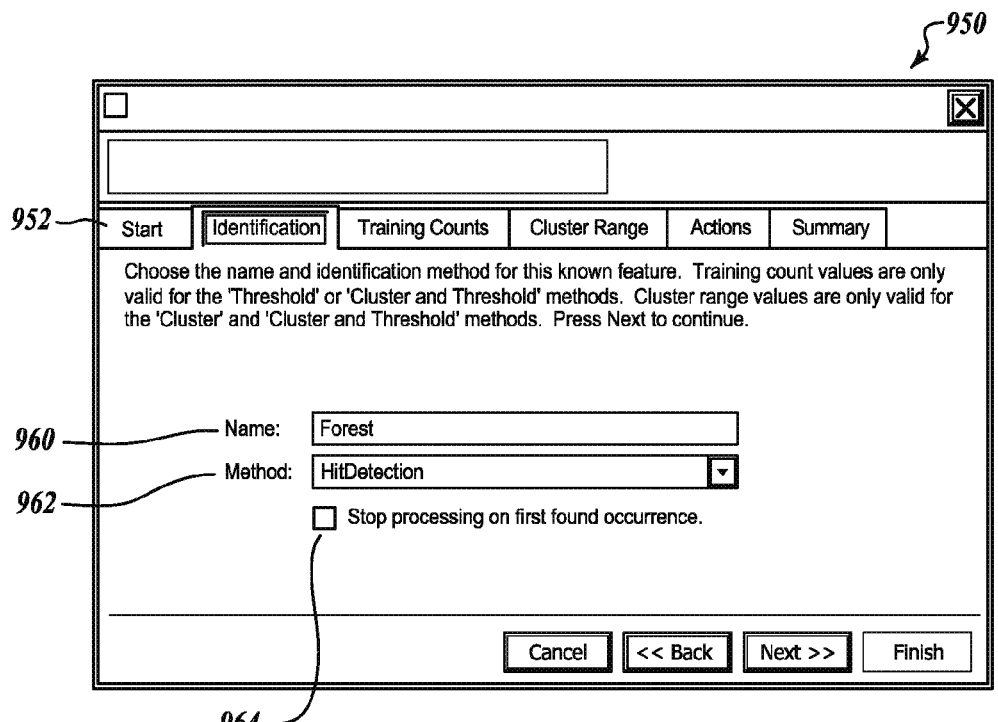
FIG. 72 shows a screenshot of the "Identification" tab of the "New Known Feature Wizard"

FIG. 72 is a screenshot 950 showing the "Identification" tab 952 of the "New Known Feature Wizard" wherein the user assigns a known feature name, which functions to distinguish the current feature from other features, and a known feature processing method of detection, which defines how the known feature is identified in the data set. Also on the "Identification" tab 952, the user decides whether the entire data selection is to be processed or if processing terminates when the system identifies a single occurrence of the current known feature. In one example, the option to stop data processing upon the first found occurrence of the known feature is beneficial if the system identifies an anomaly that should immediately trigger an event such as stopping a production line for quality control purposes. In such a situation, the user checks the option to "Stop processing on first found occurrence."

Otherwise, the entire data selection is processed. In this example, the known feature "Name" 960 is entered into the textbox as "Forest," the known feature "Method" of detection 962 combination box is set to "HitDetection," and the option to "Stop processing on first found occurrence" 964 is unchecked.

Figure 73:
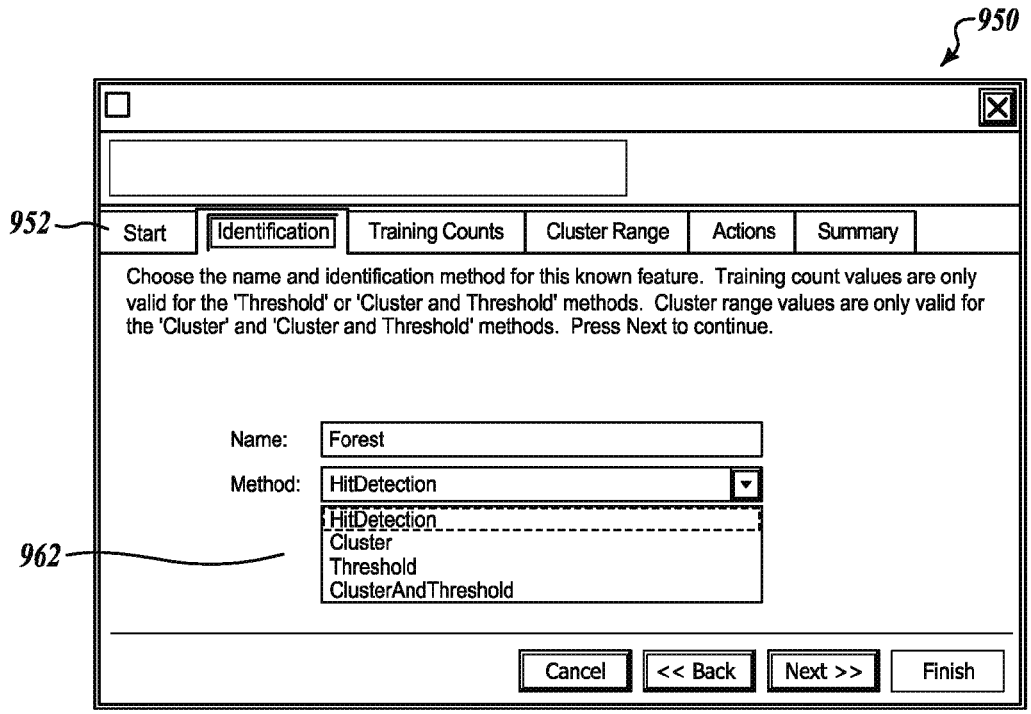
FIG. 73 shows a screenshot of the "Identification" tab of the "New Known Feature Wizard" wherein the known feature "Method" of detection combination box is expanded.

FIG. 73 is a screenshot 950 showing the "Identification" tab 952 of the "New Known Feature Wizard" wherein the known feature "Method" of detection combination box 962 is expanded to reveal a listing of all available known feature methods of identification. In one embodiment, there are four types of processing methods of detection available for selection: "Hit Detection," "Cluster" detection, "Threshold" detection, and "Cluster and Threshold" detection.

In one embodiment, when hit detection is selected as the known feature processing method, a positive identification of a known feature is made when any of the trained entries in the SyntelliBase is matched. In one example, this method is useful to show the user all of the possible locations that a known feature is identified.

In one embodiment, when a known feature is trained, the data patterns associated with the feature are likely to be encountered multiple times. The number of times the pattern is encountered is stored in the synaptic web as the feature's "hit count." In one embodiment, a known feature with cluster detection as its processing method is recognized if the pattern is identified as a trained entry in the synaptic web, and the known feature is identified a given number of times for other surrounding data elements within the given area. In one example, cluster detection is useful to prevent isolated data elements from being erroneously identified as the known feature and has further applicability when the user is attempting to filter out spurious hits.

In one embodiment, threshold detection identifies a known feature if said feature is present for a given synaptic path assuming said path is trained as this known feature a minimum number of times (i.e., threshold) and is not trained more than a maximum number of times (i.e., limit). Otherwise stated, the threshold method of known feature detection recognizes a known feature if the pattern is identified as a trained entry in the synaptic web and that entry has been trained as this known feature a number of times greater than a given threshold but less than a given limit. In one example, threshold detection ensures that patterns that have seldom been associated with a feature cannot be used to cause a misidentification and is useful to filter out under-trained or over-trained known feature hits.

In one embodiment, the cluster and threshold detection processing method uses a combination of both the clustering and thresholding methodologies as previously described. Accordingly, a known feature is identified if said feature is present for a given synaptic path assuming said path is trained as this known feature a minimum number of times greater than the threshold value but less than a given limit value (i.e., thresholding filter), and then if the known feature is identified a given number of times for other surrounding data elements within the given area (i.e., clustering filter).

Figure 74:
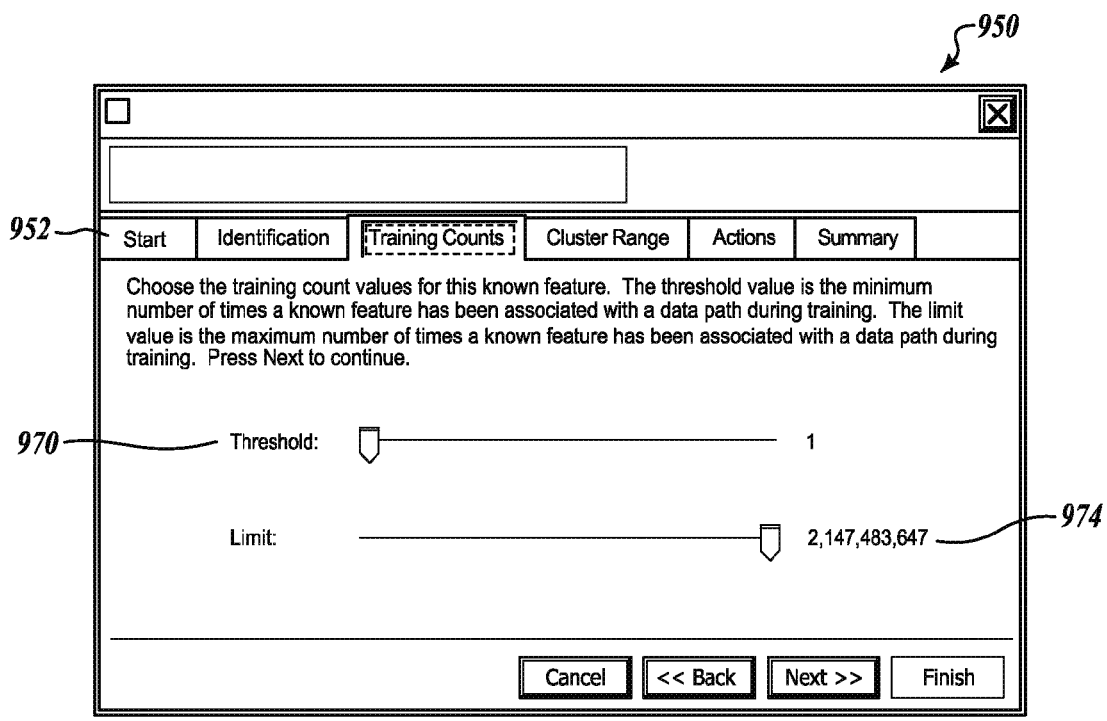
FIG. 74 shows a screenshot of the "Training Counts" tab of the "New Known Feature Wizard"

FIG. 74 is a screenshot 950 showing the "Training Counts" tab 952 of the "New Known Feature Wizard" wherein the threshold detection parameters are set by the user. In one embodiment, the user selects a "Threshold" value representing the minimum number of times the given known feature must be associated with a synaptic path during training in order for said known feature to be positively identified for the given synaptic path. In one embodiment, increasing the threshold value guarantees that only recurring synaptic paths with a number of occurrences higher than the threshold value are used in processing thus ensuring a higher level of confidence in the eventual identification of the known feature. In one embodiment, the user selects a "Limit" value representing the maximum number of times the given known feature can be associated with the synaptic path during training in order for said known feature to be positively identified for the given synaptic path. In one embodiment, processing with an upper limit can identify those patterns that may be producing erroneous known feature identification. In this example, the "Threshold" value 970 is set to the default value of "1," and the "Limit" value 974 is set to the default value of "2,147,483,647."

Figure 75:
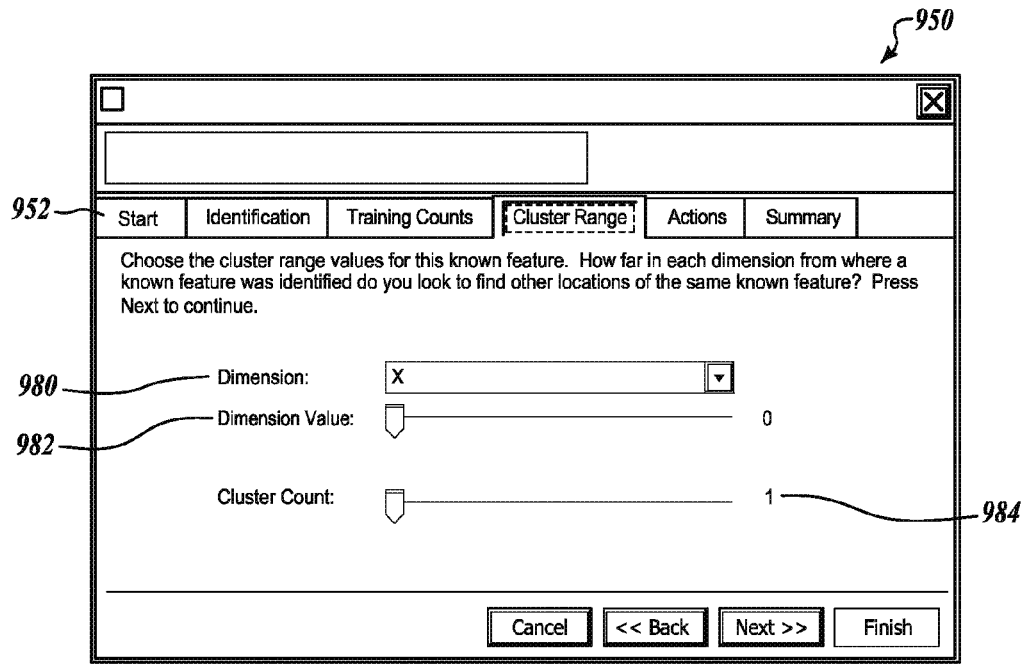
FIG. 75 shows a screenshot of the "Cluster Range" tab of the "New Known Feature Wizard"

FIG. 75 is a screenshot 950 showing the "Cluster Range" tab 952 of the "New Known Feature Wizard" wherein the cluster detection parameters are set. In cluster detection, as well as in cluster and threshold detection, the known feature has an associated "dimension value" or "cluster range value" 982, which defines how far, in each applicable dimension 980 of the multispectral or hyperspectral data set, from where a known feature is identified that other positive identifications (i.e., hits) of the same known feature must also be identified in order for the known feature to be positively identified for a given data element (i.e., TDE). In one embodiment, the user selects the "Cluster Count" value 984, which is the number of times the same known feature must occur within the defined cluster area (as specified by the "dimension value" or "cluster range value") in order for the known feature to be positively identified (i.e., "hit") for the current data element. In one example, a cluster range value of zero yields a cluster area containing a single data element, while in another example, a cluster range value of one yields a cluster area containing all the data elements within one unit of the subject data element. In one embodiment, adjustment of the cluster range values is useful if the data is known to have different vertical and horizontal scales.

Figure 76:
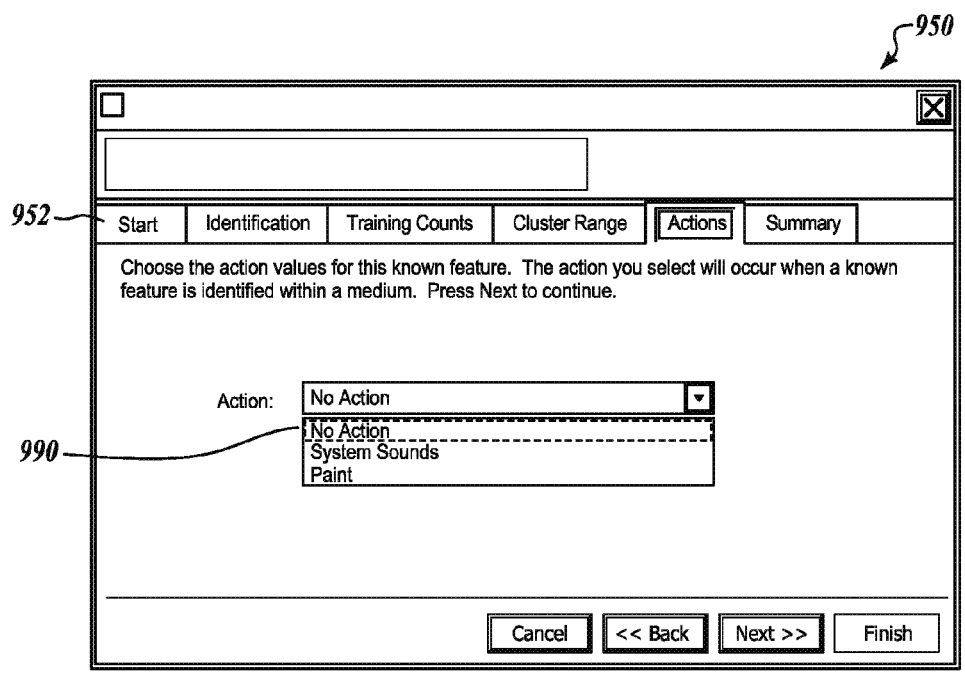
FIG. 76 shows a screenshot of the "Actions" tab of the "New Known Feature Wizard"

FIG. 76 is a screenshot 950 showing the "Actions" tab 952 of the "New Known Feature Wizard" wherein the system action output is selected by the user. In one embodiment, the "Action" combination box 990 contains a listing of the available system actions-on-detection, which are the possible responses of the system and/or methods of user notification that can occur when a known feature is positively identified for a given data element within the data set. In one embodiment, the possible output options are "No Action" (i.e., do nothing), "System Sounds" (i.e., play a user-specified, preset, or automatically determined system sound), and "Paint" (i.e., paint the data element identified as the known feature a user-specified, preset, or automatically determined system color in an output layer).

Figure 77:
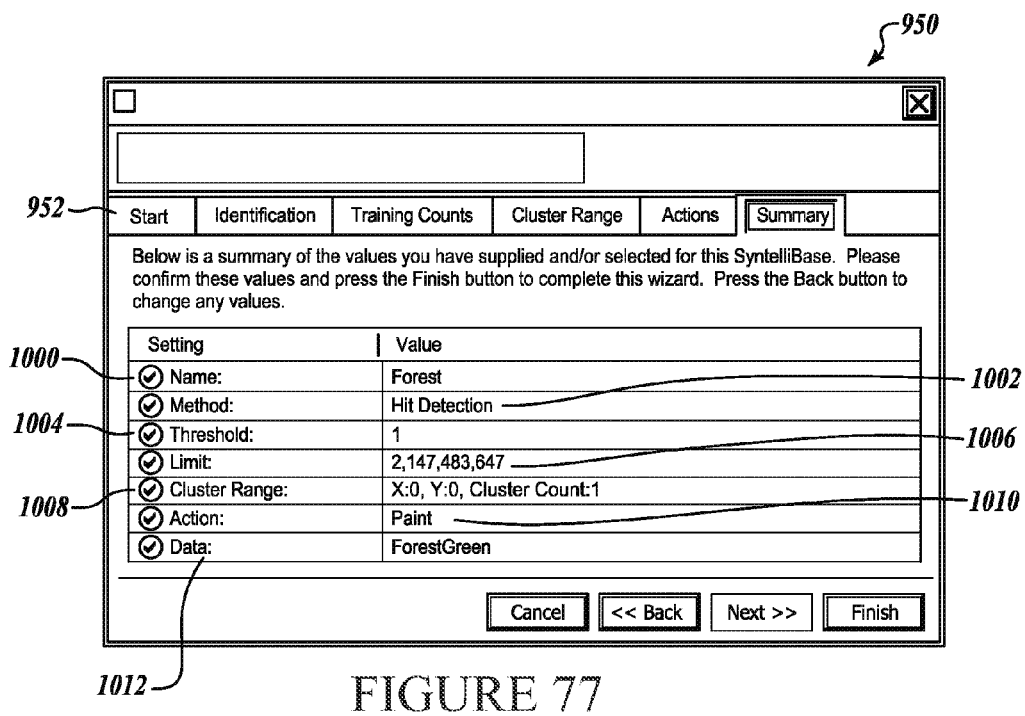
FIG. 77 shows a screenshot of the "Summary" tab of the "New Known Feature Wizard"

FIG. 77 is a screenshot 950 showing the "Summary" tab 952 of the "New Known Feature Wizard" wherein the current known feature properties and settings are displayed for easy user reference and review. In this example, the known feature "Name" 1000 is "Forest"; the "Method" of known feature detection is "Hit Detection" 1002; the "Threshold" value 1004 is "1"; the "Limit" value is "2,147,483,647" 1006; the "Cluster Range" value 1008 sets the "X" dimension value to "0," the "Y" dimension value to "0," and the "Cluster Count" value to "1"; the known feature "Action" on detection is "Paint" 1010; and the action "Data" value 1012 is "Forest-Green."

In one embodiment and after one or a plurality of datastores and one or a plurality of known features are created and/or edited, one medium or a plurality of media, which are to be used to train the datastore(s) by associating the user-specified known feature(s) with the data patterns in a given selection(s), are retrieved and loaded into the system of the present invention. In one embodiment, multiple training sessions are required to achieve reliable feature identification. In one embodiment, selections are used to include or exclude areas of interest within a selected image medium for training or processing purposes.

Figure 78:
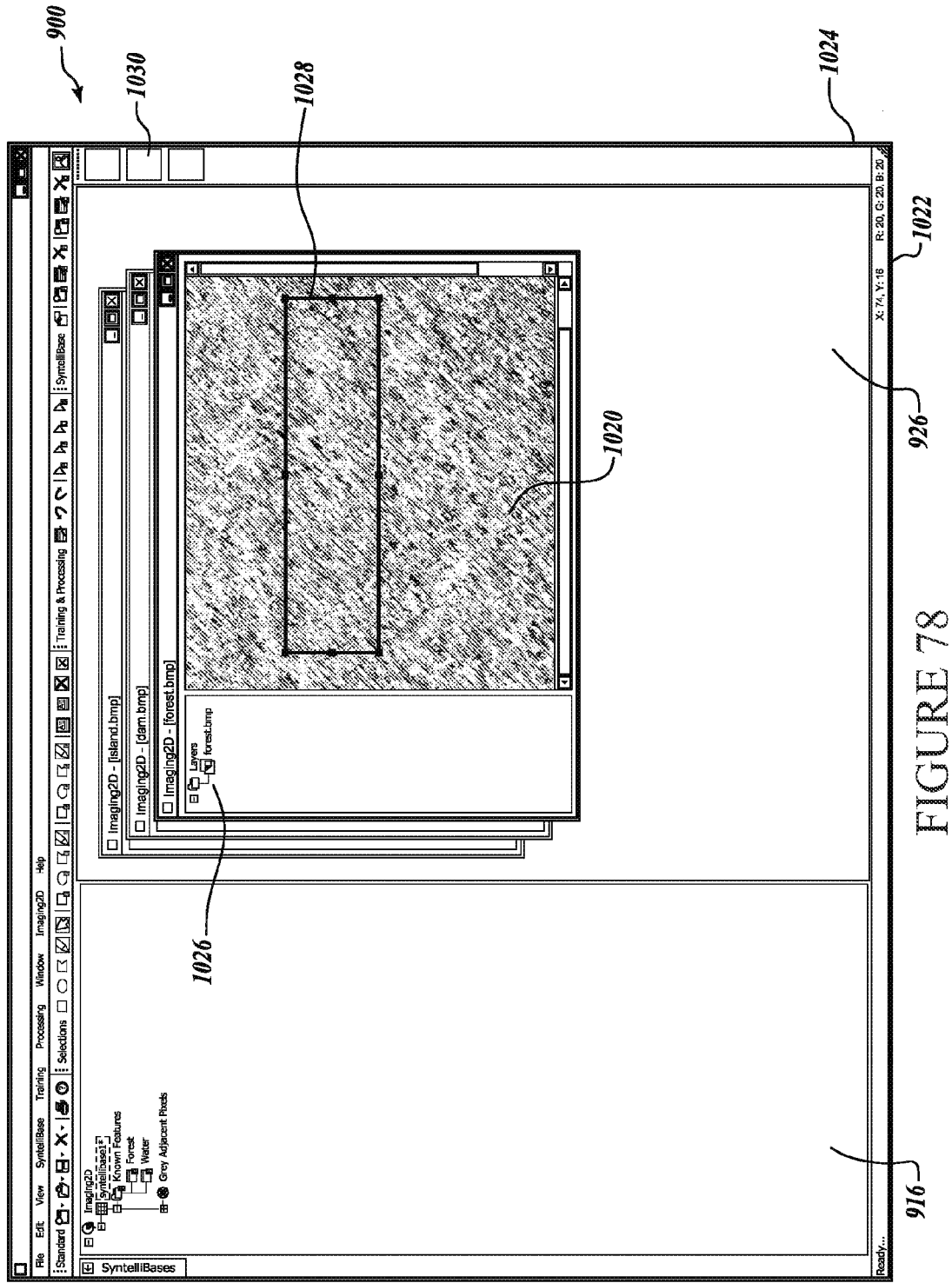
FIG. 78 shows a screenshot of one embodiment of an application to accomplish data analysis and feature recognition wherein the workspace is loaded with a sample image "forest.bmp" containing a user-defined region of interest of the feature "Forest"

FIG. 78 is a screenshot 900 showing one embodiment of an application 1024 to accomplish data analysis and feature recognition. The user-interface features are previously described with reference to FIG. 69. For this example, the application workspace 926 is loaded with three sample images: the image "forest.bmp" 1020 showing an area of forest, the image "dam.bmp," and the image "island.bmp." Within the sample image 1020 is a user-defined selection of forest 1028, which is delimited by a black outlined polygon drawn using a selection tool as is common in the art. This selection area (referred to hereafter as the "region of interest") is to be trained as the known feature "Forest" into the datastore "syntellibase1" using the TDA and evaluation algorithms as selected at FIG. 66. In one embodiment, the panel directly to the left of the sample image 1020 contains a listing of the layers 1026 (i.e., processed known features) that are currently available for viewing. In one embodiment, the area 916 located to the left of the workspace contains a listing of any opened datastores and their associated attributes, such as a listing of trained known features and the user-specified TDA, and the right-most panel of the application contains a "Gallery" of thumbnail images 1030 that are currently loaded into the system. In one embodiment, mouse position and color values 1022, which are based upon the current cursor location as is common in the art, are shown at the bottom right corner of the screen.

Figure 79:
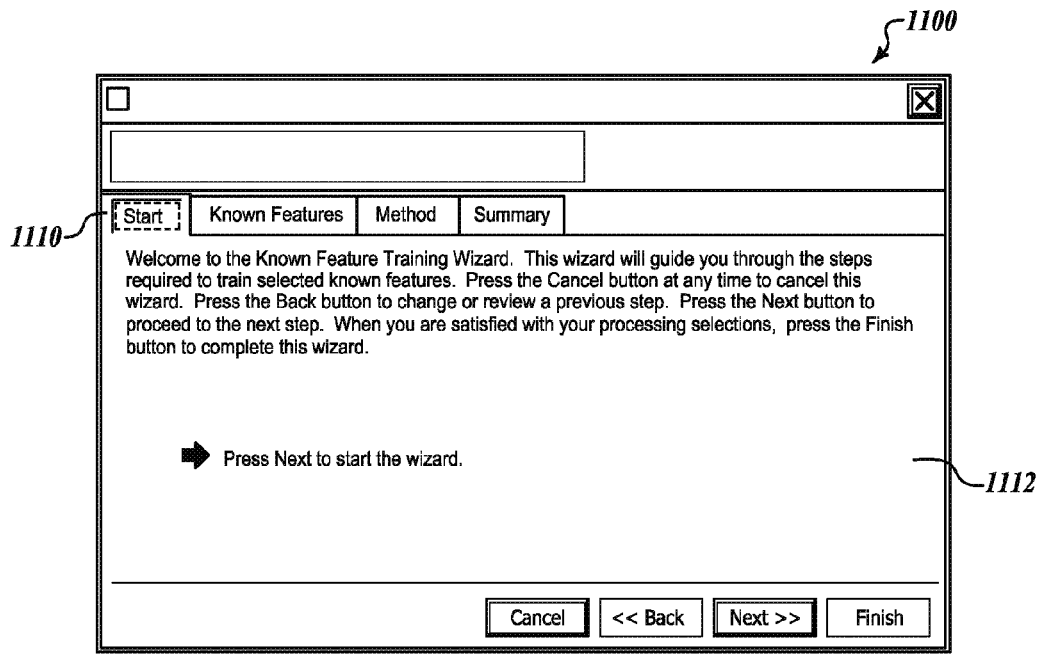
FIG. 79 shows a screenshot of the "Start" tab or introduction screen of the "Train Known Feature Wizard"

FIG. 79 is a screenshot 1100 showing the "Start" tab 1110 or introduction screen of the "Train Known Feature Wizard," which guides the user through the step-by-step process of training or untraining one or a plurality of selected known features. The layout of the "Train Known Feature Wizard" is described in more detail with reference to FIG. 62.

Figure 80:
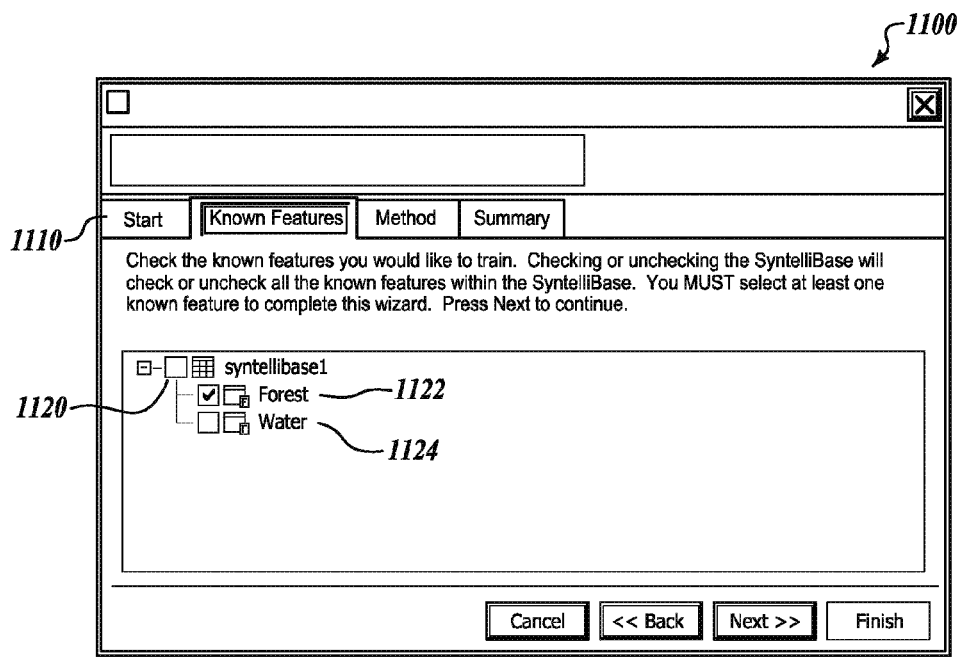
FIG. 80 shows a screenshot of the "Known Features" tab of the "Train Known Feature Wizard"

FIG. 80 is a screenshot 1100 showing the "Known Features" tab 1110 of the "Train Known Feature Wizard" wherein the one or a plurality of previously created known features are selected for training by the user. In one embodiment, the user opts to simultaneously train one or a plurality of known features into one or a plurality of datastores if available. In this example, the listing of available datastores 1120 contains "syntellibase1"; the known feature "Forest" 1122 is selected for training into "syntellibase1"; and the known feature "Water" 1124 is not selected for training into "syntellibase1."

Figure 81:
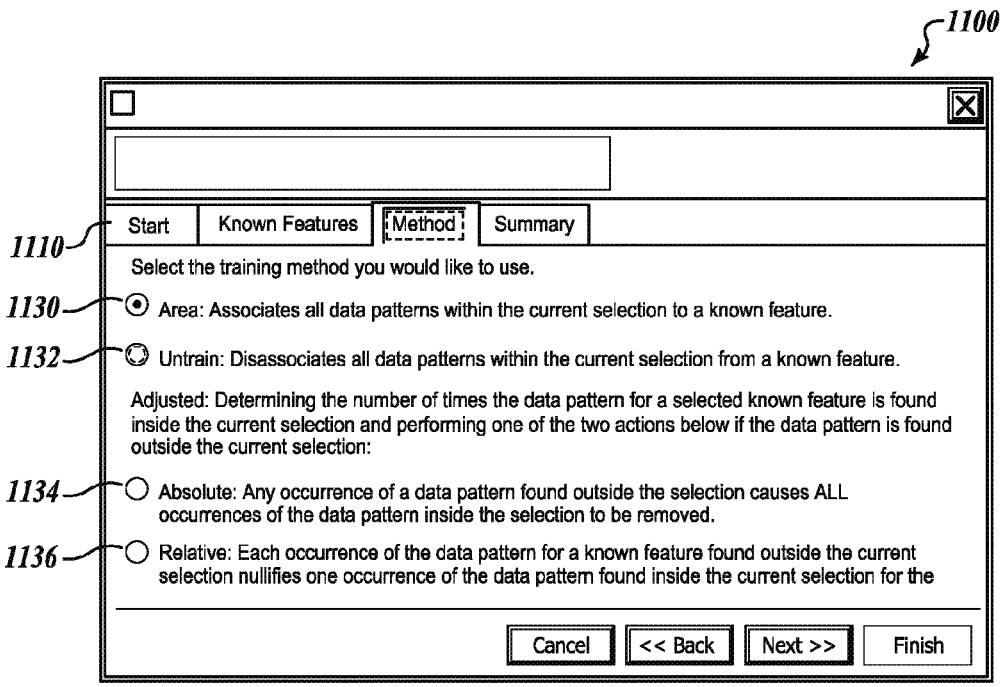
FIG. 81 shows a screenshot of the "Method" tab of the "Train Known Feature Wizard"

FIG. 81 is a screenshot 1100 showing the "Method" tab 1110 of the "Train Known Feature Wizard" wherein the method of known feature training is selected by the user. In one embodiment, the known feature training methodologies include: "Area" training 1130, in which all data patterns within the current data selection are associated with the known feature; area "Untrain" 1132, in which all the data patterns within the current data selection are dissociated from the known feature; "Absolute" adjusted training 1134, in which any occurrence of a feature data pattern found outside the current data selection causes all occurrences of the same data pattern inside the data selection to be removed; and "Relative" adjusted training 1136, in which each occurrence of the feature data pattern found outside the current data selection nullifies one occurrence of the data pattern found inside the current data selection. In the preferred embodiment, the user selects the method of known feature training that is optimal for the specific data modality, data submodality, and data sample quality currently being processed. For this example, the method selected to train the known feature "Forest" into datastore "syntellibase1" is "Area" training.

Figure 82:
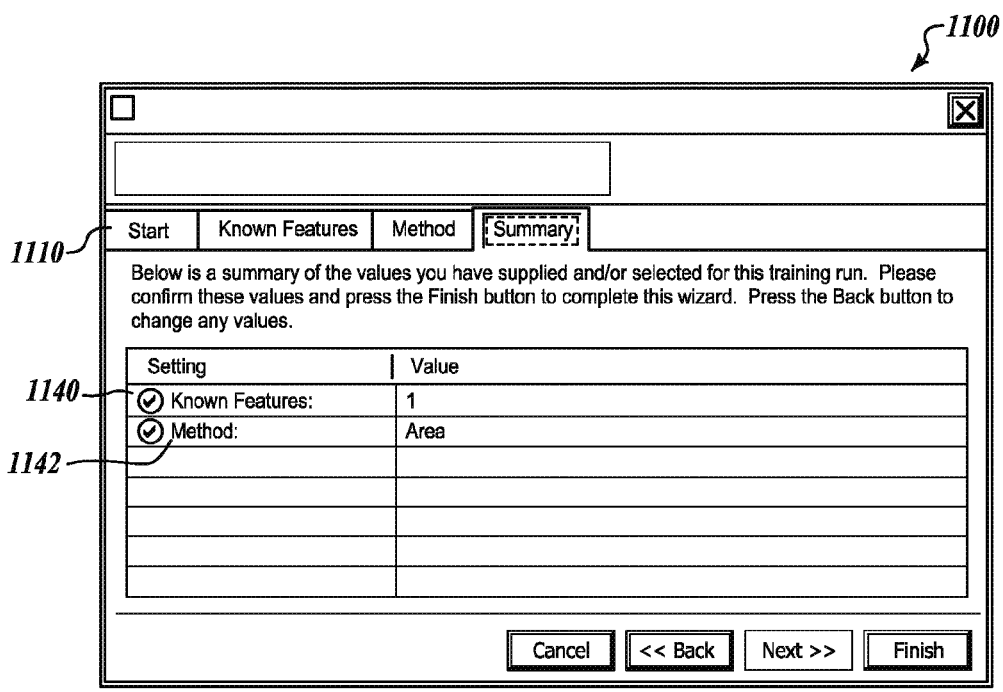
FIG. 82 shows a screenshot of the "Summary" tab of the "Train Known Feature Wizard"

FIG. 82 is a screenshot 1100 showing the "Summary" tab 1110 of the "Train Known Feature Wizard" wherein the current known feature training options are displayed for easy user reference and review. In this example, the number of "Known Features" 1140 selected for training is one, and the "Method" of known feature training 1142 is "Area." In one embodiment, clicking the "Finish" button on the "Summary" tab of the "Train Known Feature Wizard" initializes known feature training or untraining based upon user selections.

Figure 83:
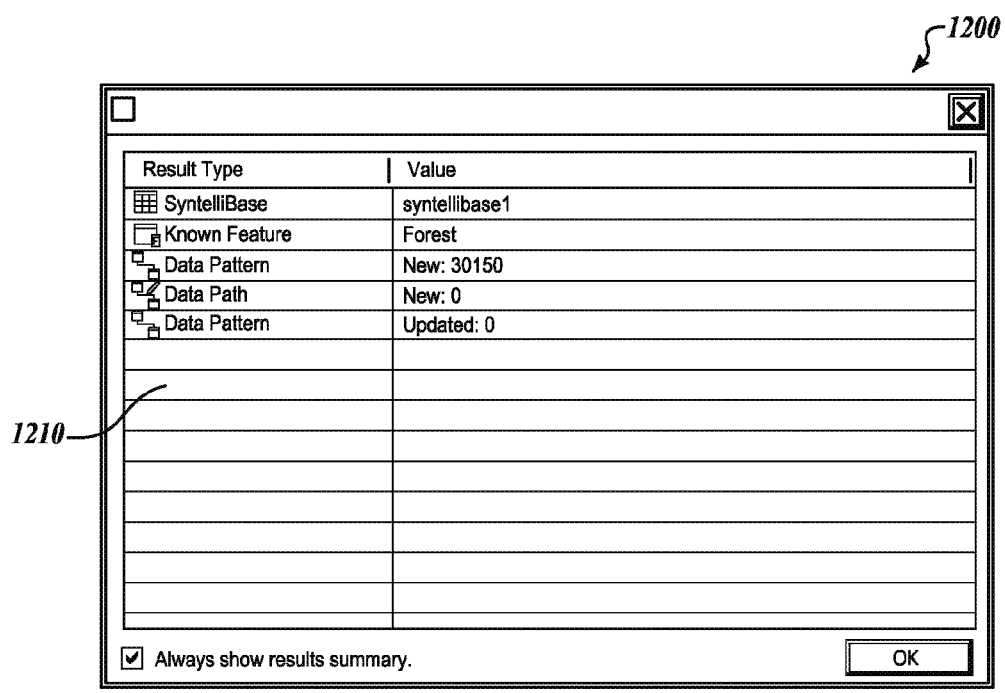
FIG. 83 shows a screenshot of the "Results Summary" dialog box, which displays the results of known feature training of the feature "Forest"

FIG. 83 is a screenshot 1200 showing the "Results Summary" dialog box, which displays the results 1210 of known feature training or untraining in tabular format. In this example, area training of the region of interest containing the feature "Forest" (as defined at FIG. 78) into the datastore "syntellibase1" results in the identification of "30,150" new data patterns representing said known feature and "0" new data paths, which is the number of times the known feature "Forest" is associated with an existing data pattern from another known feature. In addition, there are "0" updated data patterns in the datastore; otherwise stated, the number of times the known feature "Forest" is associated with a data pattern already known for said feature is zero. In one embodiment, the user can elect not to see the results summary dialog box by unselecting the checkbox labeled "Always show results summary."

In one embodiment, these new and updated data patterns are generated as a result of executing the previously selected evaluation algorithms (as defined at FIG. 66) on the data element values within the previously selected region of interest (i.e., the selected area of forest as shown in the sample image of FIG. 78) using the training process as described in FIGS. 23-32. The algorithm values for each data element are calculated and taken as a set; those values generate a data pattern associated with the known feature in the synaptic web. Within the region of interest, 30,150 data patterns are associated with the known feature "Forest."

Figure 84:
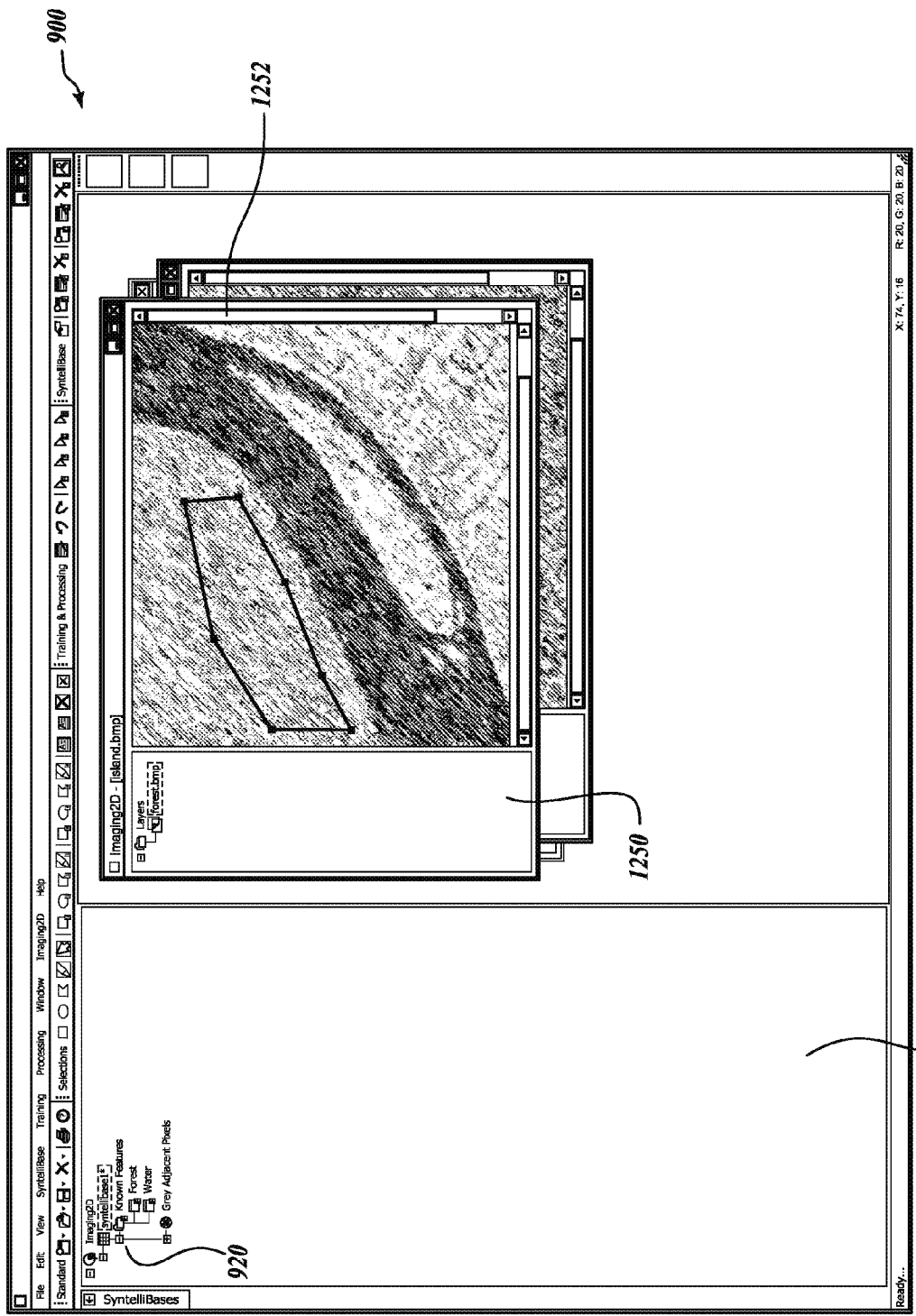
FIG. 84 shows a screenshot of one embodiment of an application to accomplish data analysis and feature recognition wherein the workspace is loaded with the sample image "island.bmp" containing a user-defined region of interest of the feature "Forest"

FIG. 84 is a screenshot 900 showing one embodiment of an application to accomplish data analysis and feature recognition. The user-interface features are previously described with reference to FIG. 69. For this example, the application workspace is loaded with three sample images of interest: the image "island.bmp" and two other images. The sample image "island.bmp" 1252 shows light shaded areas of forest and a dark shaded area of water. Also within the sample image 1252 is a user-defined selection of forest, which is delimited by a black outlined polygon drawn using a selection tool as is common in the art. This region of interest is to be trained as the known feature "Forest" into the datastore "syntellibase1" using the TDA and evaluation algorithms as selected at FIG. 66. In one embodiment, the panel 1250 directly to the left of the sample image 1252 contains a listing of layers (i.e., processed known features) that are currently available for viewing. In one embodiment, the area 916 located to the left of the workspace contains a listing of any opened datastores and their associated attributes, such as a listing of trained known features 920 and the user-specified TDA.

Figure 85:
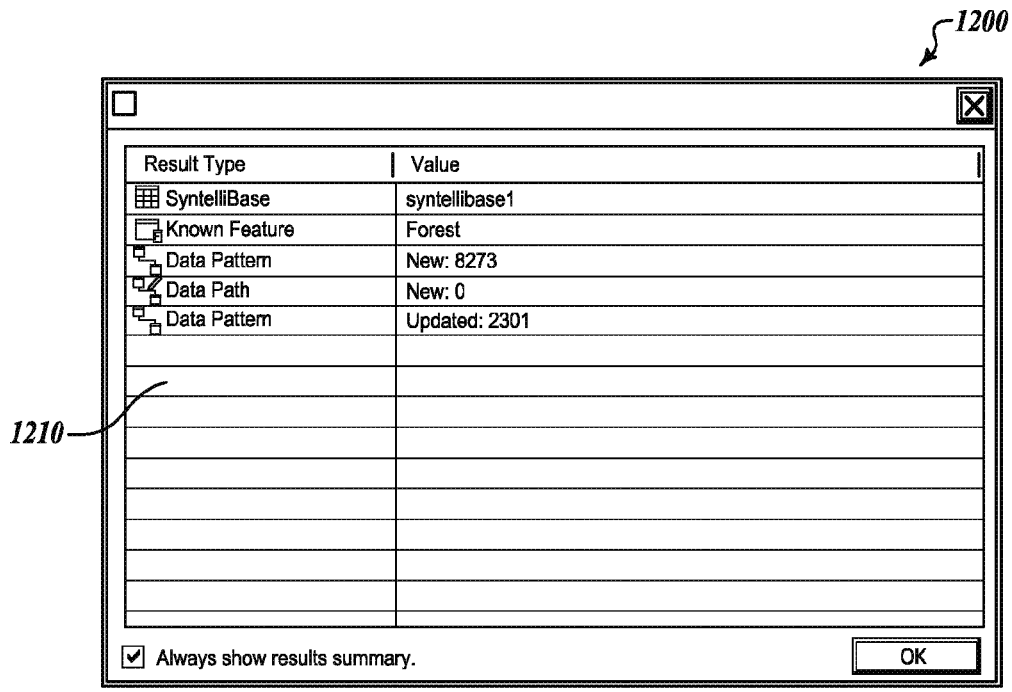
FIG. 85 shows a screenshot of the "Results Summary" dialog box, which displays the results of known feature training of the feature "Forest"

FIG. 85 is a screenshot 1200 showing the "Results Summary" dialog box, which displays the results 1210 of known feature training in tabular format. For this example, area training of the user-defined region of interest containing the feature "Forest" (as defined in FIG. 84) into the datastore "syntellibase1" results in the identification of "8,273" new data patterns representing said known feature and "0" new data paths. In addition, there are "2,301" updated data patterns in the datastore; otherwise stated, the number of times the known feature "Forest" is associated with a data pattern already known for said feature is 2,301.

In one embodiment, these new and updated data patterns are generated as a result of executing the previously selected evaluation algorithms (as defined at FIG. 66) on the data element values within the previously selected region of interest (i.e., the selected area of forest as shown the sample image of FIG. 84) using the training process as described in FIGS. 23-32. Within the region of interest, 2,301 data patterns, which were previously associated with the known feature "Forest," are updated in the synaptic web. In addition, 8,273 data patterns, which were not previously associated with the known feature "Forest," are created.

In one embodiment, once training of one or a plurality of user-specified known features is complete and a collection of synaptic paths is stored in association with said feature(s), the feature(s) is considered to be "trained." Once a known feature is sufficiently trained, in one embodiment the system can be tasked to identify the trained known feature(s) in the same or a different sample data set(s).

Figure 86:
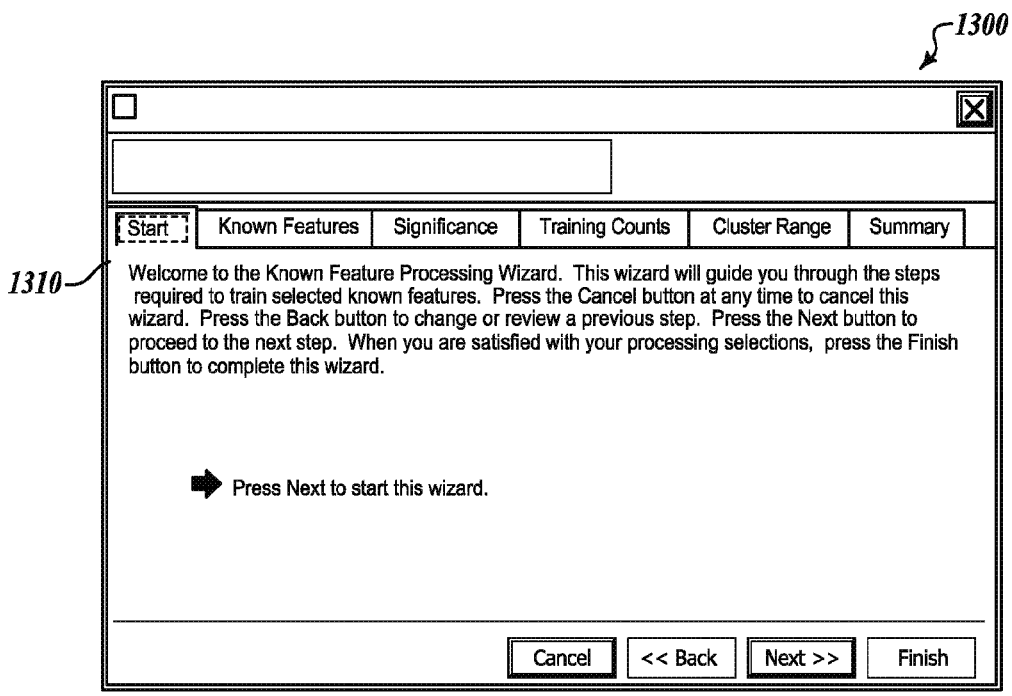
FIG. 86 shows a screenshot of the "Start" tab or introduction screen of the "Process Known Feature Wizard"

FIG. 86 is a screenshot 1300 showing the "Start" tab 1310 or introduction screen of the "Process Known Feature Wizard," which guides the user through the step-by-step process of identifying one or a plurality of selected known features. The layout of the "Process Known Feature Wizard" is described in more detail with reference to FIG. 62. In one embodiment, the wizard allows a new selection of digital data to be processed using the previously trained datastore(s) in order to determine if one or a plurality of trained known features are present.

Figure 87:
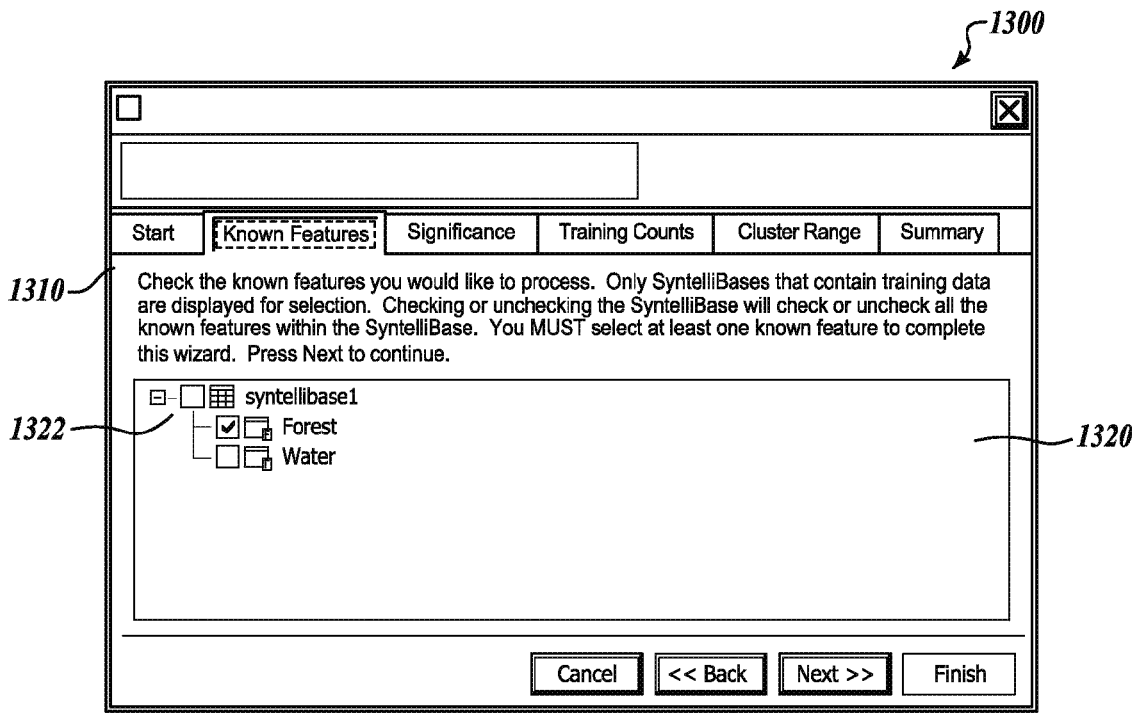
FIG. 87 shows a screenshot of the "Known Features" tab of the "Process Known Feature Wizard" wherein the known feature "Forest" is selected for processing.

FIG. 87 is a screenshot 1300 showing the "Known Features" tab 1310 of the "Process Known Feature Wizard" wherein one or a plurality of previously created datastores and known features are selected for processing by the user. In one embodiment, the user opts to simultaneously process one or a plurality of known features within any or all of the opened and trained datastores. For this example, the listing of available datastores 1320 contains "syntellibase1" 1322, and the known feature "Forest" is selected for processing.

Figure 88:
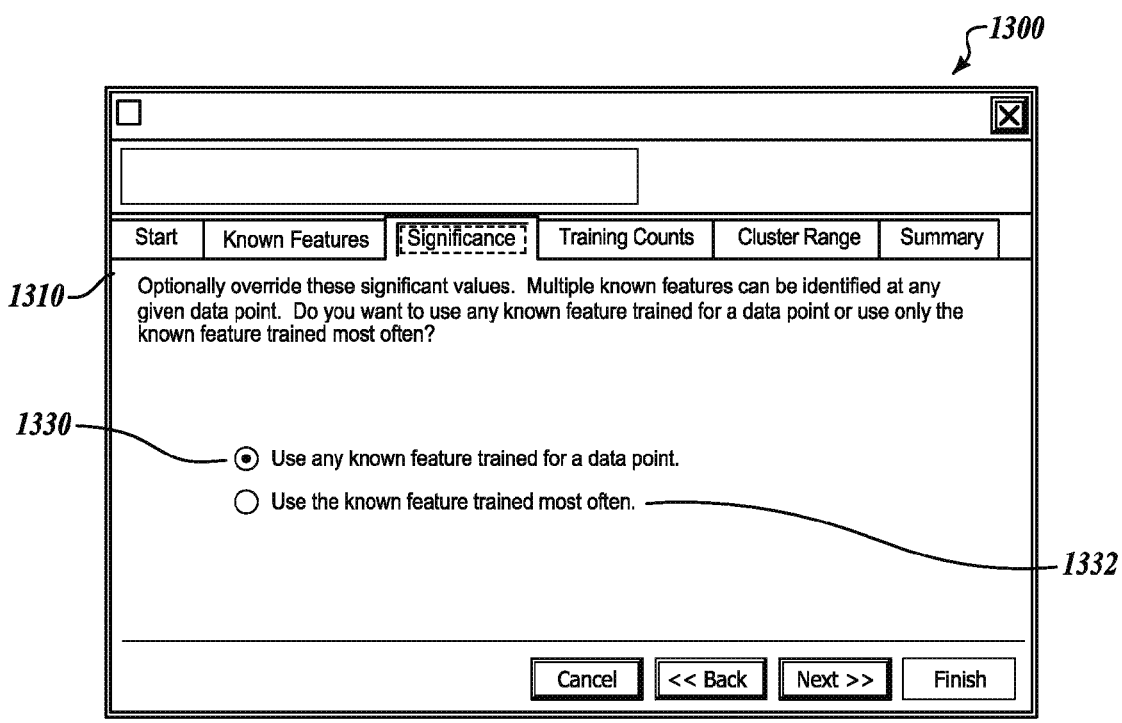
FIG. 88 shows a screenshot of the "Significance" tab of the "Process Known Feature Wizard"

FIG. 88 is a screenshot 1300 showing the "Significance" tab 1310 of the "Process Known Feature Wizard" wherein the user can optionally override the significance processing options as previously set at FIG. 72. In one embodiment, multiple known features can be identified by a similar set of algorithm values, and said features are stored in a list that is ordered by the training hit counts of each feature. The feature most often associated with a particular algorithm value set is the first feature in the list and is called the "most significant feature" for that data value path. Because some data value sets are common to more than one known feature, the "Significance" tab of the "Process Known Feature Wizard" presents the user with a choice related to assignment of the action to be taken among said features. In one embodiment, all known features matching a particular data value path are used when the user selects the option button 1330, "Use any known feature trained for a data point." In an alternate embodiment, only the known feature trained most often to a particular data value path is used when the user selects the option button 1332, "Use the known feature trained most often." In this example, the option button 1330 is selected.

Figure 89:
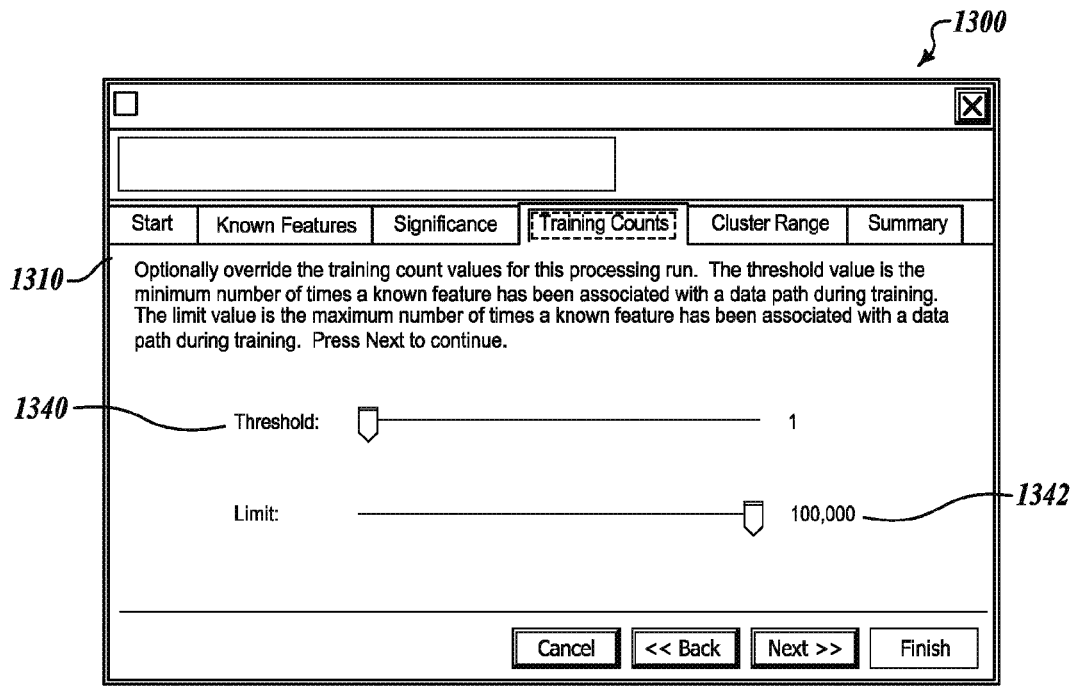
FIG. 89 shows a screenshot of the "Training Counts" tab of the "Process Known Feature Wizard"

FIG. 89 is a screenshot 1300 showing the "Training Counts" tab 1310 of the "Process Known Feature Wizard" wherein the user can optionally override the training count values, as previously set at FIG. 74, for a single known feature processing run. In one embodiment, the user selects a "Threshold" value 1340 representing the minimum number of times the given known feature must be associated with the synaptic path during training in order to be positively identified for the given synaptic path. In one embodiment, a user selects a "Limit" value 1342 representing the maximum number of times the given known feature can be associated with the synaptic path during training in order to be positively identified for the given synaptic path. It is important to note that for the threshold processing overrides to work here, the known feature must already be set to threshold processing or to cluster and threshold processing; this setting is determined during known feature creation as shown at FIG. 73.

Figure 90:
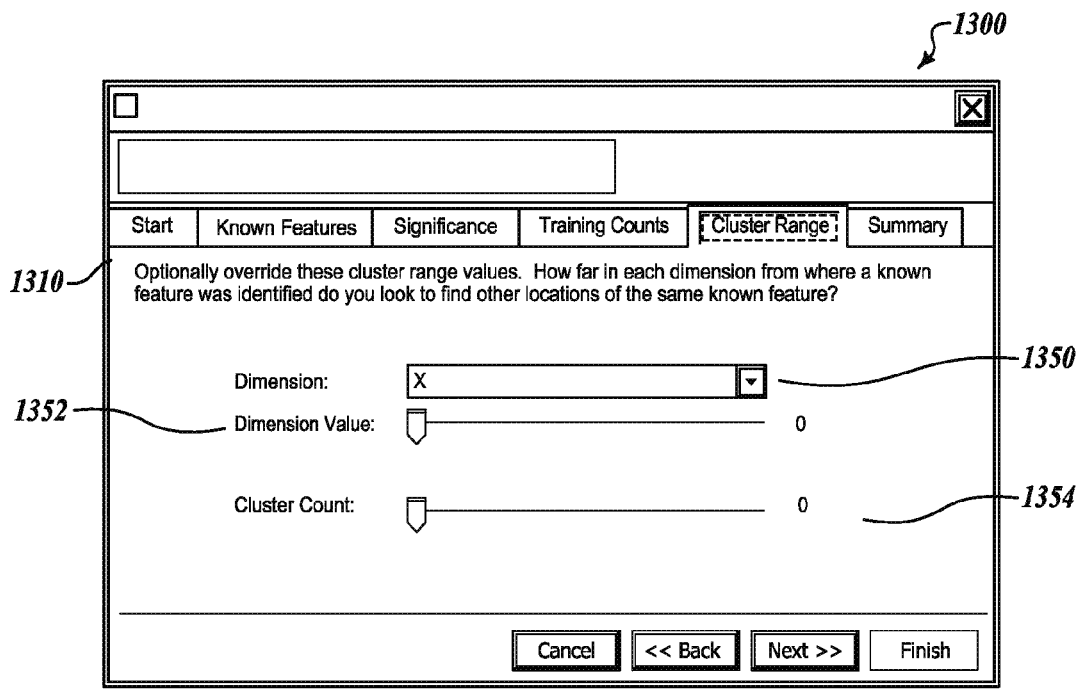
FIG. 90 shows a screenshot of the "Cluster Range" tab of the "Process Known Feature Wizard"

FIG. 90 is a screenshot 1300 showing the "Cluster Range" tab 1310 of the "Process Known Feature Wizard" wherein the user can optionally override the cluster detection parameters, as previously set at FIG. 75, for a single known feature processing run. In one embodiment, the user sets the cluster area (i.e., cluster range) size by entering X, Y, Z, etc., "Dimension Values" 1352 for each of the "Dimensions" 1350 of the multispectral or hyperspectral data set. In one embodiment, the user selects the "Cluster Count" value 1354, which is the number of times the same known feature must occur within the defined cluster area for the known feature to be positively identified for the current data element. It is important to note that for the cluster processing overrides to work here, the known feature must already be set to cluster processing or cluster and threshold processing; this setting is determined during known feature creation as shown at FIG. 73.

Figure 91:
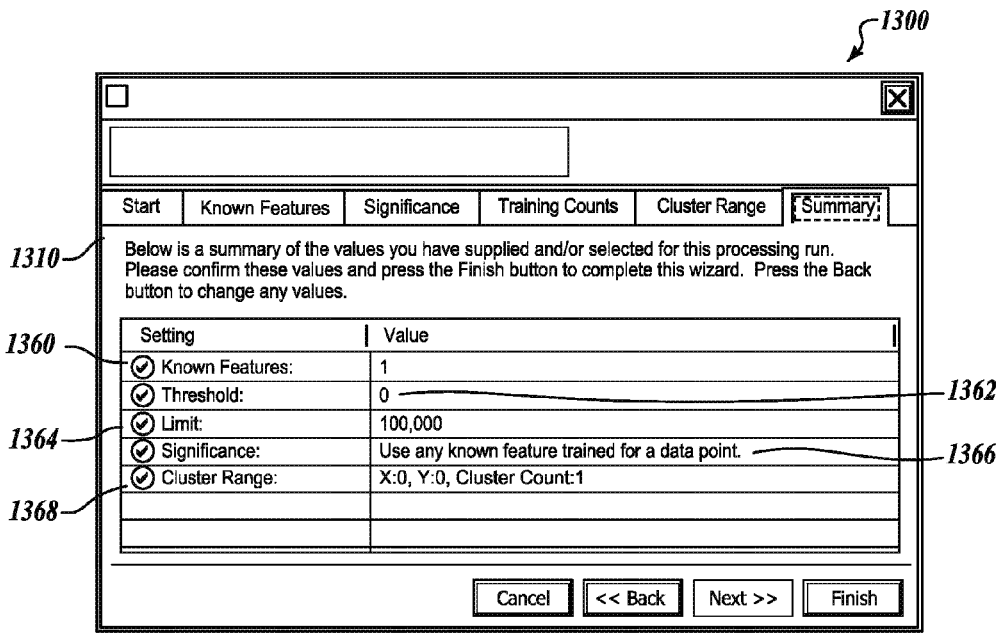
FIG. 91 shows a screenshot of the "Summary" tab of the "Process Known Feature Wizard"

FIG. 91 is a screenshot 1300 showing the "Summary" tab 1310 of the "Process Known Feature Wizard" wherein the current known feature processing options are displayed for easy user reference and review. For this example, the number of "Known "Features" 1360 selected for processing is "1"; the "Threshold" override value is "0" 1362, the "Limit" override value 1364 is "100,000", the "Significance" processing option override value is "Use any known feature trained for a data point" 1366; and the "Cluster Range" override value 1368 sets the "X" dimension cluster range value to "0," the "Y" dimension cluster range value to "0," and the "Cluster Count" value to "1."

Figure 92:
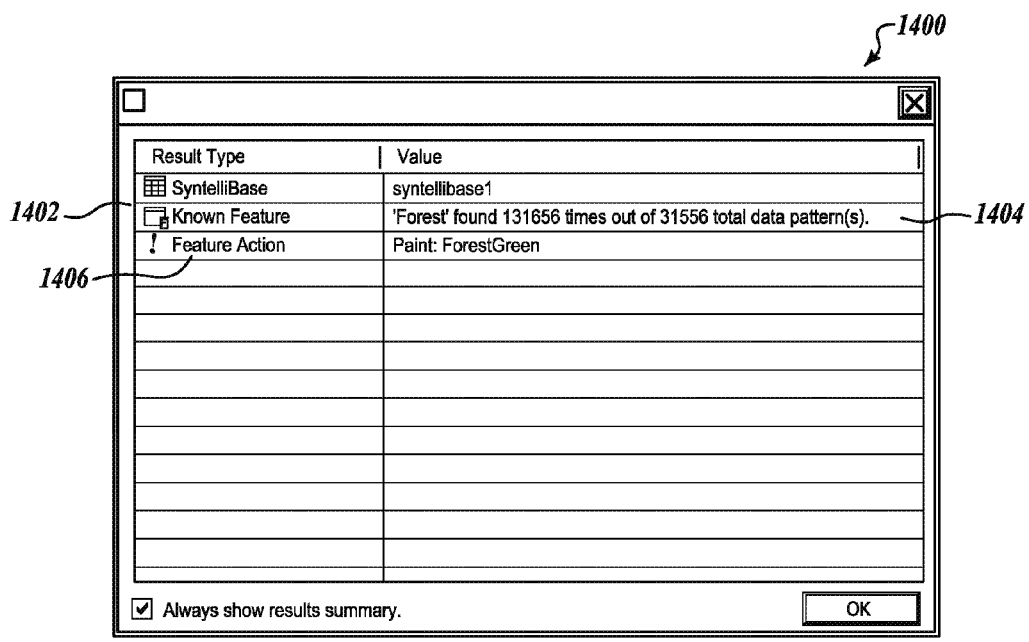
FIG. 92 shows a screenshot of the "Results Summary" dialog box displaying the results of known feature processing of the feature "Forest" within the sample image "dam.bmp"

FIG. 92 is a screenshot 1400 showing the "Results Summary" dialog box, which displays the results of known feature processing in tabular format. For this example, the sample image "dam.bmp" is processed using the trained datastore "syntellibase1" 1402, and the known feature "Forest" is identified a total of "131,656" times using "31,556" possible data patterns 1404 representing said known feature. In addition, the known "Feature Action" 1406, which is to paint one or a plurality of data elements identified as the known feature "Forest" the color "ForestGreen," is executed by the system.

It is important to note that the same evaluation algorithms and the same TDA as are used during known feature training, as described in more detail with reference to FIGS. 78-83, must also be used during known feature processing. The algorithmically determined data values and patterns resulting from known feature processing are then compared to the previously trained, identified, and stored algorithm values and data patterns resulting from known feature training for the purpose of positively identifying any previously trained known features contained therein. In one embodiment, when the same algorithm set is executed and returns the same set of values, the same data pattern is developed as was developed in training, and the known feature associated with the data pattern is identified.

Figure 93:
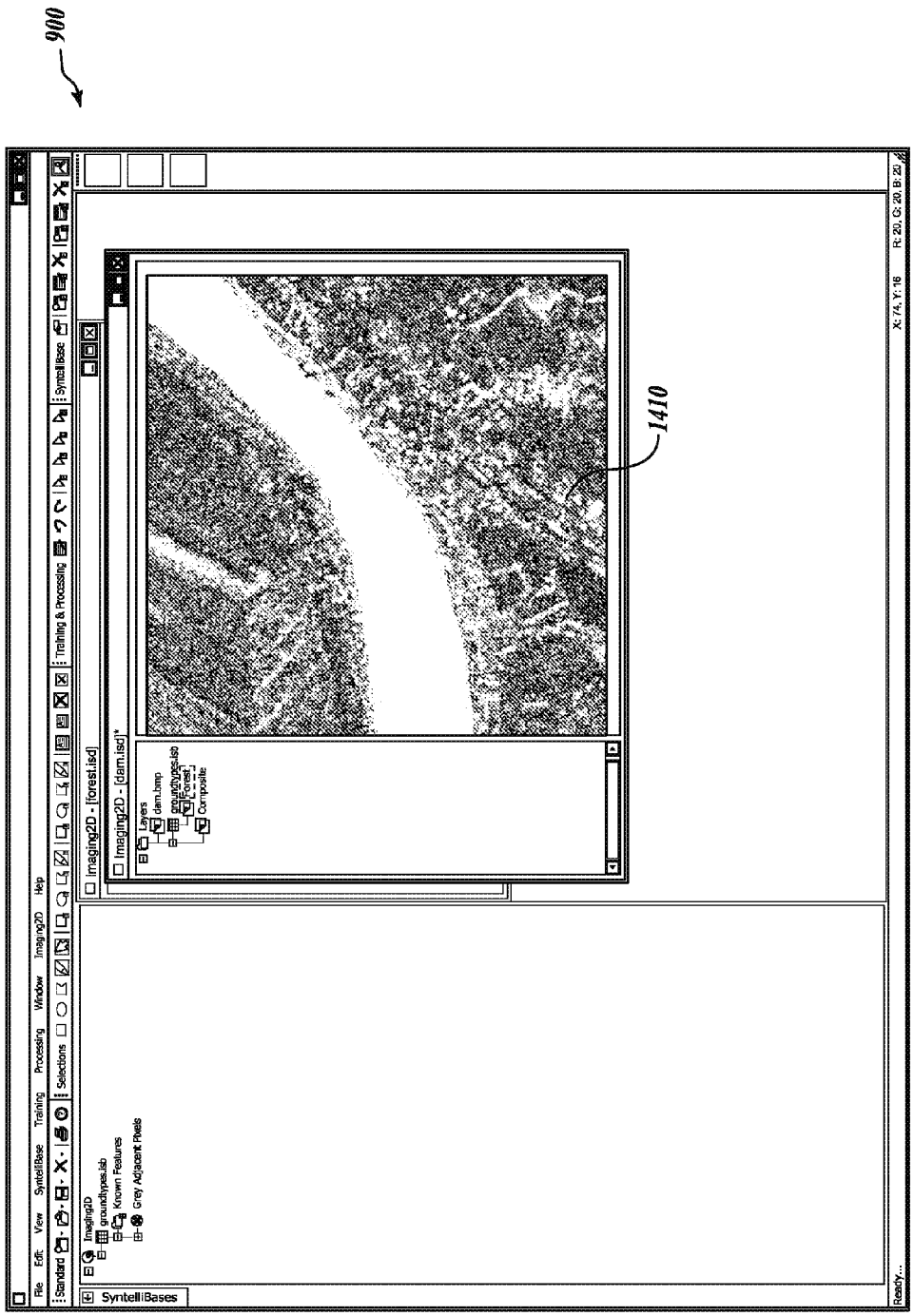
FIG. 93 shows a screenshot of one embodiment of an application to accomplish data analysis and feature recognition wherein the workspace is loaded with the sample image "dam.bmp" and only the processed image layer "Forest," which represents the results of known feature processing, is selected for viewing.

FIG. 93 is a screenshot 900 showing one embodiment of an application to accomplish data analysis and feature recognition. The user-interface features are previously described with reference to FIG. 69. For this example, the application workspace is loaded with two sample images: the image "forest.bmp," and the image "dam.bmp." The processed image layer "Forest" 1410, which is shown as the only visible layer over the image "dam.bmp," represents the results of known feature processing as described in FIGS. 86-92 and contains a total of 131,656 data elements identified as the known feature "Forest" and painted the color "ForestGreen" (which appears as the color black). Accordingly, the processed image layer "Forest" 1410 contains data patterns matching the 31,556 data patterns identified as the known feature "Forest."

Figure 94:
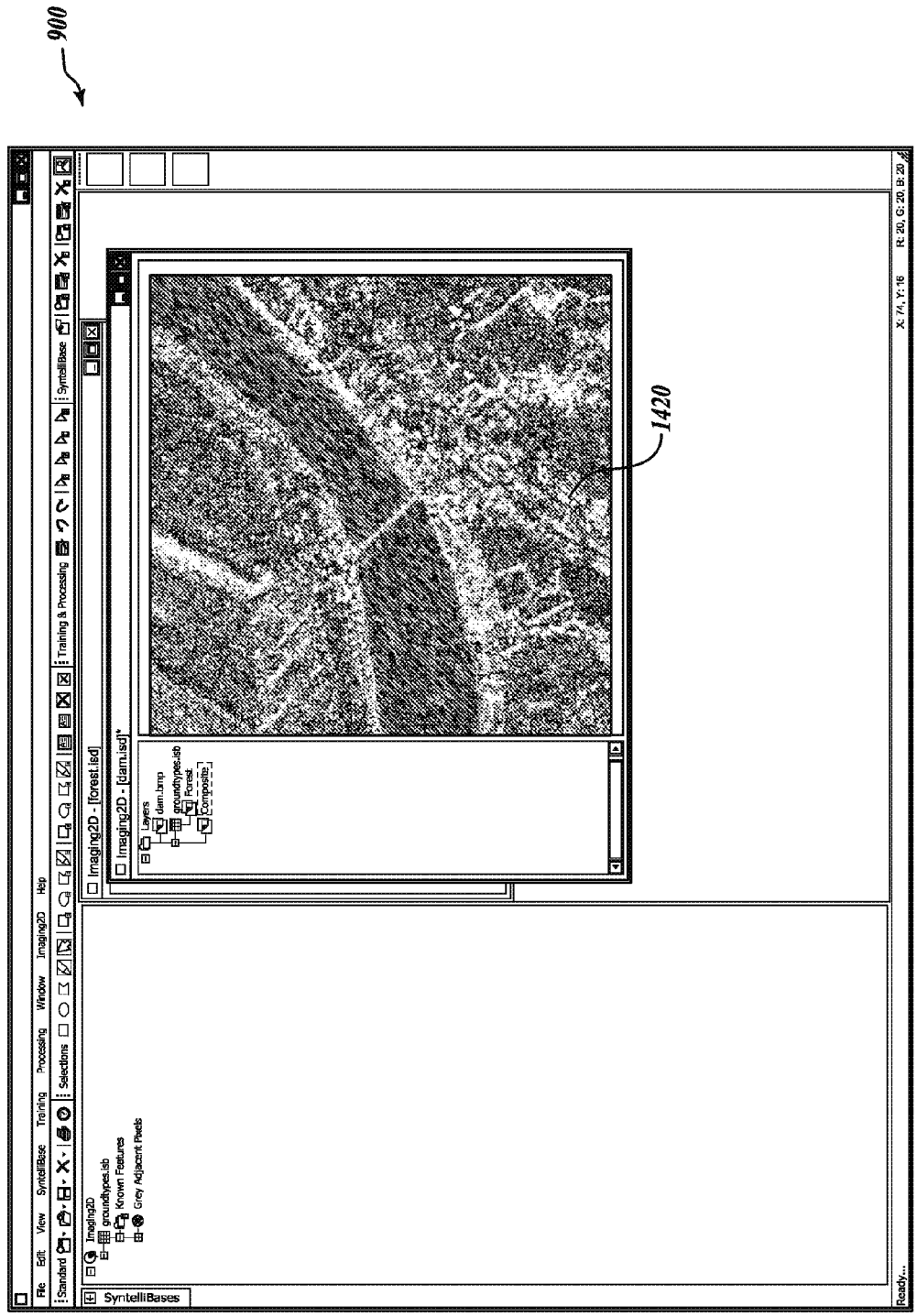
FIG. 94 shows a screenshot of one embodiment of an application to accomplish data analysis and feature recognition wherein the workspace is loaded with the sample image "dam.bmp," and the image layer "Composite," which is comprised of the sample image "dam.bmp" layered with the processed image layer "Forest," is selected for viewing.

FIG. 94 is a screenshot 900 showing one embodiment of an application to accomplish data analysis and feature recognition. The user-interface features are previously described with reference to FIG. 69. For this example, the application workspace is loaded with two sample images: the image "forest.bmp" and the image "dam.bmp." The image layer "Composite" 1420, which is comprised of the sample image "dam.bmp" and the processed image layer "Forest," represents the results of known feature processing as described in FIGS. 86-92 and contains a total of 131,656 data elements identified as the known feature "Forest" and painted the color "ForestGreen" (which appears as black). Accordingly, the processed image layer "Forest" contains data patterns matching the 31,556 data patterns previously identified as the known feature "Forest."

Figure 95:
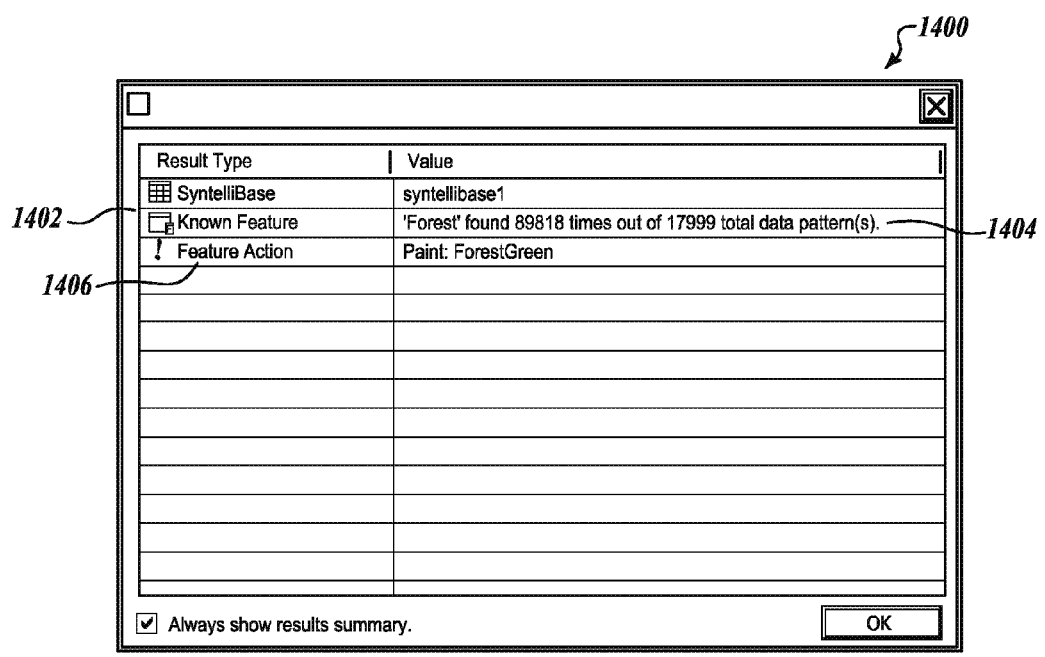
FIG. 95 shows a screenshot of the "Results Summary" dialog box displaying the results of known feature processing of the feature "Forest" within the sample image "island.bmp"

FIG. 95 is a screenshot 1400 showing the "Results Summary" dialog box, which displays the results of known feature processing in tabular format. In this example, the sample image "island.bmp" (as shown in FIG. 84) is processed using the trained datastore "syntellibase1" 1402, and the known feature "Forest" is identified a total of "89,818" times using "17,999" possible data patterns 1404 representing said known feature. In addition, the known "Feature Action" 1406, which is to "Paint" one or a plurality of data elements identified as the known feature "Forest" the color "ForestGreen," is executed by the system.

Figure 96:
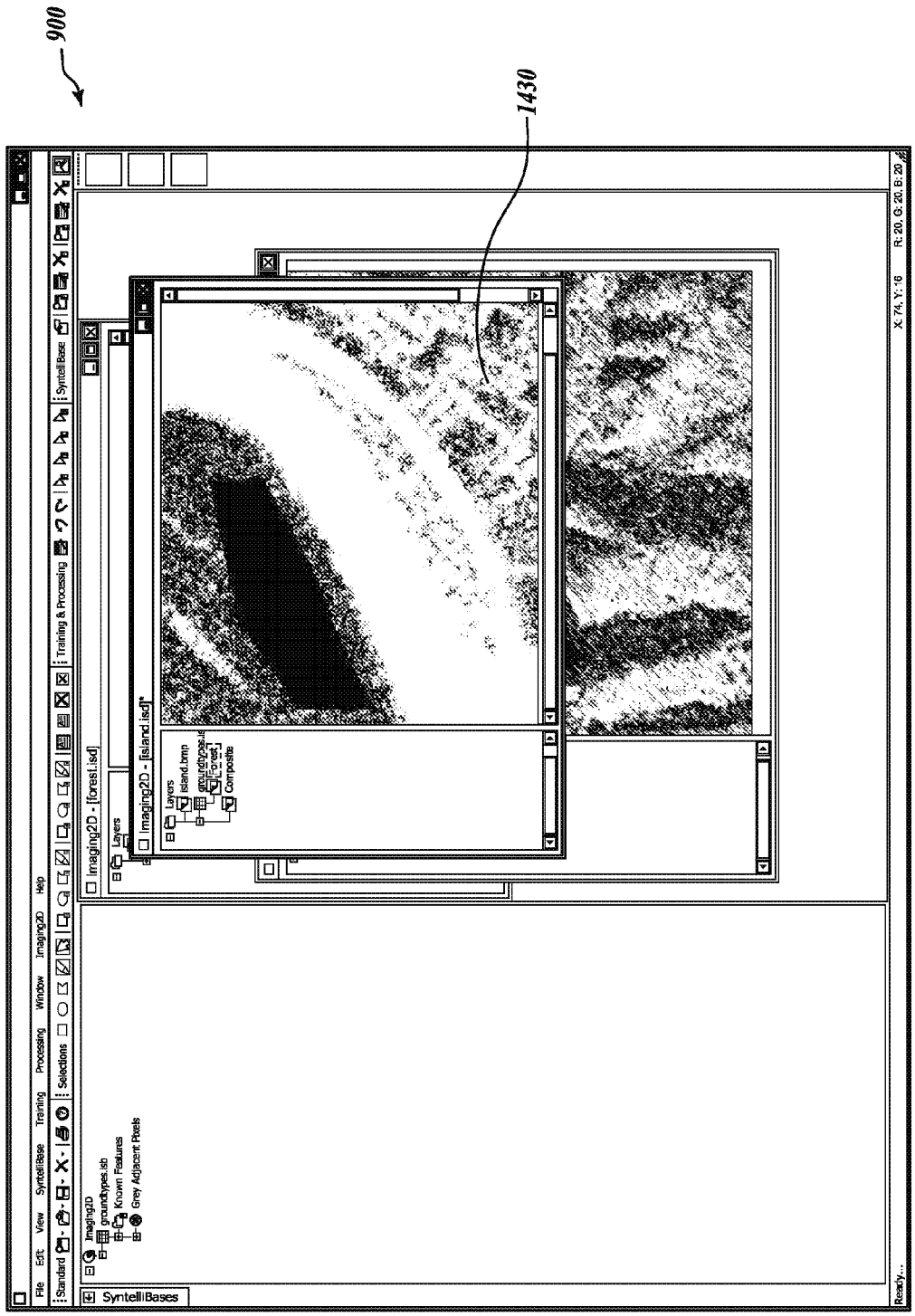
FIG. 96 shows a screenshot of one embodiment of an application to accomplish data analysis and feature recognition wherein the workspace is loaded with the sample image "island.bmp" and only the processed image layer "Forest," which represents the results of known feature processing, is available for viewing.

FIG. 96 is a screenshot 900 showing one embodiment of an application to accomplish data analysis and feature recognition. The user-interface features are previously described with reference to FIG. 69. For this example, the application workspace is loaded with three sample images: the image "forest.bmp," the image "island.bmp," and another image. The processed image layer "Forest" 1430, which is shown as the only visible layer over the image "island.bmp," represents the results of known feature processing as summarized in FIG. 95 and contains a total of 89,818 data elements identified as the known feature "Forest" and painted the color "ForestGreen" (which appears as the color black). Accordingly, the processed image layer "Forest" 1430 contains data patterns matching the 17,999 data patterns identified as the known feature "Forest." Also shown in this example, the solid block of the color "ForestGreen" (which appears as a solid block of black) present within the processed image layer "Forest" 1430 represents the user-selected region of interest containing the feature "Forest" within the original sample image "island.bmp" (as shown in FIG. 84); this region of interest is subsequently area trained by the system as the known feature "Forest."

Figure 97:
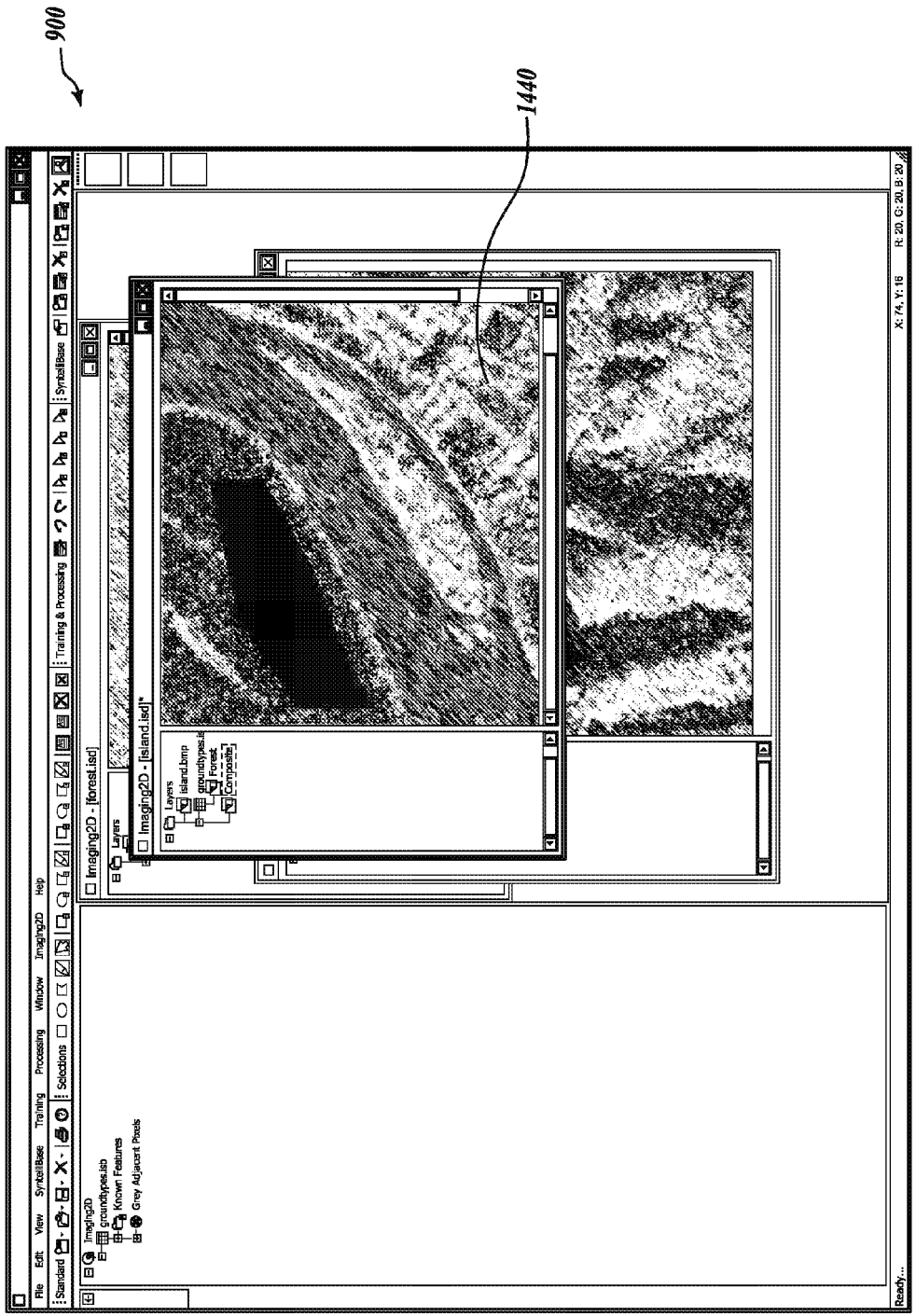
FIG. 97 shows a screenshot of one embodiment of an application to accomplish data analysis and feature recognition wherein the workspace is loaded with the sample image "island.bmp," and the image layer "Composite," which is comprised of the sample image "island.bmp" layered with the processed image layer "Forest," is selected for viewing.

FIG. 97 is a screenshot 900 showing one embodiment of an application to accomplish data analysis and feature recognition. The user-interface features are previously described with reference to FIG. 69. For this example, the application workspace is loaded with three sample images: "forest.bmp," "island.bmp," and another image. The image layer "Composite" 1440, which is comprised of the sample image "island.bmp" and the processed image layer "Forest," represents the results of known feature processing as summarized in FIG. 95 and contains a total of 89,818 data elements identified as the known feature "Forest" and painted the color "ForestGreen" (which appears as black). Accordingly the processed image layer "Forest" contains data patterns matching the 17,999 data patterns previously identified as the known feature "Forest."

Figure 98:
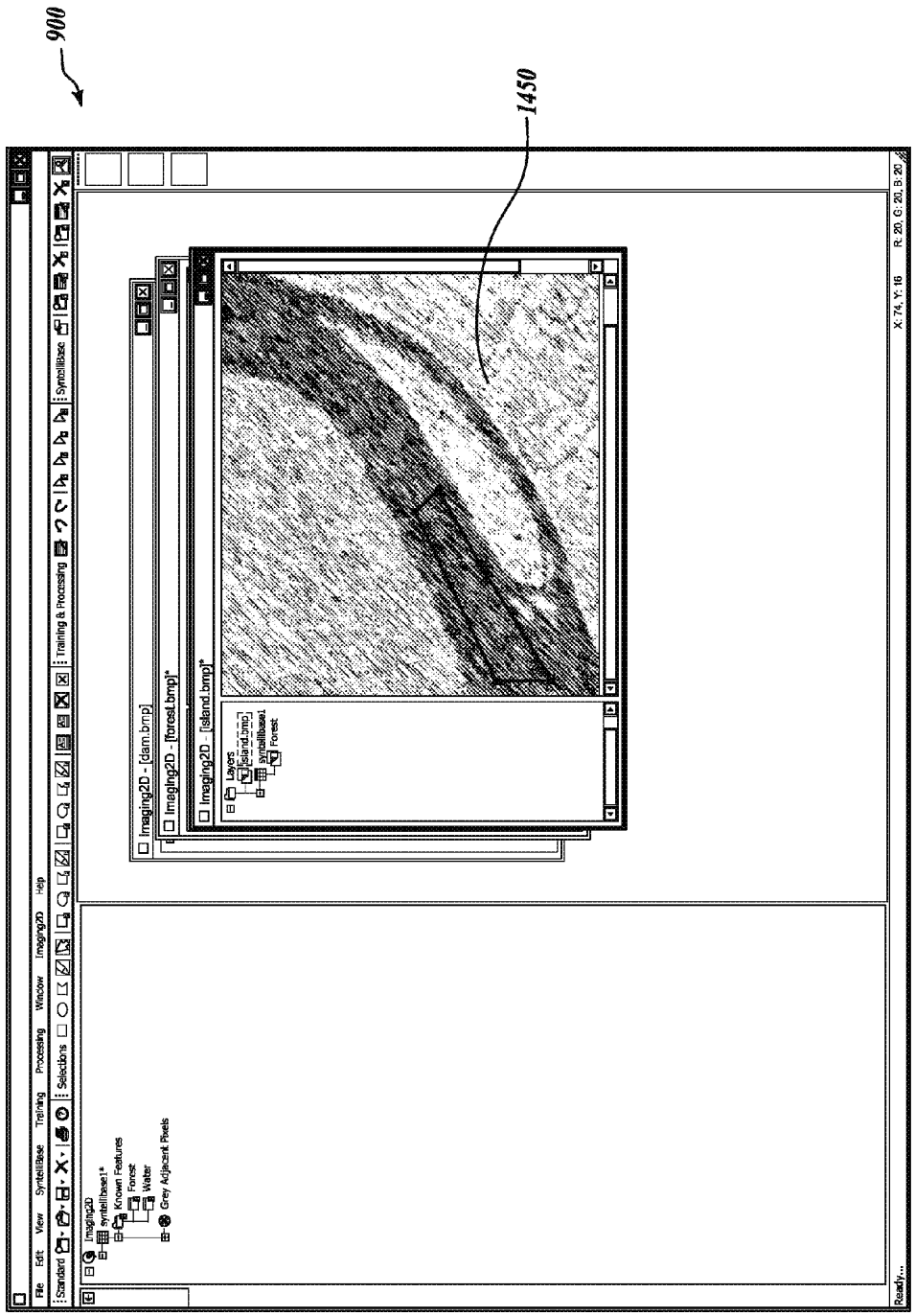
FIG. 98 shows a screenshot of one embodiment of an application to accomplish data analysis and feature recognition wherein the workspace is loaded with the sample image "island.bmp" containing a user-defined region of interest of the feature "Water"

FIG. 98 is a screenshot 900 showing one embodiment of an application to accomplish data analysis and feature recognition. The user-interface features are previously described with reference to FIG. 69. For this example, the application workspace is loaded with three sample images: the image "dam.bmp," the image "forest.bmp," and the image "island.bmp." The sample image "island.bmp" 1450 shows light shaded areas of forest and a dark shaded area of water. Also within the sample image 1450 is a user-defined selection of water, which is delimited by a black outlined polygon drawn using a selection tool as is common in the art. This region of interest is to be trained as the known feature "Water" into the datastore "syntellibase1" using the TDA and evaluation algorithms as selected at FIG. 66.

Figure 99:
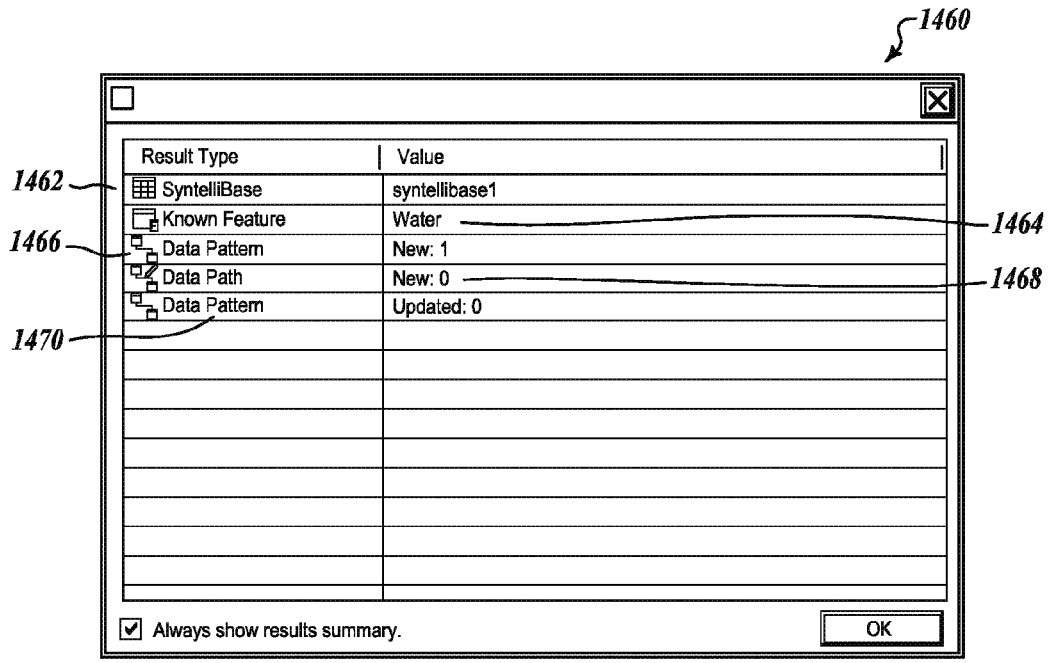
FIG. 99 shows a screenshot of the "Results Summary" dialog box, which displays the results of known feature training of the feature "Water"

FIG. 99 is a screenshot 1460 showing the "Results Summary" dialog box, which displays the results of known feature training in tabular format. For this example, area training of the user-defined region of interest containing the feature "Water" (as defined in FIG. 98) into the datastore "syntellibase1" results in the identification of "1" new data pattern representing said known feature and "0" new data paths In addition, there are "0" updated data patterns in the datastore; otherwise stated, the number of times the known feature "Water" is associated with a data pattern already known for said feature is zero.

Figure 100:
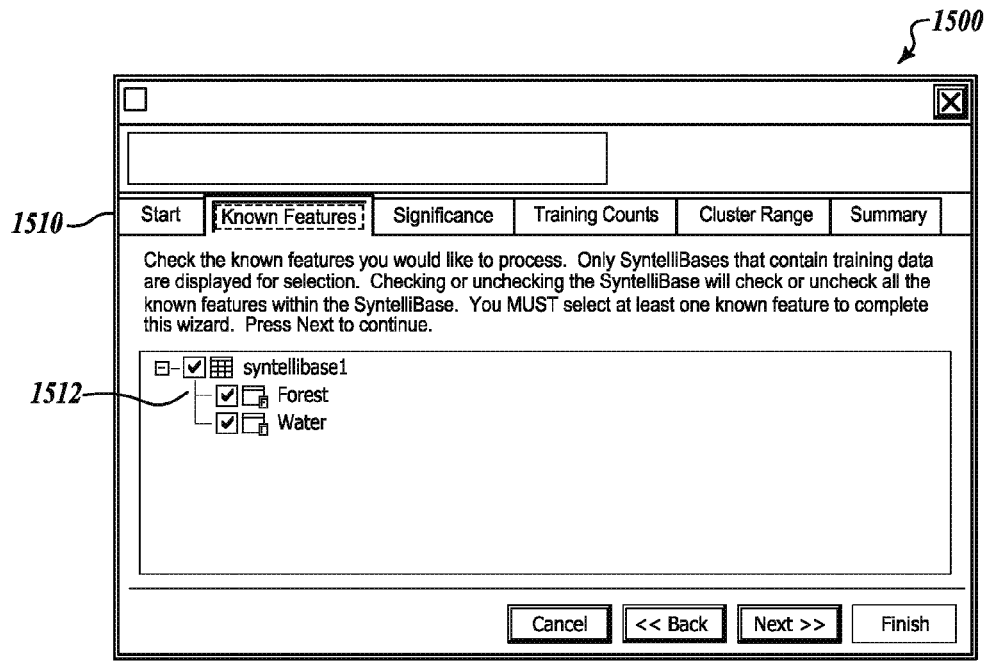
FIG. 100 shows a screenshot of the "Known Features" tab of the "Process Known Feature Wizard" wherein the known features "Forest" and "Water" are selected for processing in the sample image "island.bmp"

FIG. 100 is a screenshot 1500 showing the "Known Features" tab 1510 of the "Process Known Feature Wizard" wherein one or a plurality of previously created datastores and known features are selected for processing by the user. For this example, the listing of available datastores 1512 contains "syntellibase1," and the known features "Forest" and "Water" are selected for processing.

Figure 101:
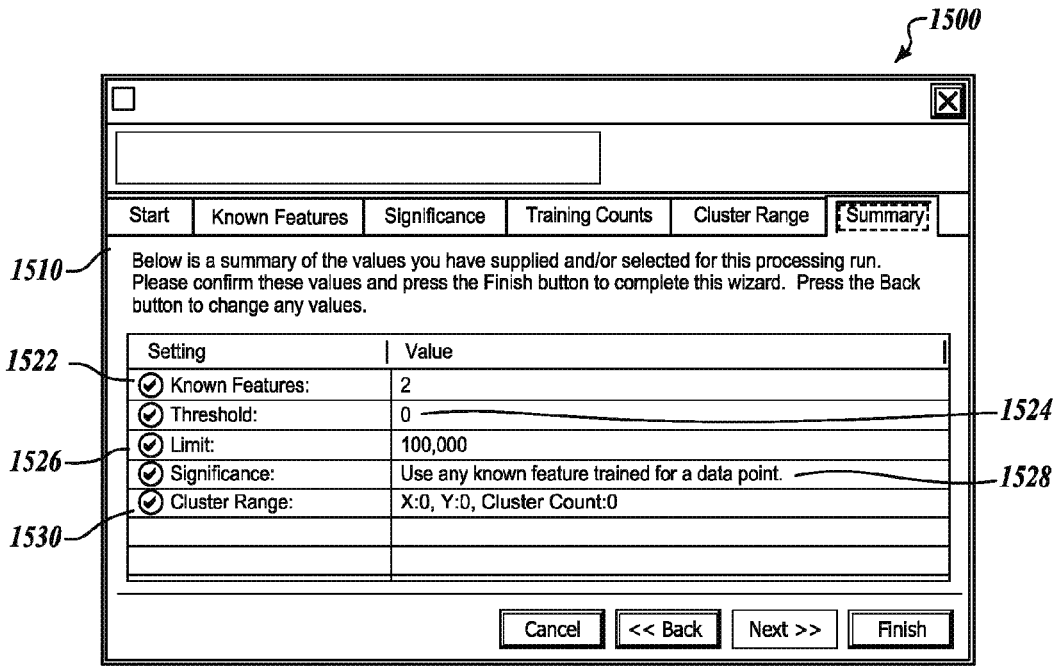
FIG. 101 shows a screenshot of the "Summary" tab of the "Process Known Feature Wizard"

FIG. 101 is a screenshot 1500 showing the "Summary" tab 1510 of the "Process Known Feature Wizard" wherein the current known feature processing options are displayed for easy user reference and review. For this example, the number of "Known Features" 1522 selected for processing is "2"; the "Threshold" override value is "0" 1524; the "Limit" override value 1526 is "100,000"; the "Significance" processing option override value is, "Use any known feature trained for a data point" 1528; and the "Cluster Range" override value 1530 sets the "X" dimension cluster range value to "0," the "Y" dimension cluster range value to "0," and the "Cluster Count" value to "0."

Figure 102:
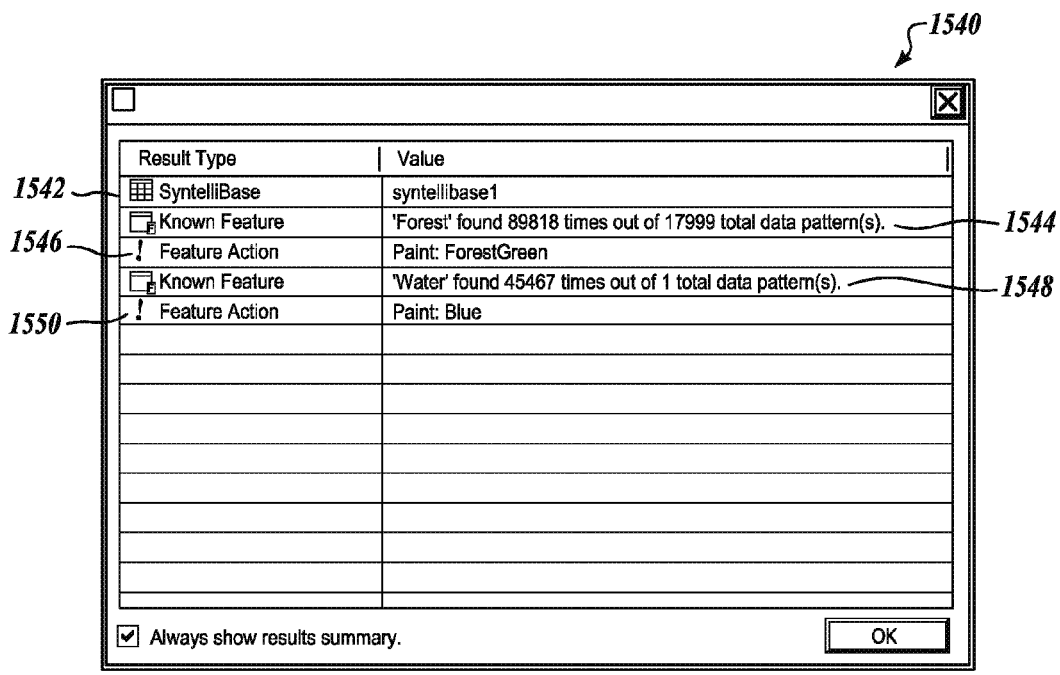
FIG. 102 shows a screenshot of the "Results Summary" dialog box displaying the results of known feature processing of features "Forest" and "Water" within the sample image "island.bmp"

FIG. 102 is a screenshot 1540 showing the "Results Summary" dialog box, which displays the results of known feature processing in tabular format. For this example, the sample image "island.bmp" is processed using the trained datastore "syntellibase1" 1542. The known feature "Forest" is identified at total of "89,818" times using "17,999" possible data patterns 1544 representing said known feature, and the known "Feature Action" 1546, which is to "Paint" one or a plurality of data elements identified as the known feature "Forest" the color "ForestGreen," "Forest," is executed by the system. In addition, the known feature "Water" is identified a total of "45,467" times using "1" possible data pattern 1548 representing said known feature, and the known "Feature Action" 1550, which is to paint one or a plurality of data elements identified as the known feature "Water" the color "Blue," is executed by the system.

Figure 103:
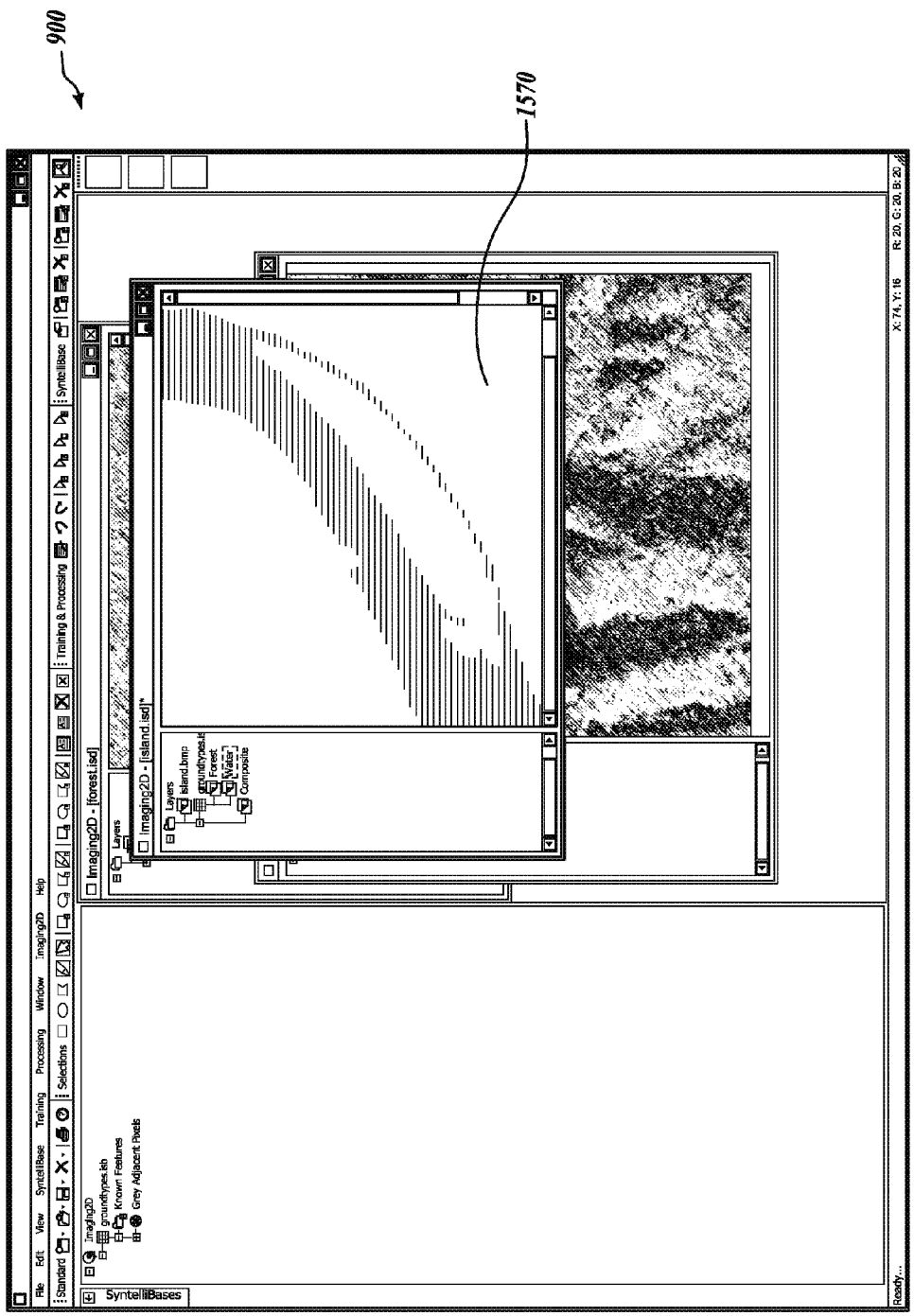
FIG. 103 shows a screenshot of one embodiment of an application to accomplish data analysis and feature recognition wherein the workspace is loaded the sample image "island.bmp" and only the processed image layer "Water," which represents the results of known feature processing, is selected for viewing.

FIG. 103 is a screenshot 900 showing one embodiment of an application to accomplish data analysis and feature recognition. The user-interface features are previously described with reference to FIG. 69. For this example, the application workspace is loaded with three sample images: the image "forest.bmp," the image "island.bmp," and another image. The processed image layer "Water" 1570, which is shown as the only visible layer over the image "island.bmp," represents the results of known feature processing as described in FIGS. 100-102 and contains a total of 45,467 data elements identified as the known feature "Water" and painted the color "Blue" (which appears as black horizontal lines). Accordingly, the processed image layer "Water" 1570 contains data patterns matching the "1" data pattern identified as the known feature "Water."

Figure 104:
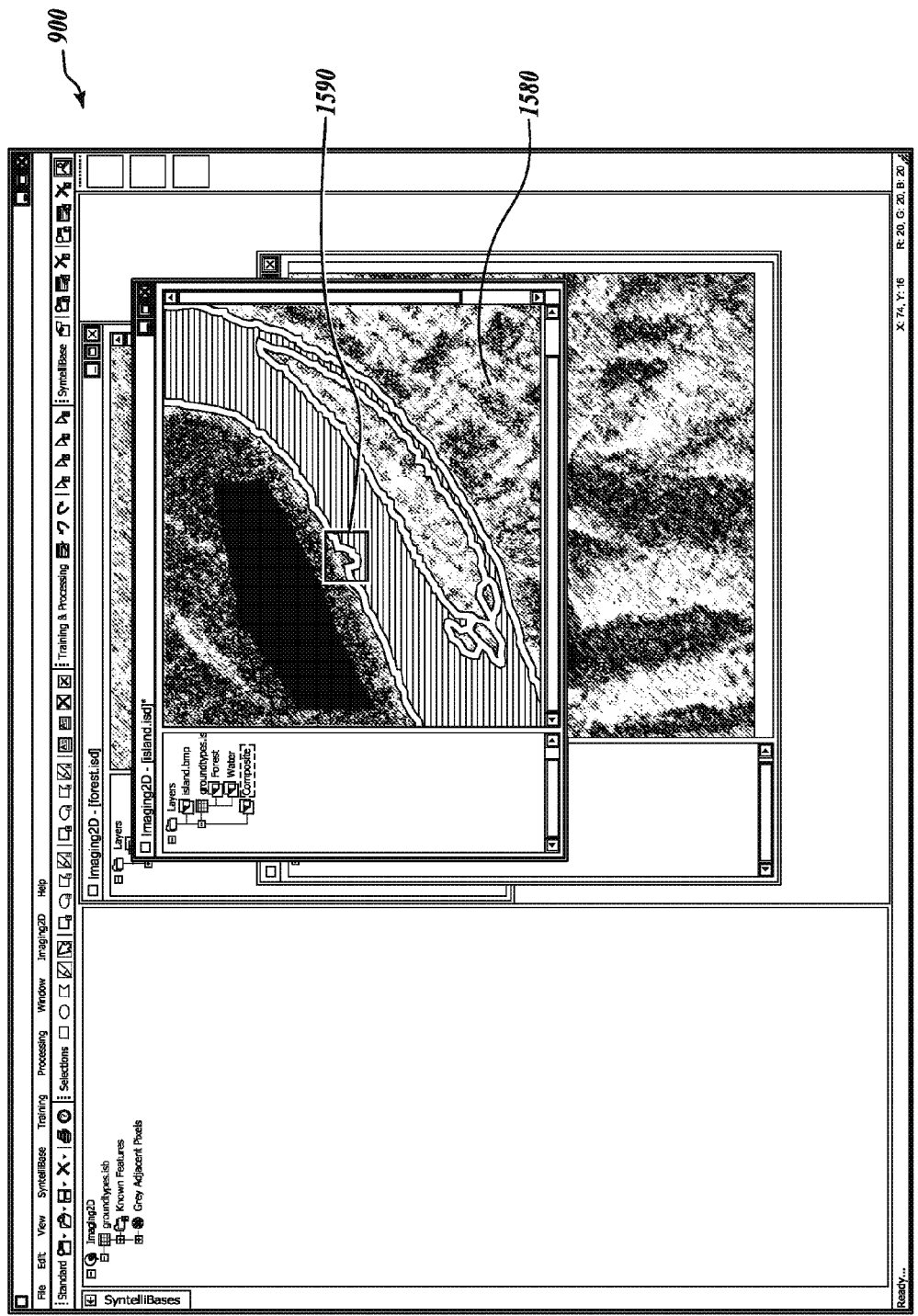
FIG. 104 shows a screenshot of one embodiment of an application to accomplish data analysis and feature recognition wherein the workspace is loaded with the sample image "island.bmp," and the image layer "Composite," which is comprised of the sample image "island.bmp" layered with the processed image layers "Forest" and "Water," is selected for viewing.

FIG. 104 is a screenshot 900 showing one embodiment of an application to accomplish data analysis and feature recognition. The user-interface features are previously described with reference to FIG. 69. For this example, the application workspace is loaded with three sample images: the image "forest.bmp," the image "island.bmp," and another image. The image layer "Composite" 1580, which is comprised of the sample image "island.bmp," the processed image layer "Forest," and the processed image layer "Water," represents the result of known feature processing as described in FIGS. 95-103. Within the image layer "Composite" 1580, there are a total of 89,818 data elements identified as the known feature "Forest" and painted the color "ForestGreen" (which appears as black) and 45,467 data elements identified as the known feature "Water" and painted the color "Blue" (which appears as black horizontal lines). The data elements of the image layer "Composite" that remain unpainted (white) represent the data elements that are not trained as either the known feature "Forest" or the known feature "Water." For example, the area 1590, which appears to contain the known feature "Water" (as shown in FIG. 84), actually contains data patterns that do not match the data patterns associated with either the known feature "Forest" or the known feature "Water"; these unidentified data patterns most likely represent areas of shallow water or shoreline.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system for data analysis and feature recognition comprising:
   a computer processor;
   a display in communication with the computer processor;
   a data store in communication with the computer processor, the data store containing a series of algorithms; and
   a memory in communication with the computer processor and containing stored programming instructions operable by the computer processor, the stored programming instruction, when operated by the computer processor, causing the computer processor to:
      train for the presence of the feature within a first digital data set based on the series of algorithms, comprising:
         calculating a first value for a first target data element within the first digital data set using a first algorithm from the series of algorithms;

calculating a second value for the first target data element within the first digital data set using a second algorithm from the series of algorithms;

repeating the steps of calculating the first value and calculating the second value for a plurality of additional target data elements within the first digital data set using the first algorithm and the second algorithm from the series of algorithms;

defining a plurality of synaptic paths, each one of the plurality of synaptic paths being defined by the calculated first values and calculated second values for each of the target data elements; and associating the feature with one or more of the synaptic paths, based upon a cluster value, the cluster value representing a number of times the feature must occur within a defined cluster area for the feature to be associated with the target data element; and identify the feature in a second digital data set based on the series of algorithms, comprising:

calculating a first value for a first target data element within the second digital data set using the first algorithm from the series of algorithms;

calculating a second value for the first target data element within the second digital data set using the second algorithm from the series of algorithms;

repeating the steps of calculating the first value and calculating the second value for a plurality of additional target data elements within the second digital data set using the first algorithm and the second algorithm from the series of algorithms; and determining whether the feature is present in the second digital data set by comparing the calculated first values and second values from the second digital data set with the defined plurality of synaptic paths associated with the feature.

2. The system of claim 1, wherein:

the stored programming instructions causing the computer processor to train for the presence of the feature further cause the computer processor to:

(i) calculate a third value for the first target data element within the first digital data set using a third algorithm from the series of algorithms;

(ii) repeat the step of calculating the third value for the plurality of additional target data elements within the first digital data set; and (iii) define the plurality of synaptic paths by the calculated first values, calculated second values, and calculated third values for each of the target data elements;

and further wherein the stored programming instructions causing the computer processor to identify the feature in the second digital data set cause the processor to:

(i) calculate a third value for the first target data element within the second digital data set using the third algorithm from the series of algorithms;

(ii) repeat the step of calculating the third value for the plurality of additional target data elements within the first digital data set; and (iii) determine whether the feature is present in the second digital data set by comparing the calculated first values, calculated second values, and calculated third values from the second digital data set with the defined plurality of synaptic paths associated with the feature.

3. The system of claim 1, wherein the first digital data set is a multispectral data set of a first type and the second digital data set is a multispectral data set of the first type.

4. The system of claim 3, wherein the first target data element, the second target data element, and the plurality of additional target data elements from the first digital data set are each contained within a common band within the first digital data set.

5. The system of claim 3, wherein the defined cluster extends across multiple bands within the multispectral data set.

6. The system of claim 1, wherein the stored programming instructions further cause the processor to create a known feature data store, the known feature data store containing unique synaptic paths associated with the feature.

7. The system of claim 6, wherein the known feature data store further comprises a count value for each of a plurality of unique synaptic paths, the count value indicating a number of instances in which the feature has been found to be associated with each one of the unique synaptic paths.

8. The system of claim 1, wherein the synaptic paths comprise a plurality of nodes, each of the nodes representing a calculated value from a different one of the series of algorithms.

9. The system of claim 1, wherein the stored programming instructions further cause the processor to perform an action comprising one of sounding an alarm or displaying an indicator when the processor determines that the feature is present in the second digital data set.

10. The system of claim 1, wherein the first digital data set is a multispectral data set comprising a plurality of subsets of sensor data, the plurality of subsets of sensor data comprising contiguous bands within a range of a frequency spectrum.

11. The system of claim 10, wherein the range of the frequency spectrum comprises the visible and the infrared portions of the frequency spectrum, and further wherein the plurality of subsets of sensor data lie within a plurality of different bands within the visible/infrared portion of the frequency spectrum.

12. The system of claim 10, wherein each of the synaptic paths comprises a plurality of nodes, the plurality of nodes representing calculated values corresponding to target data elements from a plurality of subsets of sensor data.

13. A system for data analysis and feature recognition comprising:

a computer processor;

a display in communication with the computer processor;

a data store in communication with the computer processor, the data store containing a series of algorithms;

a first digital data set in communication with the processor, the first digital data set comprising a plurality of subsets, each of the plurality of subsets being drawn from a different band of a frequency spectrum;

a second digital data set in communication with the processor, the second digital data set comprising a plurality of subsets, each of the plurality of subsets being drawn from a different band of a frequency spectrum; and a memory in communication with the computer processor and containing stored programming instructions operable by the computer processor, the stored programming instruction, when operated by the computer processor, causing the computer processor to:

train for the presence of the feature within the first digital data set based on the series of algorithms, comprising:

calculating a first value for a first target data element within a first subset from the plurality of subsets within the first digital data set using one of the algorithms from the series of algorithms;

calculating a second value for a second target data element within a second subset from the plurality of subsets within the first digital data set using one of the algorithms from the series of algorithms;

repeating the steps of calculating the first value and calculating the second value for a plurality of additional target data elements within first subset and the second subset from the first digital data set;

defining a plurality of synaptic paths, each one of the plurality of synaptic paths being defined by the calculated first values and calculated second values for each of the target data elements; and associating the feature with one or more of the synaptic paths, based upon a cluster value, the cluster value representing a number of times the feature must occur within a defined cluster area for the feature to be associated with the target data element; and identify the feature in the second digital data set based on the series of algorithms, comprising:

calculating a first value for a first target data element within a first subset from the plurality of subsets within the second digital data set using one of the algorithms from the series of algorithms;

calculating a second value for a second target data element within a second subset from the plurality of subsets within the second digital data set using one of the algorithms from the series of algorithms;

repeating the steps of calculating the first value and calculating the second value for a plurality of additional target data elements within the second digital data set using the first algorithm and the second algorithm from the series of algorithms; and determining whether the feature is present in the second digital data set by comparing the calculated first values and second values from the second digital data set with the defined plurality of synaptic paths associated with the feature.

14. The system of claim 13 wherein each of the synaptic paths comprises a plurality of nodes, the plurality of nodes representing calculated values corresponding to target data elements from a plurality of subsets of sensor data.

15. The system of claim 13, wherein:

the stored programming instructions causing the computer processor to train for the presence of the feature further cause the computer processor to:

(i) calculate a third value for a third target data element within a third subset from the plurality of subsets within the first digital data set using one of the algorithms from the series of algorithms;

(ii) repeat the step of calculating the third value for the plurality of additional target data elements within the first digital data set; and (iii) define the plurality of synaptic paths by the calculated first values, calculated second values, and calculated third values for each of the target data elements;

and further wherein the stored programming instructions causing the computer processor to identify the feature in the second digital data set cause the processor to:

(i) calculate a third value for a third target data element within a third subset from the plurality of subsets within the second digital data set using one of the algorithms from the series of algorithms;

(ii) repeat the step of calculating the third value for the plurality of additional target data elements within the first digital data set; and (iii) determine whether the feature is present in the second digital data set by comparing the calculated first values, calculated second values, and calculated third values from the second digital data set with the defined plurality of synaptic paths associated with the feature.

16. The system of claim 15 wherein the first value, the second value, and the third value are each calculated by using the same algorithm from the series of algorithms.

17. The system of claim 15, wherein the first value, the second value, and the third value are each calculated by using a different algorithm from the series of algorithms.

18. The system of claim 13, wherein the defined cluster extends across multiple bands within the multispectral data set.

* * * * *